US 11,391,968 B2

(12) United States Patent
Hatanaka et al.

(10) Patent No.: US 11,391,968 B2
(45) Date of Patent: Jul. 19, 2022

(54) SPECTACLE LENS, METHOD FOR DESIGNING SPECTACLE LENS, AND METHOD FOR MANUFACTURING SPECTACLE LENS

(71) Applicant: HOYA LENS THAILAND LTD., Patumthani (TH)

(72) Inventors: Takashi Hatanaka, Tokyo (JP); Tomohiro Odaira, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 634 days.

(21) Appl. No.: 16/307,455

(22) PCT Filed: Jun. 6, 2017

(86) PCT No.: PCT/JP2017/020944
§ 371 (c)(1),
(2) Date: Dec. 5, 2018

(87) PCT Pub. No.: WO2017/213122
PCT Pub. Date: Dec. 14, 2017

(65) Prior Publication Data
US 2019/0302483 A1    Oct. 3, 2019

(30) Foreign Application Priority Data
Jun. 6, 2016    (JP) .............................. JP2016-112990

(51) Int. Cl.
*G02C 7/02*    (2006.01)
*G02C 7/00*    (2006.01)
(Continued)

(52) U.S. Cl.
CPC ................. *G02C 7/14* (2013.01); *G02C 7/02* (2013.01); *G02C 7/027* (2013.01)

(58) Field of Classification Search
CPC .......... A61B 3/1005; G02C 5/00; G02C 7/04; G02C 7/02; G02C 7/06
(Continued)

(56) References Cited

U.S. PATENT DOCUMENTS 6,056,401 A    5/2000   Shirayanagi
6,213,603 B1   4/2001   Altheimer et al.
(Continued)

FOREIGN PATENT DOCUMENTS

EP    2 407 815 A1    1/2012
GB    2 380 810 A     4/2003
(Continued)

OTHER PUBLICATIONS

Dec. 11, 2018 International Preliminary Report on Patentability issued in International Patent Application No. PCT/JP2017/020944.
(Continued)

*Primary Examiner* — Dawayne Pinkney
(74) *Attorney, Agent, or Firm* — Oliff PLC

(57) ABSTRACT

A spectacle lens including a prism prescription that has an eyeball-side optical surface. When one side is the same side as a prism base direction (nose side) and the other side is an opposite side of the prism base direction with a direction orthogonal to the prism base direction passing through a prism measurement reference point as a boundary, a minimum value of a curvature of the eyeball-side optical surface is on the same side as the prism base direction (nose side). Since a mean curvature becomes smaller in the prism base direction than a mean curvature of the prism measurement reference point and becomes larger in the opposite direction than the mean curvature of the prism measurement reference point across the prism measurement reference point, deviation in line of sight between right and left eyes is resolved.

3 Claims, 39 Drawing Sheets

(51) Int. Cl.
*G02C 7/06* (2006.01)
*G02C 7/14* (2006.01)
*G02C 5/00* (2006.01)

(58) Field of Classification Search
USPC ............... 351/159.58, 41, 159.01, 159.45, 351/159.73–159.77
See application file for complete search history.

(56) References Cited

U.S. PATENT DOCUMENTS

| | | |
|---|---|---|
| 8,100,529 B2 | 1/2012 | Kozu |
| 8,376,546 B2 | 2/2013 | Kozu |
| 8,814,353 B2 | 8/2014 | Kozu et al. |
| 2005/0225719 A1 | 10/2005 | Kamishita et al. |
| 2010/0026954 A1 | 2/2010 | Kozu |
| 2010/0296052 A1 | 11/2010 | Esser et al. |
| 2011/0199573 A1 | 8/2011 | Kozu |
| 2012/0008089 A1 | 1/2012 | Kozu et al. |
| 2014/0313476 A1 | 10/2014 | Kozu et al. |

FOREIGN PATENT DOCUMENTS

| | | |
|---|---|---|
| JP | H10-78566 A | 3/1998 |
| JP | 2010-055085 A | 3/2010 |
| JP | 4537134 B2 | 9/2010 |
| WO | 97/35224 A1 | 9/1997 |
| WO | 2010/104182 A1 | 9/2010 |

OTHER PUBLICATIONS

Sep. 5, 2017 International Search Report issued in International Patent Application No. PCT/JP2017/020944.
May 20, 2020 Extended Search Report issued in European Patent Application No. 17810297.6.
Feb. 5, 2020 Partial Supplementary Search Report issued in European Patent Application No. 17810297.6.

SPECTACLE LENS, METHOD FOR DESIGNING SPECTACLE LENS, AND METHOD FOR MANUFACTURING SPECTACLE LENS

TECHNICAL FIELD

The present invention relates to a spectacle lens, a spectacle lens designing method, and a spectacle lens producing method.

BACKGROUND ART

In a spectacle lens including a prism prescription, a deviation of the line of sight between left and right eyes, which occurs when viewing the same object point, is different from that of a prismless lens, since a deviation angle with reference to that of the prismless lens is not a constant angle from a prism measurement reference point of the lens to the periphery When compared with the prismless lens, prism effects of left and right lenses are the same amount at the time of viewing a front direction if binocular vision is obtained with the spectacle lens whose prismatic effect varies depending on a viewing direction as above. However, a different amount of a prismatic effect works from that at the time of viewing the front direction when viewing a left-right direction or an up-down direction with both the eyes, and thus, it is sometimes difficult to get used to glasses when wearing the glasses with the prism prescription.

One of peripheral techniques for this problem is Patent Literature 1. Patent Literature 1 is intended to improve visual acuity, and discloses a method of setting one reference axis passing through a center of an outer diameter of a spectacle lens and penetrating through a lens outer surface and a lens inner surface and a plurality of planes including this reference axis, selecting a plurality of sectional shapes of the spectacle lens obtained by a plurality of planes, and performing design such that optical characteristics are optimized for each sectional shape.

CITATION LIST

Patent Literature

Patent Literature 1: Japanese Patent No. 4537134

SUMMARY OF INVENTION

Technical Problem

In the spectacle lens disclosed in Patent Literature 1, a change rate of a curvature at a prism measurement reference point is zero, and a prism amount guaranteed at the prism measurement reference point deviates from a prism amount in the lens peripheral portion. Due to this deviation, a prismatic effect different from a given prescription prism amount occurs in the periphery, and thus, the line of sight deviates in the right and left (a direction of a nose side and an ear side) or the up and down (a direction orthogonal to the direction of the nose side and the ear side).

The prism prescription lens of Patent Literature 1 is configured based on ideas that a surface is inclined such that a desired prescription prism can be obtained only in the vicinity of the prism measurement reference point and that an aberration is corrected so as to improve visual acuity, and a prismatic effect is too smaller than a desired prism amount on the same side in a prism base direction from the prism measurement reference point and is too larger on the opposite side of the prism base direction (hereinafter this state will be referred to as a prism imbalance). This causes a deviation in the line of sight when viewed with both the left and right eyes so that the above-described problem is not solved.

In order to solve the above-described problem, an aspect of the present invention aims to provide a spectacle lens, a spectacle lens designing method, and a spectacle lens producing method in which deviation in line of sight between right and left eyes occurring in the case of viewing the same object point is made the same or approximately the same as deviation in a prismless lens by making a deviation angle of a ray in the case of using a prismless lens as a reference become a constant angle from a prism measurement reference point of a lens to the periphery in a spectacle lens of a prism prescription, or close to a constant angle so that it is possible to resolve the deviation in line of sight between the right and left eyes in the case of viewing the periphery of the prism prescription lens.

Solution to Problem

The spectacle lens of the present invention is a spectacle lens including a prism prescription that has an eyeball-side optical surface. When one side is the same side as a prism base direction and the other side is an opposite side of the prism base direction with a direction orthogonal to the prism base direction passing through a prism measurement reference point as a boundary, a minimum value of a mean curvature of the eyeball-side optical surface is on the same side as the prism base direction.

The spectacle lens of the present invention is a spectacle lens including a prism prescription that has an eyeball-side optical surface. When one side is the same side as a prism base direction and the other side is an opposite side of the prism base direction with a direction orthogonal to the prism base direction passing through a prism measurement reference point as a boundary, a mean value of mean curvatures of the eyeball-side optical surface on the opposite side of the prism base direction is larger than a mean value on the same side as the prism base direction.

The spectacle lens designing method of the present invention is a method for designing a spectacle lens including a prism prescription. When assuming that a lens to which a prism corresponding to the prescription prism is added is a prism prescription lens, a lens which has the same prescription value other than the prism prescription and to which the prism is not added is a reference lens, rays emitted from a plurality of object points are incident on an object-side optical surface of the reference lens and a plurality of rays directed toward an eyeball rotation point among rays emitted from an eyeball-side optical surface of the reference lens constitutes a target ray group, and the rays emitted from the plurality of object points are incident on an object-side optical surface of the prism prescription lens and a plurality of rays directed toward the eyeball rotation point among rays emitted from an eyeball-side optical surface of the prism prescription lens constitutes a prism ray group, the method includes a lens surface shape determination step of determining a shape including a slope of the eyeball-side optical surface locally at each point corresponding to an arbitrary point of the plurality of rays such that the rays constituting the prism ray group are parallel to the rays of the target ray group passing through a same position.

In the spectacle lens designing method of the present invention, the lens surface shape determination step may include: a prism ray group vector storage step of storing an incident ray vector obtained by causing a ray to enter the prism prescription lens among the prism ray group and an outgoing ray vector emitted from the prism prescription lens; a target ray group vector storage step of storing an incident ray vector obtained by causing a ray to enter the reference lens among the target ray group and an outgoing ray vector emitted from the reference lens; a prism ray group storage step of storing the prism ray group; a target ray group storage step of storing the target ray group; an uncorrected prismatic effect calculation step of calculating a prismatic effect of the prism prescription lens before correction using the incident ray vector and the outgoing ray vector stored in the prism ray group vector storage step; an ideal prismatic effect calculation step of calculating a prismatic effect to obtain an ideal outgoing ray with which a direction of the outgoing ray vector emitted from the reference lens and a direction of the outgoing ray vector emitted from the prism prescription lens become identical at an arbitrary point, from the prism ray group stored in the prism ray group vector storage step and the target ray group stored in the target ray group storage step; a correction prism amount calculation step of calculating a prism amount to correct the object-side optical surface based on a difference between the prismatic effect obtained in the uncorrected prismatic effect calculation step and the prismatic effect obtained in the ideal prismatic effect calculation step; and a correction step of correcting the eyeball-side optical surface based on a correction prism amount obtained in the correction prism amount calculation step.

In the spectacle lens designing method of the present invention, the prism prescription lens vector storage step, the uncorrected prismatic effect calculation step, and the correction prism amount calculation step may be performed after the correction step, it may be determined whether the difference between the prismatic effects is equal to or smaller than a target value or the predetermined number of corrections have been performed, and the correction step may be ended if the difference between the prismatic effects is equal to or smaller than the target value or the predetermined number of corrections have been performed.

A spectacle lens producing method of the present invention includes: a spectacle lens designing step; and a processing step of processing a spectacle lens designed in the spectacle lens designing step. When assuming that a lens to which a prism corresponding to the prescription prism is added is a prism prescription lens, a lens which has a same prescription value other than the prism prescription and to which the prism is not added is a reference lens, rays emitted from a plurality of object points are incident on an object-side optical surface of the reference lens and a plurality of rays directed toward an eyeball rotation point among rays emitted from an eyeball-side optical surface of the prism prescription lens constitutes a target ray group, and the rays emitted from the plurality of object points are incident on an object-side optical surface of the prism prescription lens and a plurality of rays directed toward the eyeball rotation point among rays emitted from an eyeball-side optical surface of the prism prescription lens constitutes a prism ray group, a shape including a slope of the eyeball-side optical surface is determined such that the rays constituting the prism ray group are parallel to the rays of the target ray group passing through a same position in the spectacle lens designing step.

DESCRIPTION OF EMBODIMENTS

[Spectacle Lens]

A spectacle lens according to an embodiment of the present invention will be described with reference to FIGS. 1 to 10.

An outline of the spectacle lens will be described with reference to FIG. 1.

Figure 1:
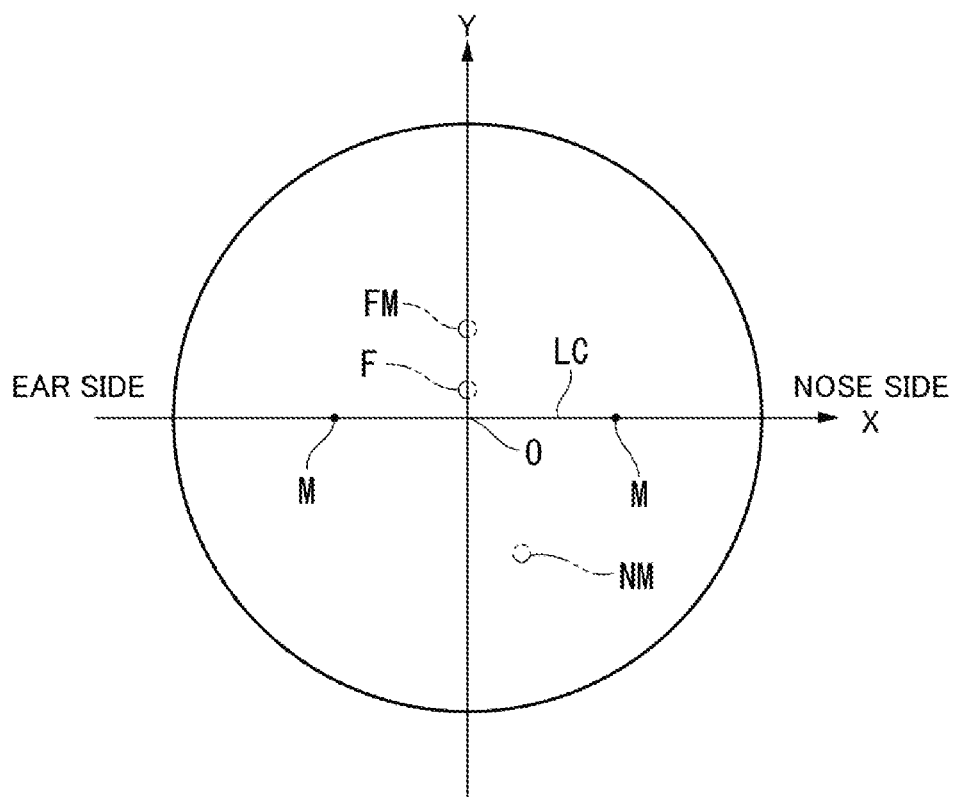
FIG. 1 is a view illustrating an outline of a spectacle lens according to an embodiment of the present invention.

FIG. 1 illustrates a shape of a progressive power lens (single vision aspherical lens).

In the progressive power lens, there are alignment reference marks M bilaterally symmetrical with respect to a prism measurement reference point O. A direction parallel to a direction of a line segment LC connecting these alignment reference marks M is defined as an X direction. There is the prism measurement reference point O on the line segment LC, and the prism measurement reference point O is the midpoint of the line segment LC.

Further, a direction orthogonal to the line segment LC is defined as a Y direction. In addition, the prism measurement reference point O sometimes coincides with the optical center in the present application. The prism measurement reference point O is a point on a lens defined by a manufacturer to measure a prismatic effect of the lens. For example, the prism measurement reference point is arranged at the midpoint between two alignment reference points designated by the manufacturer in the progressive power lens, and is arranged at the same point as an optical center O in the single vision aspherical lens.

Meanwhile, in the single vision aspherical lens, a direction that passes through the prism measurement reference point and is orthogonal to the prism base direction is defined as a Y direction, and a direction that passes through the prism measurement reference point O and is parallel to the prism base direction is defined as an X direction.

A distance power measurement reference position FM is a point on a lens to which a refractive power of a distance portion is applied. A near power measurement position NM is a point on a lens to which refraction of a near portion is applied. A fitting point F is a point on a lens designated by the manufacturer as a reference point for positioning of the lens in front of an eye. Incidentally, the positions FM and NM are used for the progressive power lens and the fitting point F is used for both the lenses.

Further, a nose side indicates a position of a lens located on the nose side of a wearer in a spectacle-wearing state, and an ear side indicates a position of the lens located on the ear side of the wearer in the spectacle-wearing state.

Incidentally, the lens of the present invention is a spectacle lens of a prism prescription prescribed with a prism for correction of, for example, fixation disparity or heterophoria.

[Single Vision Aspherical Lens Whose Prism Base Direction is Nose Side (in-Direction), Prism Refractive Power is 2.5 Δ (Prism Diopters), and Spherical Refractive Power S is +3.0 Diopters]

FIGS. 2A to 4B illustrate examples in a single vision aspherical lens, and FIGS. 5 to 10 illustrate examples in a progressive power lens. These will be described in detail hereinafter.

Figure 2A:
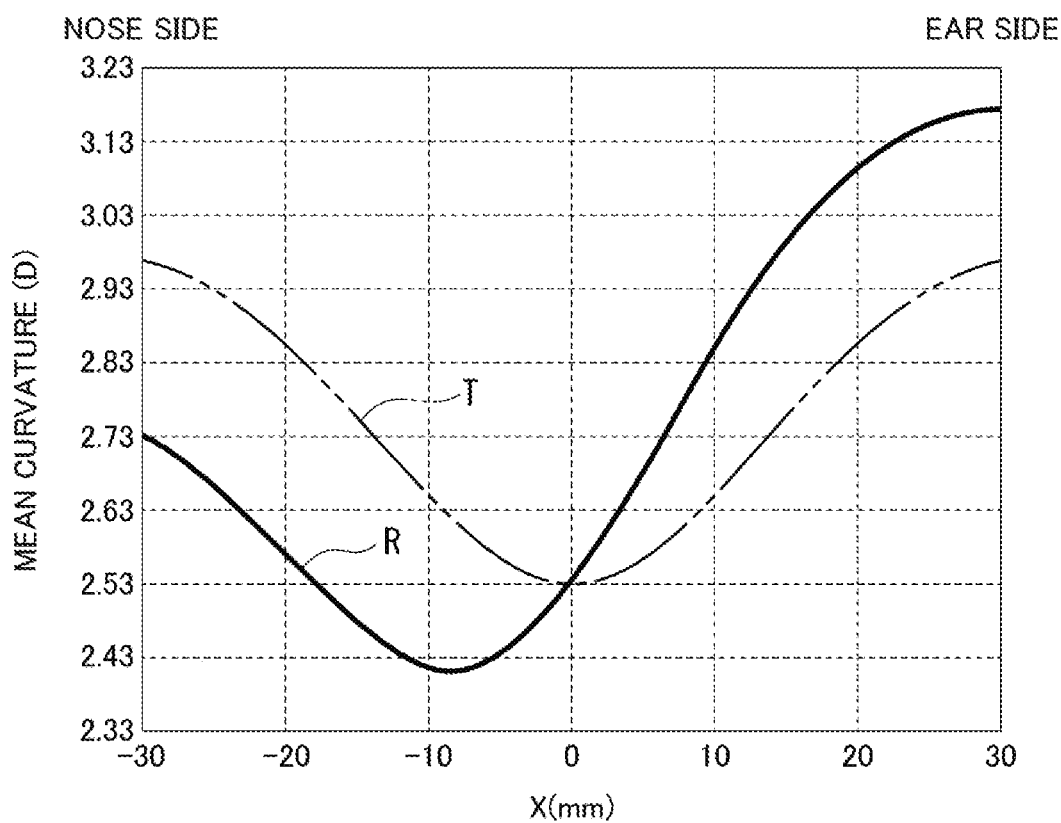
FIG. 2A is a graph illustrating an example of the spectacle lens according to the embodiment of the present invention and illustrating a relationship between a dimension in the X direction and a mean curvature when an optical center (prism measurement reference point) is zero.
Figure 2B:
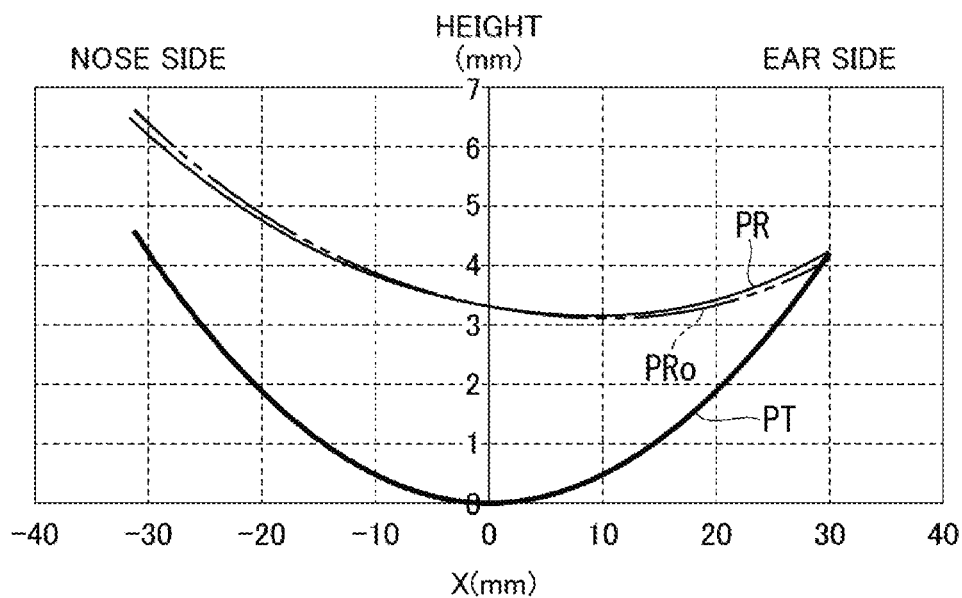
FIG. 2B is a graph illustrating the example of the spectacle lens according to the embodiment of the present invention and illustrating a relationship between the dimension in the X direction and a lens sagittal height when the optical center (prism measurement reference point) is zero.
Figure 3A:
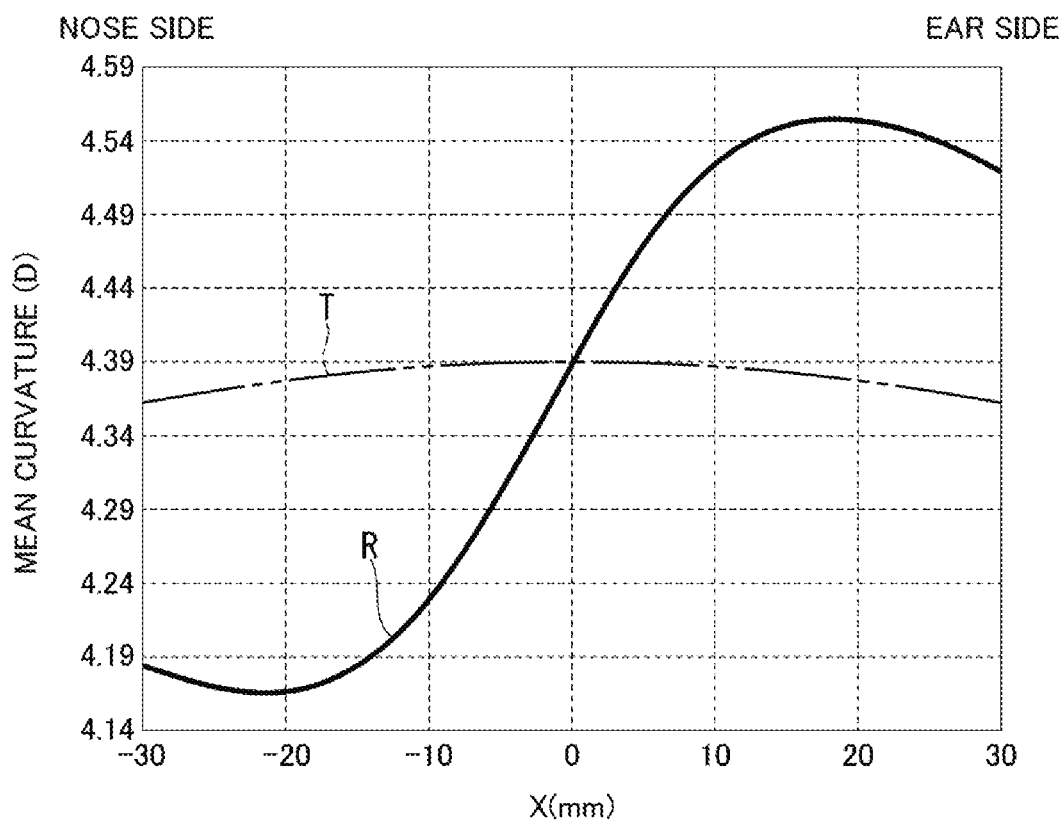
FIG. 3A is a graph illustrating another example of the spectacle lens and illustrating a relationship between a dimension in the X direction and a mean curvature when an optical center (prism measurement reference point) is zero.
Figure 3B:
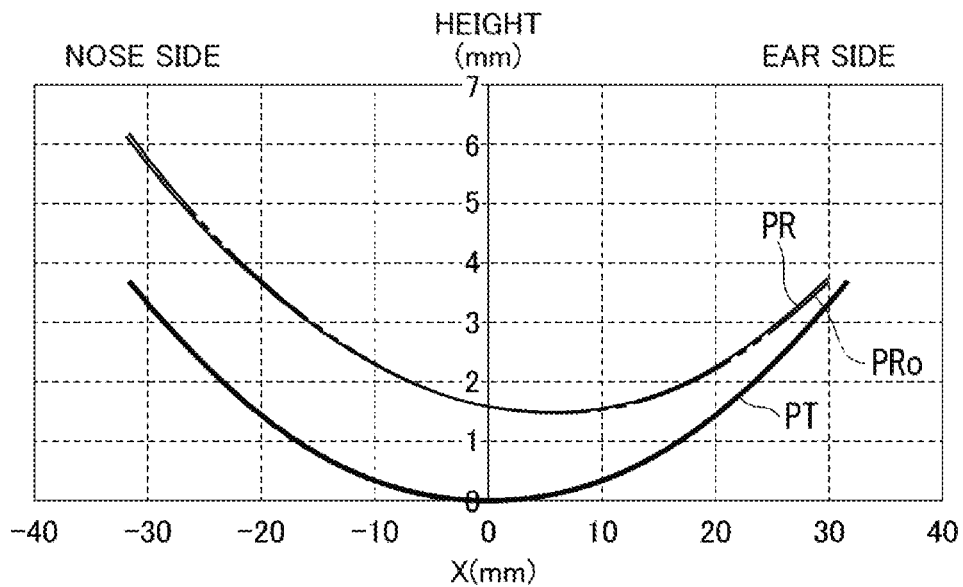
FIG. 3B is a graph illustrating another example of the spectacle lens and illustrating a relationship between the dimension in the X direction and a lens sagittal height when the optical center (prism measurement reference point) is zero.
Figure 4A:
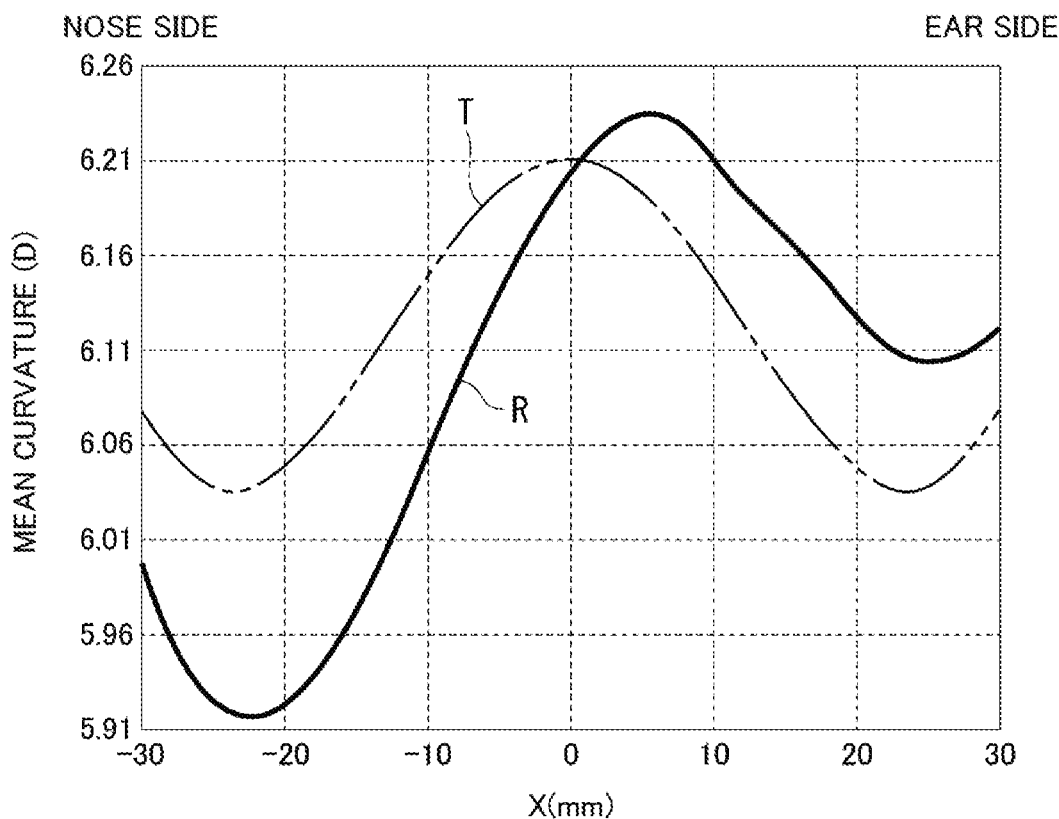
FIG. 4A is a graph illustrating another example of the spectacle lens and illustrating a relationship between a dimension in the X direction and a mean curvature when an optical center (prism measurement reference point) is zero.
Figure 4B:
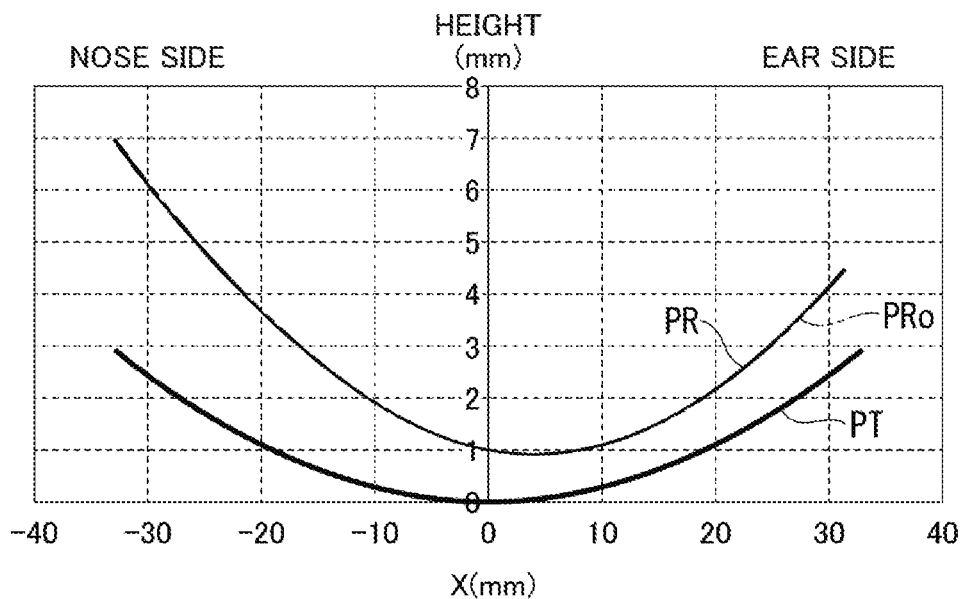
FIG. 4B is a graph illustrating another example of the spectacle lens and illustrating a relationship between the dimension in the X direction and a lens sagittal height when the optical center (prism measurement reference point) is zero.

First, the horizontal axis of FIGS. 2A, 3A and 4A represents a distance from a prism measurement reference point O, and the vertical axis thereof represents a mean curvature. In addition, the horizontal axis of FIGS. 2B, 3B, and 4B represents a distance from the prism measurement reference point O, and the vertical axis thereof represents a sagittal height of a lens from the prism measurement reference point O. Incidentally, the mean curvature is defined as (a mean curvature at one or two or more points)×(lens refractive index−1)×1000).

In the examples of FIGS. 2A to 10, the mean curvature is measured along the X direction in FIG. 1 of an eyeball-side optical surface, that is, a straight line passing through an alignment reference mark M and the prism measurement reference point O.

In the examples of FIGS. 2A to 7, the prism base direction is the nose side (an opposite direction to the X direction), and the opposite side with respect to the prism base direction is the ear side (the same direction as the X direction).

Figure 8:
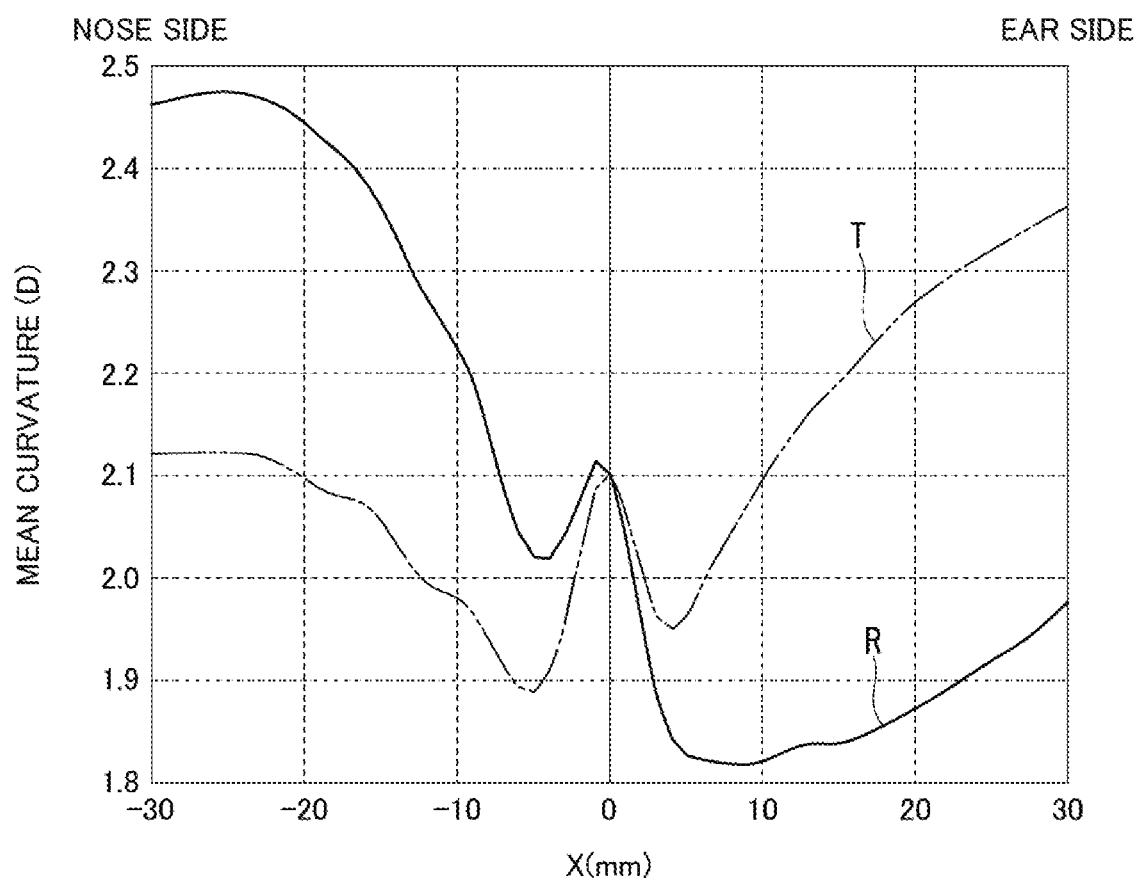
FIG. 8 is a graph illustrating another example of the spectacle lens and illustrating a relationship between a dimension in the X direction and a mean curvature when the prism measurement reference point is zero.
Figure 9:
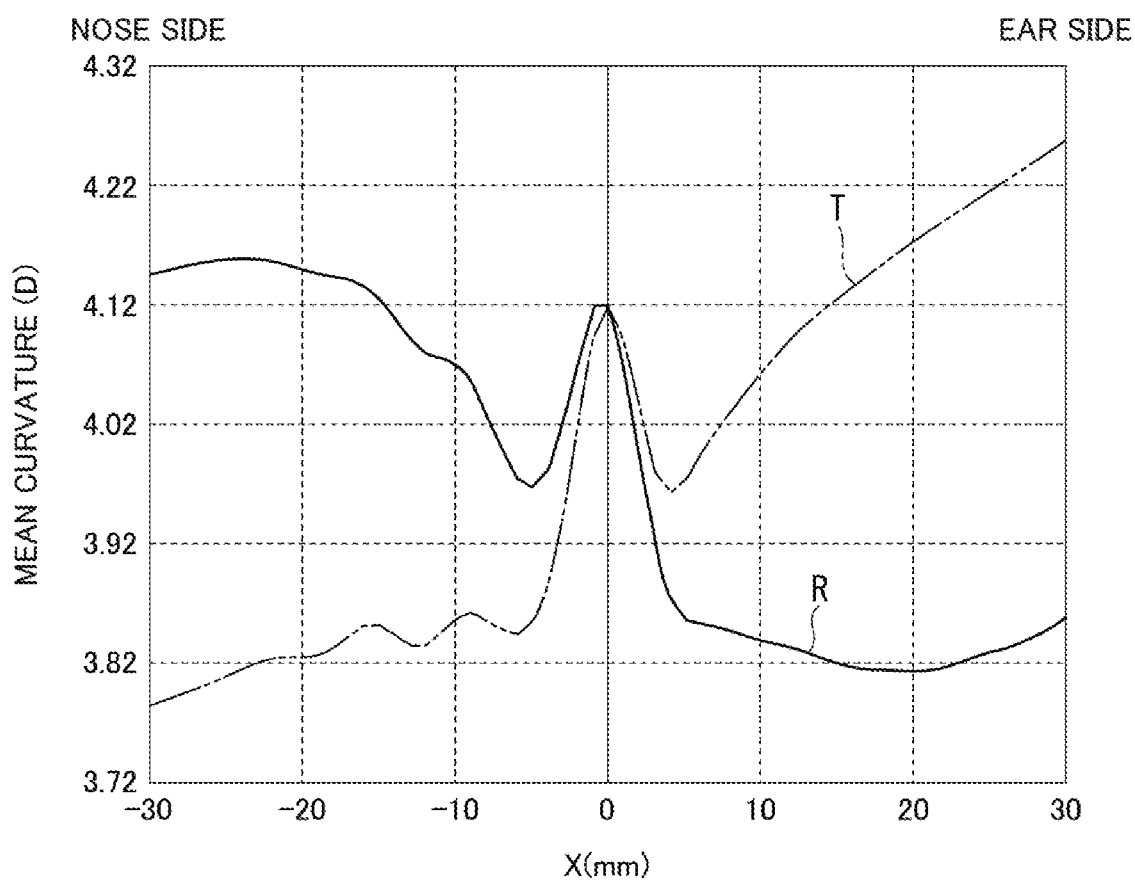
FIG. 9 is a graph illustrating another example of the spectacle lens and illustrating a relationship between a dimension in the X direction and a mean curvature when the prism measurement reference point is zero.
Figure 10:
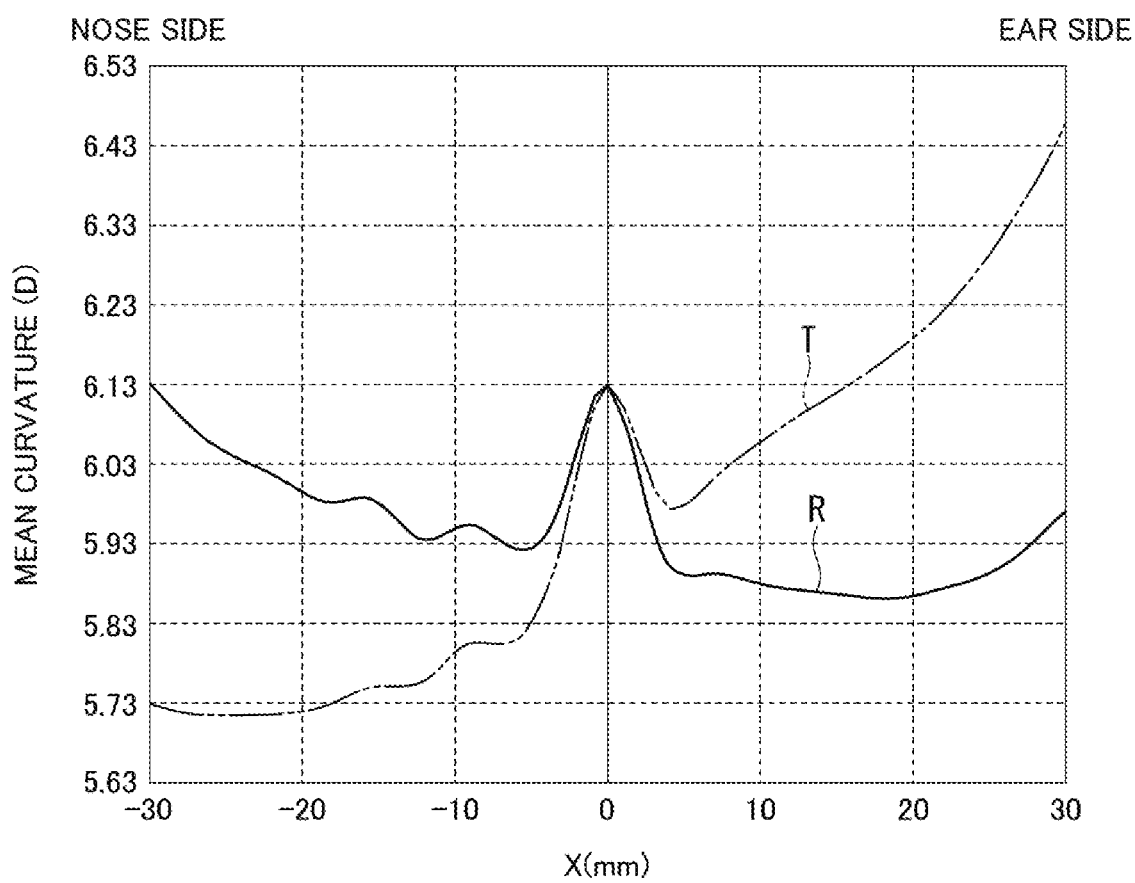
FIG. 10 is a graph illustrating another example of the spectacle lens and illustrating a relationship between a dimension in the X direction and a mean curvature when the prism measurement reference point is zero.

In the examples illustrated in FIGS. 8 to 10, the prism base direction is the ear side (the same direction as the X direction), and the opposite side with respect to the prism base direction is the nose side (the opposite direction to the X direction).

In FIGS. 2A and 2B, directions in the X direction are set such that the direction on the opposite side of the prism base direction from the prism measurement reference point O is a positive direction and the direction on the prism base direction side is a negative direction, and an absolute value increases as being away from the prism measurement reference point O in each of the positive and negative directions.

In FIG. 2A, the curvature T represents a mean curvature of the eyeball-side optical surface (exit surface) of the single vision aspherical lens with no prism prescription. The mean curvature of the mean curvature T has a minimum value of 2.53 at the prism measurement reference point O, and a mean curvature mean value of the mean curvatures T has the same value on the same side as the prism base direction and on the opposite side of the prism base direction with a direction orthogonal to the prism base direction passing through the prism measurement reference point as a boundary. Here, the mean value of the mean curvatures is a value (mean value) obtained by averaging mean curvatures measured at predetermined intervals (for example, at an equal interval of 1 mm) in the X direction. In addition, the same side as the prism base direction represents a region on the same side as the prism base direction with reference to the prism measurement reference point with the direction orthogonal to the prism base direction passing through the prism measurement reference point as the boundary.

Incidentally, the exit surface is the eyeball-side optical surface, and an entrance surface is an object-side optical surface. The eyeball-side optical surface is a lens optical surface arranged on an eyeball side of the spectacle lens in the spectacle-wearing state. On the other hand, the object-side optical surface is a lens optical surface arranged on the side opposite to the eyeball of the spectacle lens in the spectacle-wearing state.

In FIG. 2A, a mean curvature R represents a mean curvature of the eyeball-side optical surface (exit surface) of the lens in the present example. The mean curvature R has a minimum value of 2.41 D (diopters) at a position where X is −9 mm (that is, on the same side as the prism base direction). A value of the mean curvature at another position, for example, the prism measurement reference point (X=0), is 2.53 D. Therefore, the mean curvature R represents that the minimum value of the curvature of the eyeball-side optical surface is on the same side as the prism base direction with the direction orthogonal to the prism base direction passing through the prism measurement reference point as the boundary. As a result, prism imbalance is mitigated (specifically, this will be described with reference to FIGS. 15A, 15B and 15C).

It is understood from FIG. 2A that a mean curvature mean value of the mean curvatures R on the ear side (the opposite side of the prism base direction) is larger than a mean curvature mean value of the mean curvatures R on the nose side (same side as the prism base direction).

Specifically, the mean value of the mean curvatures R in FIG. 2A is 2.50 D in the range of −30 mm≤X≤0 mm (the nose side), and 2.97 D in the range of 0 mm≤X≤30 mm (the ear side). Therefore, the mean curvature R represents that the mean value of the mean curvatures of the eyeball-side optical surface is larger than the mean value on the same side as the prism base direction with the direction orthogonal to the prism base direction passing through the prism measurement reference point as the boundary. As a result, the prism imbalance is mitigated.

Incidentally, the mean curvature R increases toward the ear side with respect to the optical center. Further, a change rate of the curvature of the mean curvature R at the optical center is not zero but takes a positive value.

In FIG. 2B, a sagittal height PT of the entrance surface is zero at the prism measurement reference point, and a value thereof increases toward each of the ear side and the nose side in the lens of the present example. A sagittal height PR of the exit surface has a position where a sagittal height is the lowest on the ear side of the prism measurement reference point and a sagittal height increases from this position toward each of the nose side and the ear side. On the other hand, in a conventional example in which a prescription prism is added to the entire surface of a lens including a prism measurement reference point, a sagittal height PRo of an exit surface is lower on the ear side and higher on the nose side than the sagittal height PR in the present example. That is, in the example illustrated in FIGS. 2A and 2B, a curved surface in the prism base direction is smaller and shallower than the mean curvature T of the entrance surface with respect to the prism measurement reference point, and the curved surface is larger and deeper than the mean curvature T of the entrance surface in the opposite direction.

[Single Vision Aspherical Lens Whose Prism Base Direction is Nose Side (in-Direction), Prism Refractive Power is 2.5 Δ (Prism Diopters), and Spherical Refractive Power S is 0 Diopter]

FIGS. 3A and 3B illustrate examples of the single vision aspherical lens.

FIGS. 3A and 3B correspond to FIGS. 2A and 2B, respectively. In FIGS. 3A and 3B, the same side as the prism base direction is the nose side and the opposite side of the prism base direction is the ear side, which is similar to FIGS. 2A and 2B.

In FIG. 3A, the mean curvature T is 4.39 D at the prism measurement reference point, and a value decreases toward each of the ear side and the nose side. A shape of the mean curvature T is symmetrical between the ear side and the nose side with a position where X is zero interposed therebetween, and a mean value of the mean curvatures T is the same between the nose side and the ear side. A change rate of the curvature is zero at the prism measurement reference point of the entrance surface.

The mean curvature R has a minimum value of 4.19 D at a position where X is −20 mm (that is, on the same side as the prism base direction) and a maximum value of 4.56 D at a position where X is +20 mm (that is, on the opposite side of the prism base direction). On the exit surface, the change rate of the curvature at the prism measurement reference point is not zero but takes a positive value. Therefore, the mean curvature R represents that the minimum value of the curvature of the eyeball-side optical surface is on the same side as the prism base direction with reference to the prism reference position with the direction orthogonal to the prism base direction passing through the prism measurement reference point as the boundary.

It is understood from FIG. 3A that a mean value of the mean curvature R is larger on the ear side than on the nose side. Specifically, the mean value of the mean curvature R in FIG. 3A is 4.23 D in the range of −30 mm≤X≤0 mm, and 4.52 D in the range of 0 mm≤X≤30 mm.

Therefore, the mean curvature R represents that the mean value of the mean curvatures of the eyeball-side optical surface is larger than the mean value on the same side as the prism base direction with the direction orthogonal to the prism base direction passing through the prism measurement reference point as the boundary.

In FIG. 3B, a sagittal height PT of the entrance surface is zero at the prism measurement reference point, and a value thereof increases toward each of the ear side and the nose side in the lens of the present example. A sagittal height PR of the exit surface has a position where a sagittal height is the lowest on the ear side of the prism measurement reference point and a sagittal height increases from this position toward each of the nose side and the ear side. On the other hand, in a conventional example in which a prescription prism is added only to a prism measurement reference point, a sagittal height PRo of an exit surface is lower on the ear side and higher on the nose side than the sagittal height PR in the present example.

That is, in the example illustrated in FIGS. 3A and 3B, a curved surface in the prism base direction is smaller and shallower than the mean curvature T of the entrance surface with respect to the prism measurement reference point O, and the curved surface is bigger and deeper than the mean curvature T of the entrance surface in the opposite direction.

[Single Vision Aspherical Lens Whose Prism Base Direction is Nose Side (in-Direction), Prism Refractive Power is 2.5 Δ (Prism Diopters), and Spherical Refractive Power S is −3.0 Diopters]

FIGS. 4A and 4B illustrate examples of the single vision aspherical lens.

FIGS. 4A and 4B correspond to FIGS. 2A and 2B, respectively. In FIGS. 4A and 4B, the same side as the prism base direction is the nose side and the opposite side of the prism base direction is the ear side, which is similar to FIGS. 2A and 2B.

In FIG. 4A, the mean curvature T is 6.21 D at a prism measurement reference point, and a value decreases toward each of the ear side and the nose side, and takes a minimum value on each side. A shape of the mean curvature T is symmetrical between the ear side and the nose side with a position where X is zero interposed therebetween, and a mean value of the mean curvatures T is the same between the nose side and the ear side. A change rate of the curvature is zero at the prism measurement reference point of the entrance surface.

The mean curvature R has a minimum value of 5.93 D at a position where X is −22 mm (that is, on the same side as the prism base direction), and becomes a maximum value at a position where X is +5 mm. It is understood from FIG. 4A that a mean value of the mean curvature R is larger on the ear side than on the nose side. Specifically, the mean value of the mean curvature R in FIG. 4A is 6.03 D in the range of −30 mm≤X≤0 mm, and 6.17 D in the range of 0 mm≤X≤30 mm. Therefore, the mean curvature R represents that the mean value of the mean curvatures of the eyeball-side optical surface is larger than the mean value on the same side as the prism base direction with the direction orthogonal to the prism base direction passing through the prism measurement reference point as the boundary.

In FIG. 4B, the sagittal height PR of the exit surface has a position where a sagittal height is the lowest on the ear side of the prism measurement reference point and a sagittal height increases from this position toward each of the nose side and the ear side. On the other hand, in a conventional example in which a prescription prism is added only to a prism measurement reference point, a sagittal height PRo of an exit surface is slightly lower on the ear side and slightly higher on the nose side than the sagittal height PR in the present example.

That is, in the example illustrated in FIGS. 4A and 4B, a curved surface in the prism base direction is smaller and shallower than the mean curvature T of the entrance surface with respect to the prism measurement reference point, and the curved surface is larger and deeper than the mean curvature T of the entrance surface in the opposite direction.

[Progressive Power Lens Whose Prism Base Direction is Nose Side (in-Direction), Prism Refractive Power is 2.5 Δ (Prism Diopters), Addition Power ADD is 2.5 Diopters, Progressive Length is 14 mm, and Spherical Refractive Power S is +3.0 Diopters]

Figure 5:
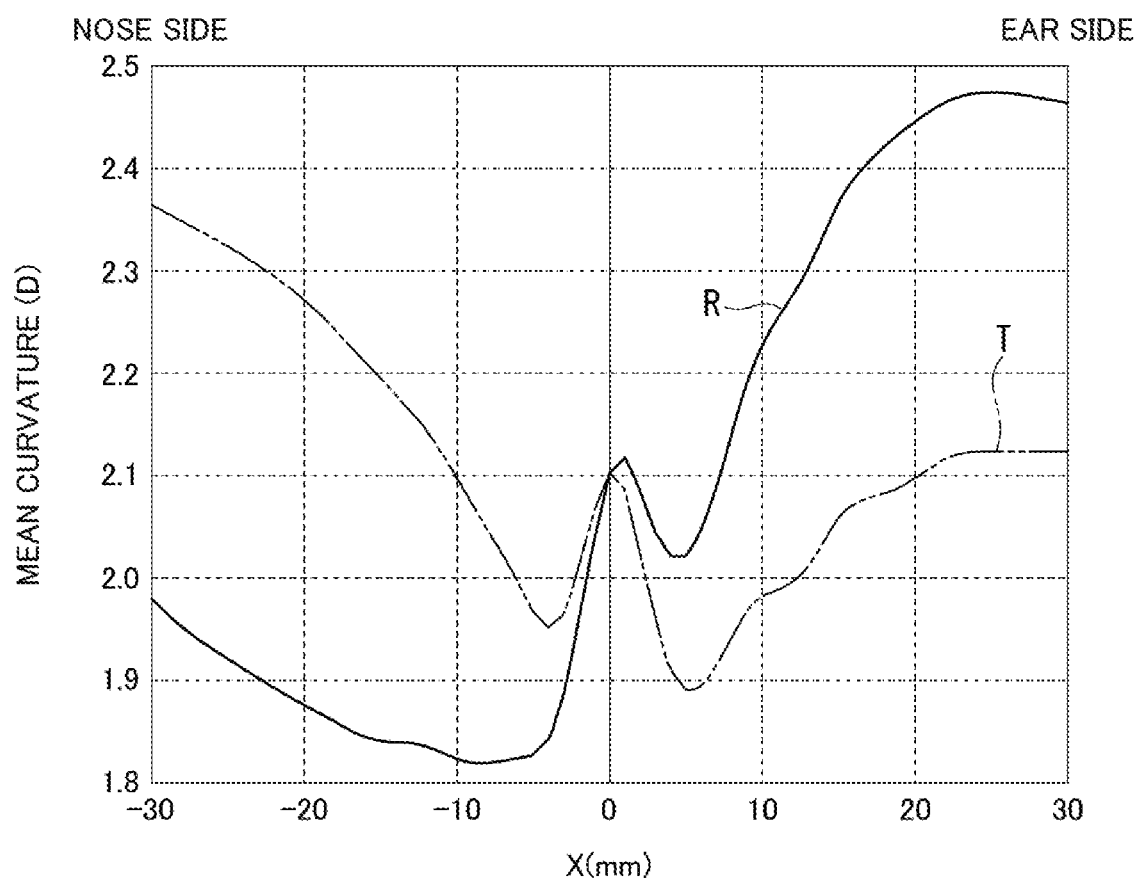
FIG. 5 is a graph illustrating another example of the spectacle lens and illustrating a relationship between a dimension in the X direction and a mean curvature when the prism measurement reference point is zero.

FIG. 5 illustrates an example of the progressive power lens. The horizontal axis of FIGS. 5 to 10 represents a distance from the prism measurement reference point O, and the vertical axis thereof represents a mean curvature.

FIG. 5 is a view corresponding to FIG. 2A. In FIG. 5, the same side as the prism base direction is the nose side and the opposite side of the prism base direction is the ear side, which is similar to FIG. 2A. Incidentally, there are a fitting point F, a distance power measurement position FM, and a near power measurement position NM in the progressive power lens, an upper part from the distance power measurement position FM is set as a distance portion, a lower part from the near power measurement position NM is set as a near portion, and a portion between the distance portion and the near portion is set as a corridor as illustrated by a two-dot chain line in FIG. 1.

In FIG. 5, T represents a mean curvature of an exit surface of the progressive power lens with no prism prescription. The mean curvature T is 2.10 D at the prism measurement reference point and takes a minimum value in a region on the ear side from the prism measurement reference point. Here, the prism measurement reference point in the progressive power lens is an intermediate point between the two alignment reference values specified by a manufacturer. In FIG. 5, the prism measurement reference point is a position where X is zero.

A mean value of the mean curvatures T is 2.18 D in the range of −30 mm≤X≤0 mm, and 2.04 D in the range of 0 mm≤X≤30 mm. Here, the mean value of the mean curvatures T is obtained by obtaining a mean curvature value every pitch of 1 mm for X and averaging the values.

The mean curvature R represents a mean curvature of an exit surface of the progressive power lens in the present example. The mean curvature R on the exit surface has a minimum value of 1.82 D at a position where X is −9 mm (9 mm on the nose side from the prism measurement reference point O) and 2.10 D at the prism measurement reference point. A change rate of the curvature R at the prism measurement reference point is not zero but takes a positive value.

A mean value of the mean curvatures R is 1.89 D in the range of −30 mm≤X≤0 mm, and 2.31 D in the range of 0 mm≤X≤30 mm. That is, the mean value of the mean curvatures R is larger on the ear side than on the nose side.

Therefore, the mean curvature R represents that the mean value of the mean curvatures of the eyeball-side optical surface is larger than the mean value on the same side as the prism base direction with the direction orthogonal to the prism base direction passing through the prism measurement reference point as the boundary.

[Progressive Power Lens Whose Prism Base Direction is Nose Side (in-Direction), Prism Refractive Power is 2.5 Δ (Prism Diopters), Addition Power ADD is 2.5 Diopters, Progressive Length is 14 mm, and Spherical Refractive Power S is 0 Diopter]

Figure 6:
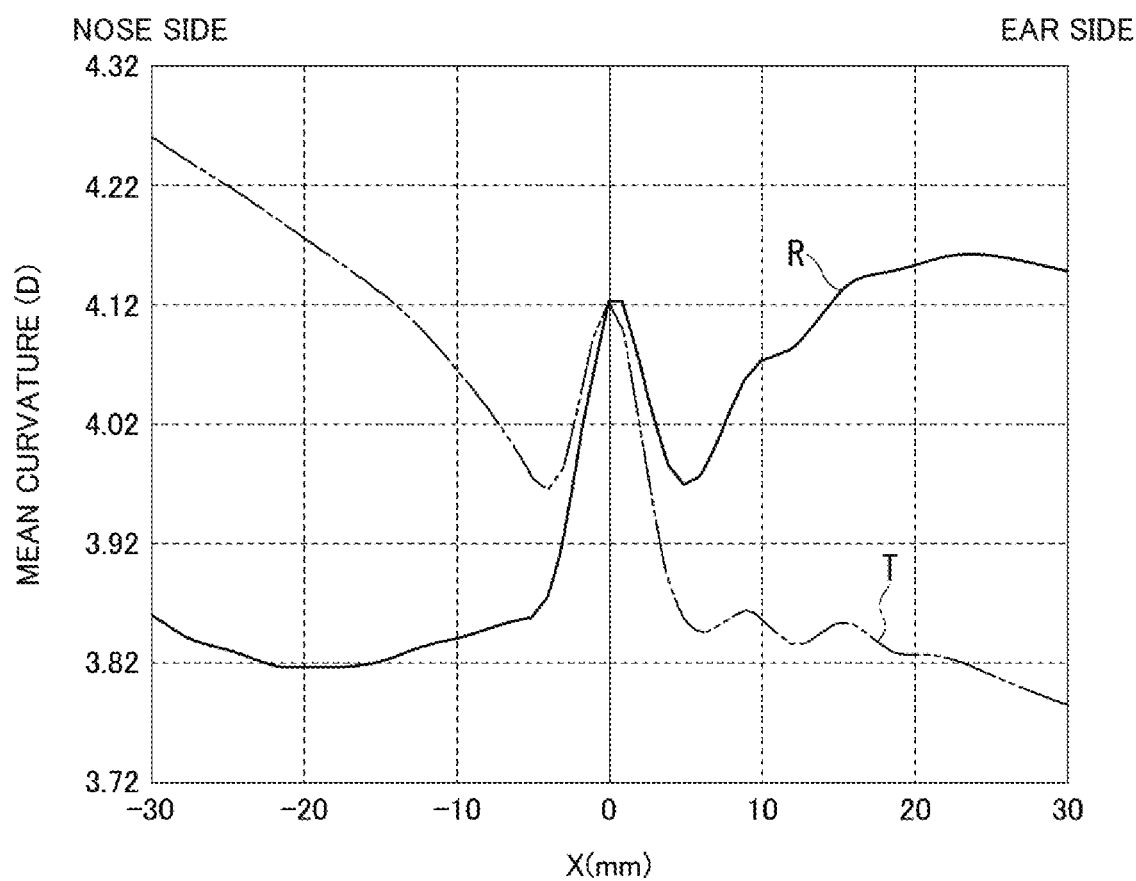
FIG. 6 is a graph illustrating another example of the spectacle lens and illustrating a relationship between a dimension in the X direction and a mean curvature when the prism measurement reference point is zero.

FIG. 6 illustrates an example of the progressive power lens. FIG. 6 is a view corresponding to FIG. 2A. In FIG. 6, the same side as the prism base direction is the nose side and the opposite side of the prism base direction is the ear side, which is similar to FIG. 2A.

In FIG. 6, the mean curvature T of the progressive power lens with no prism prescription is zero at a prism measurement reference point and takes a minimum value in a region on the ear side from the prism measurement reference point.

The mean curvature R in the present example has a minimum value of 3.81 D at a position where X is −18 mm (that is, on the same side as the prism base direction) and 4.12 D at the prism measurement reference point.

Each mean value of the mean curvatures T and R is obtained by the same method as in the example of FIG. 5. The mean value of the mean curvatures T is 4.13 D in the range of −30 mm≤X≤0 mm, and 3.86 D in the range of 0 mm≤X≤30 mm. The mean value of the mean curvatures R is 3.85 D in the range of −30 mm≤X≤0 mm, and 4.10 D in the range of 0 mm≤X≤30 mm. That is, the mean value of the mean curvatures R is larger on the ear side than on the nose side.

Therefore, the mean curvature R represents that the mean value of the mean curvatures of the eyeball-side optical surface is larger than the mean value on the same side as the prism base direction with the direction orthogonal to the prism base direction passing through the prism measurement reference point as the boundary.

[Progressive Power Lens Whose Prism Base Direction is Nose Side (in-Direction), Prism Refractive Power is 2.5 Δ (Prism Diopters), Addition Power ADD is 2.5 Diopters, Progressive Length is 14 mm, and Spherical Refractive Power S is −3.0 Diopters]

Figure 7:
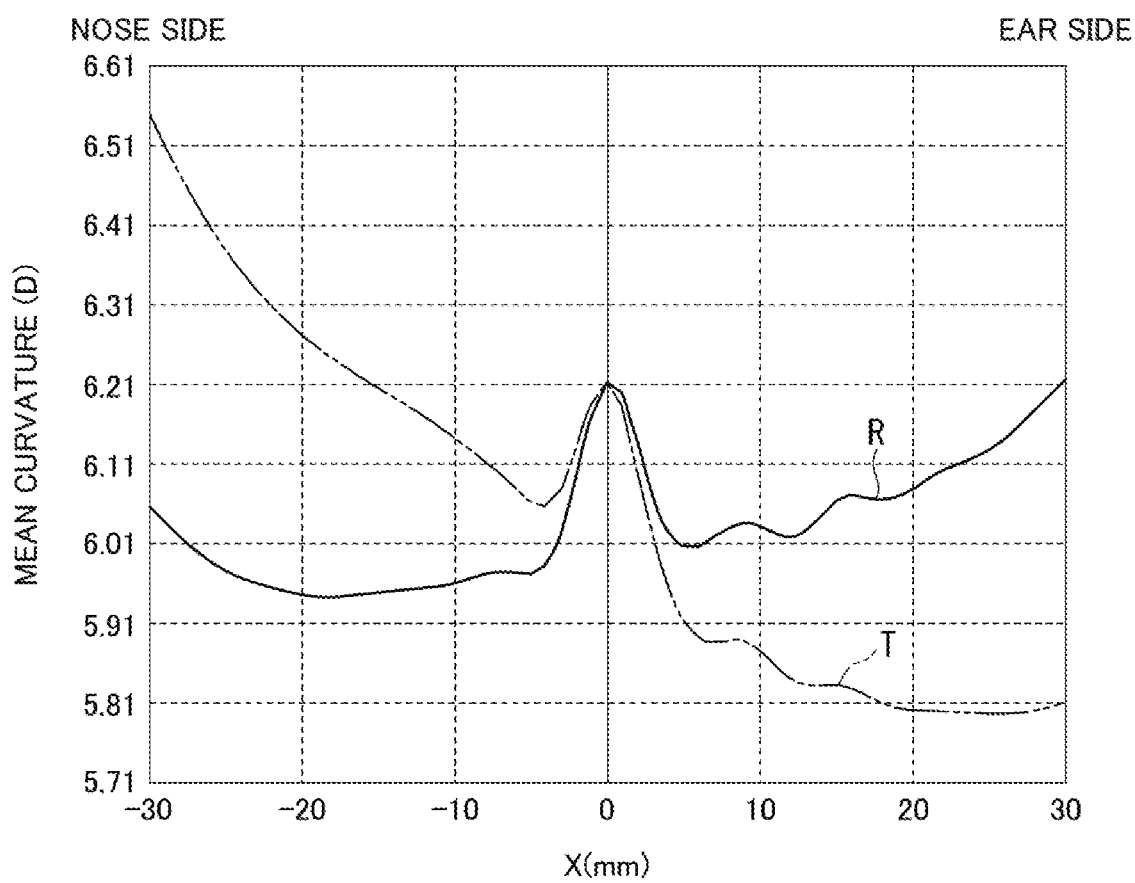
FIG. 7 is a graph illustrating another example of the spectacle lens and illustrating a relationship between a dimension in the X direction and a mean curvature when the prism measurement reference point is zero.

FIG. 7 illustrates an example of the progressive power lens. FIG. 7 is a view corresponding to FIG. 2A. In FIG. 7, the same side as the prism base direction is the nose side and the opposite side of the prism base direction is the ear side, which is similar to FIG. 2A.

In FIG. 7, the mean curvature T of the progressive power lens with no prism prescription is 6.13 D at a prism measurement reference point and takes a minimum value in a region on the ear side from the prism measurement reference point.

The mean curvature R in the present example has a minimum value of 5.86 D at a position where X is −18 mm (that is, on the same side as the prism base direction) and 6.13 D at the prism measurement reference point.

The mean value of the mean curvatures T is 6.16 D in the range of −30 mm≤X≤0 mm, and 5.78 D in the range of 0 mm≤X≤30 mm. The mean value of the mean curvatures R is 5.91 D in the range of −30 mm≤X≤0 mm, and 6.00 D in the range of 0 mm≤X≤30 mm. That is, the mean value of the mean curvatures R is larger on the ear side than on the nose side.

Therefore, the mean curvature R represents that the mean value of the mean curvatures of the eyeball-side optical surface is larger than the mean value on the same side as the prism base direction with the direction orthogonal to the prism base direction passing through the prism measurement reference point as the boundary.

[Progressive Power Lens Whose Prism Base Direction is Ear Side (Out-Direction), Prism Refractive Power is 2.5 Δ (Prism Diopters), Addition Power ADD is 2.5 Diopters, Progressive Length is 14 mm, and Spherical Refractive Power S is +3.0 Diopters]

FIG. 8 illustrates an example of the progressive power lens. FIG. 8 is a view corresponding to FIG. 2A. In FIG. 8, the same side as the prism base direction is the ear side (the same direction as the X direction), and the opposite side of the prism base direction is the nose side (opposite direction to the X direction), which is different from FIG. 2A.

In the examples illustrated in FIGS. 8 to 10, the prism base direction is the ear side (the same direction as the X direction), and the opposite side with respect to the prism base direction is the nose side (the opposite direction to the X direction).

In FIG. 8, the mean curvature T of the progressive power lens with no prism prescription is 2.10 D at a prism measurement reference point and takes a minimum value in a region on the nose side from the prism measurement reference point.

The mean curvature R in the present example has a minimum value of 1.83 D at a position where X is 8 mm (that is, on the same side as the prism base direction) and 2.10 D at the prism measurement reference point.

The mean value of the mean curvatures T is 2.04 D in the range of −30 mm≤X≤0 mm, and 2.18 D in the range of 0 mm≤X≤30 mm. The mean value of the mean curvatures R is 2.31 D in the range of −30 mm≤X≤0 mm, and 1.89 D in the range of 0 mm≤X≤30 mm. That is, the mean value of the mean curvatures R is larger on the nose side than on the ear side.

Therefore, the mean curvature R represents that the mean value of the mean curvatures of the eyeball-side optical surface is larger than the mean value on the same side as the prism base direction with the direction orthogonal to the prism base direction passing through the prism measurement reference point as the boundary.

[Progressive Power Lens Whose Prism Base Direction is Ear Side (Out-Direction), Prism Refractive Power is 2.5 Δ (Prism Diopters), Addition Power ADD is 2.5 Diopters, Progressive Length is 14 mm, and Spherical Refractive Power S is 0 Diopter]

FIG. 9 illustrates an example of the progressive power lens. FIG. 9 is a view corresponding to FIG. 8.

In FIG. 9, the mean curvature T of the progressive power lens with no prism prescription is zero at a prism measurement reference point and takes a minimum value in a region on the nose side from the prism measurement reference point.

The mean curvature R in the present example has a minimum value of 3.81 D at a position where X is 18 mm (that is, on the same side as the prism base direction) and 0 D at the prism measurement reference point.

The mean value of the mean curvatures T is 3.86 D in the range of −30 mm≤X≤0 mm, and 4.13 D in the range of 0 mm≤X≤30 mm. The mean value of the mean curvatures R is −0.018 in the range of −30 mm≤X≤0 mm, and 3.85 D in the range of 0 mm≤X≤30 mm. That is, the mean value of the mean curvatures R is larger on the nose side than on the ear side.

Therefore, the mean curvature R represents that the mean value of the mean curvatures of the eyeball-side optical surface is larger than the mean value on the same side as the prism base direction with the direction orthogonal to the prism base direction passing through the prism measurement reference point as the boundary.

[Progressive Power Lens Whose Prism Base Direction is Ear Side (Out-Direction), Prism Refractive Power is 2.5 Δ (Prism Diopters), Addition Power ADD is 2.5 Diopters, Progressive Length is 14 mm, and Spherical Refractive Power S is −3.0 Diopters]

FIG. 10 illustrates an example of the progressive power lens. FIG. 10 is a view corresponding to FIG. 8.

In FIG. 10, the mean curvature T of the progressive power lens with no prism prescription is zero at a prism measurement reference point and takes a minimum value in a region on the nose side from the prism measurement reference point.

The mean curvature R in the present example has a minimum value of 5.86 D at a position where X is 18 mm (that is, on the same side as the prism base direction) and 0 D at the prism measurement reference point.

The mean value of the mean curvatures T is 5.78 D in the range of −30 mm≤X≤0 mm, and 6.16 D in the range of 0 mm≤X≤30 mm. The mean value of the mean curvatures R is 6.00 D in the range of −30 mm≤X≤0 mm, and 5.91 D in the range of 0 mm≤X≤30 mm. That is, the mean value of the mean curvatures R is larger on the nose side than on the ear side.

Therefore, the mean curvature R represents that the mean value of the mean curvatures of the eyeball-side optical surface is larger than the mean value on the same side as the prism base direction with the direction orthogonal to the prism base direction passing through the prism measurement reference point as the boundary.

(Regarding Measurement Position)

A measurement positions in FIGS. 2A to 10 in the present examples is on an exit surface LO, which is the object-side optical surface of the lens, passes through the prism measurement reference point, and is on a straight line in a direction that is the same direction as or opposite to the prism base direction. A position on the lens at X=0 (mm) in FIGS. 2A to 10 corresponds to the prism measurement reference position.

A measurement range for calculation of a mean curvature was set to the range of 60 mm with the prism measurement reference point as the midpoint.

(Regarding Arrangement of Measurement Points)

The arrangement of measurement points for calculation of a mean curvature is set to an arrangement at 1 mm at equal intervals and the mean curvature is set to a surface refractive power calculated by the following calculation formula at each position.

Calculation Formula: Mean Curvature at Each Position×(Refractive index of lens−1)×1000     (Formula 1)

(Measurement Method)

Measurement of a mean curvature value was carried out by contacting the eyeball-side optical surface with TALY-SURF (manufactured by TAYLOR HOBSON).

Incidentally, a position passing through an alignment reference mark may be used as the measurement position when a reference position, for example, two alignment reference marks can be confirmed in the progressive power lens or the like as the measurement position. In addition, the measurement range is preferably set to the range of 50 mm to 60 mm. Further, the number of measurement points for calculation of a mean curvature value can be selected in the range of about 10 to 10,000 points, and preferably 100 points or more.

Suitable examples of a measurement device include trade name UA3P (manufactured by Panasonic corporation), trade name ultra-high accuracy CNC coordinate measuring machine LEGEX 9106 (manufactured by Mitutoyo Corporation), trade name PMD 100 (manufactured by Schneider Electric), trade name Dual Lens Mapper (manufactured by Automation & Robotics), and the like. The measurement method according to the present embodiment may be not only the above-described method but also another method of performing the following measurement. For example, the measurement may be performed by measuring the entire lens surface, and then, analyzing a measurement result thereof to specify a straight line passing through the prism measurement reference point O and directed in the same direction as the prism base direction.

[Spectacle Lens Designing Apparatus]

One embodiment of a designing apparatus and a designing method of the spectacle lens according to the present invention will be described with reference to the drawings.

Figure 11:
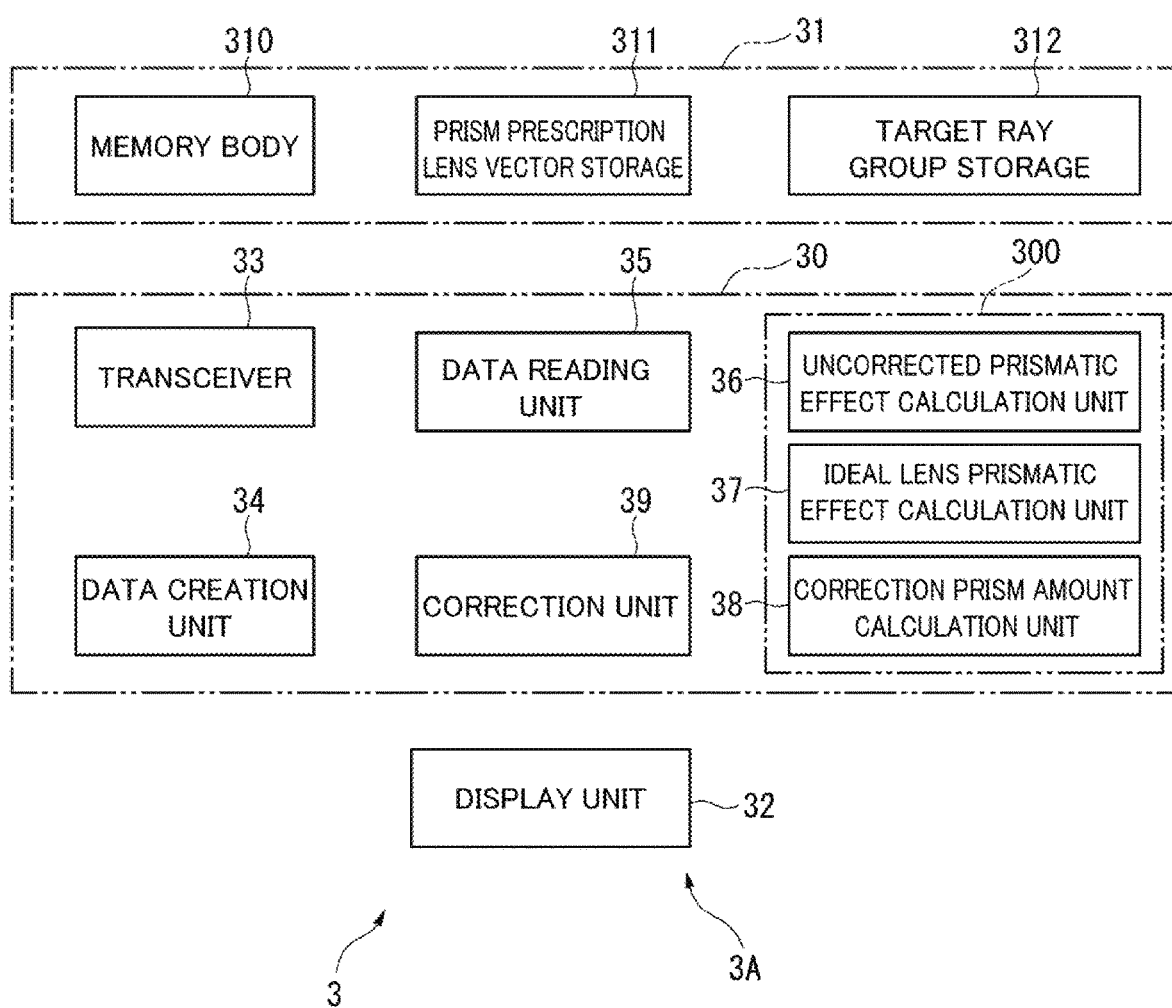
FIG. 11 is a block diagram illustrating a spectacle lens designing apparatus according to an embodiment of the present invention.

FIG. 11 illustrates an outline of the spectacle lens designing apparatus of the present embodiment.

In FIG. 11, a spectacle lens designing apparatus 3 is an apparatus that designs a spectacle lens in which a ray incident on an entrance surface is emitted from an exit surface toward an eyeball rotation point. Further, the designing apparatus 3 includes a lens surface shape determination unit 3 (included in the designing apparatus 3 in the present invention) including a control unit 30, a memory 31, and a display unit 32. The lens surface shape determination unit includes a lens surface shape determination unit 3A that sets a slope of an exit surface, and the lens surface shape determination unit 3A includes the control unit 30, the memory 31, and the display unit 32.

The control unit 30 is constituted by an arithmetic circuit such as a CPU and a memory circuit such as a RAM, and develops a program stored in the memory 31 on the RAM and executes various processes in cooperation with the program developed on the RAM.

The control unit 30 executes the various processes to function as a transceiver 33, a data creation unit 34, a data reading unit 35, an uncorrected prismatic effect calculation unit 36, an ideal prismatic effect calculation unit 37, a correction prism amount calculation unit 38, and a correction unit 39.

The transceiver 33 also functions as an optometry information acquisition unit that acquires optometry information of a wearer from an optometry device (not illustrated), and receives information necessary for design of a spectacle lens from a computer (not illustrated) and transmits design data and the like to another computer.

Here, the optometry information include information on fixation disparity of the wearer (a prism amount ΔP, on the nose side (In-direction), information on heterophoria on the ear side (Out-direction), an upper side (Up-direction), and a lower side (Down-direction), a spherical refractive power S of the spectacle lens, a first refractive power applied in a first region (for example, the near portion) of the progressive power lens, a second refractive power applied in a second region (for example, the distance portion), a corridor length, an addition power, a face form angle, an interpupillary distance, an inter-vertex distance, and other information.

The data creation unit 34 calls out the information stored in the memory 31 to create incident ray vectors L11A, L12A, and L13A incident on an entrance surface LI of a reference lens BL (see FIG. 12A), outgoing ray vectors L11B, L12B, and L13B emitted from an exit surface LO of the reference lens BL, incident ray vectors L21A, L22A, and L23A, incident on an entrance surface LI of a prism prescription lens CL, and outgoing ray vectors L21B, L22B, and L23B emitted from the exit surface LO of the prism prescription lens CL, and other data. Here, the prism prescription lens CL refers to a lens to which a prism corresponding to the prescription prism is added. The reference lens BL refers to a lens whose prescription values other than the prism prescription are all the same and to which no prism is added.

Further, in the data creation unit 34 illustrated in FIG. 11, a prescription prism distribution, a reference prism distribution, and a differential prism distribution to be described later are created by a ray tracing method or another method. The data created by the data creation unit 34 is once stored in the memory 31.

As illustrated in FIG. 11, the data reading unit 35 reads various types of data created by the data creation unit 34 from the memory 31.

The uncorrected prismatic effect calculation unit 36 calculates a prismatic effect of the reference lens with no prism prescription using the incident ray vector and the outgoing ray vector stored in a prism prescription lens vector storage 311 to be described later.

The ideal prismatic effect calculation unit 37 calculates a prismatic effect to obtain an ideal outgoing ray obtained when a ray is caused to enter the prism prescription lens using the incident ray vector stored in the prism prescription lens vector storage 311 and the outgoing ray vector stored in a target ray group storage 312 to be described later.

The correction prism amount calculation unit 38 calculates a correction prism amount for correction of a slope of an exit surface based on a difference between the prismatic effect obtained by the uncorrected prismatic effect calculation unit 36 and the prismatic effect obtained by the ideal prismatic effect calculation unit 37.

A calculation unit 300 is constituted by the uncorrected prismatic effect calculation unit 36, the ideal prismatic effect calculation unit 37, and the correction prism amount calculation unit 38.

The correction unit 39 corrects the slope of the exit surface based on the correction prism amount obtained by the correction prism amount calculation unit 38.

The memory 31 includes a memory body 310, the prism prescription lens vector storage 311, and the target ray group storage 312.

The memory body 310 stores various programs for control of an operation of the spectacle lens designing apparatus 3 and various types of information. Examples of the various types of information include optometry information for each wearer acquired by the transceiver 33, a material and a refractive index of the spectacle lens, and other design information necessary for design.

The prism prescription lens vector storage 311 stores the incident ray vectors L21A, L22A, and L23A obtained by causing rays to enter the entrance surface LI of the prism prescription lens CL and the outgoing ray vectors L21B, L22B, and L23B (see FIG. 12B) emitted from the exit surface LO.

The target ray group storage 312 stores the incident ray vectors L11A, L12A, and L13A incident on the entrance surface LI, rotated by an angle γ corresponding to a prescription prism amount of the reference lens BL, and the outgoing ray vectors L11B, L12B, and L13B (see FIG. 12A) emitted from the exit surface LO in the memory 31. Here, the incident ray vectors L11A, L12A, and L13A correspond to a target ray group.

[Spectacle Lens Designing Method]

A spectacle lens designing method using the designing apparatus 3 having the above-described configuration will be described.

A concept serving as a prerequisite for describing the spectacle lens designing method will be described with reference to FIGS. 12A and 12B.

Figure 12A:
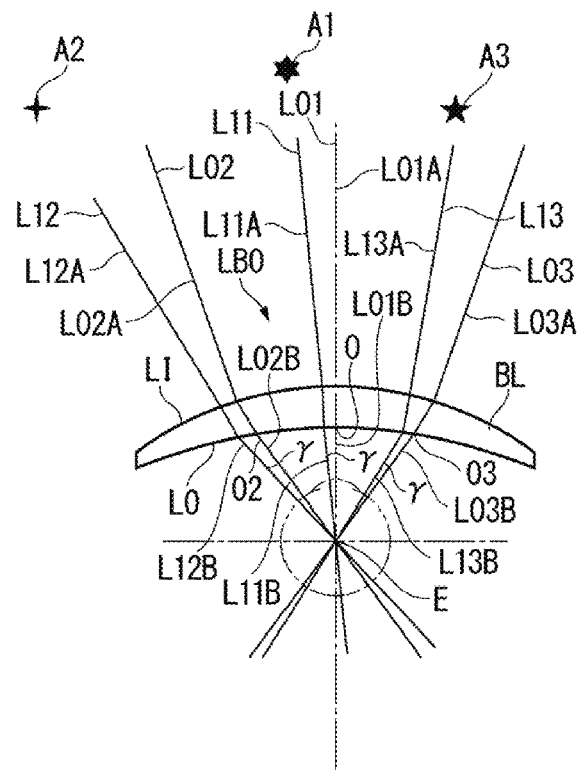
FIG. 12A is a schematic view for describing a principle of a lens designing method.

FIG. 12A illustrates the prism reference lens BL.

The reference lens BL is a lens whose prescription values (a spherical refractive power of the spectacle lens, an astigmatic refractive power, an astigmatic axis, a first refractive power applied in a first region (for example, the near portion) of the progressive power lens, a second refractive power applied in a second region (for example, the distance portion), a corridor length, an addition power, an interpupillary distance, and the like) other than the prism prescription are all the same and to which no prescription prism is added.

In FIG. 12A, the reference lens BL has the entrance surface LI which is the object-side optical surface and the exit surface LO which is the eyeball-side optical surface.

Assuming a plurality of object points A1, A2, and A3 at an infinite distance or a finite distance, a simulation is performed to cause rays emitted from the object points A1, A2, and A3 to exit from the exit surface LO through the entrance surface LI of the reference lens BL. Among these plurality of rays, ray vectors L01, L02, and L03 emitted from arbitrary points on the exit surface LO of the reference lens BL and directed toward an eyeball rotation point E are defined as a reference ray group LB0 in each gaze line direction of the reference lens BL. Here, the finite distance refers to a distance of the extent that can be regarded as an infinite distance.

The ray vector L01 includes an incident ray vector L01A emitted from the object point A1 and incident on the prism measurement reference point O of the entrance surface LI, a vector directed from an incident position of the incident ray vector L01A to the prism measurement reference point O of the exit surface L0, and an outgoing ray vector L01B directed from the prism measurement reference point O of the exit surface LO to the eyeball rotation point E.

The ray vector L02 includes an incident ray vector L02A emitted from the object point A2 and incident on the entrance surface LI, a vector directed from an incident position of the incident ray vector L02A to an arbitrary lens peripheral portion O2 of the exit surface LO, and an outgoing ray vector L02B directed from the lens peripheral portion O2 of the exit surface LO to the eyeball rotation point E.

The ray vector L03 includes an incident ray vector L03A emitted from the object point A3 and incident on the entrance surface LI, a vector directed from an incident position of the incident ray vector L03A to an arbitrary lens peripheral portion O3 of the exit surface LO, and an outgoing ray vector L03B directed from the lens peripheral portion O3 of the exit surface LO to the eyeball rotation point E.

A plurality of ray vectors, rotated from the ray vectors L01, L02, and L03 of the reference lens BL, respectively, by an angle γ corresponding to a prescription prism amount applied to the prism measurement reference point, are indicated by L11, L12, and L13. Among the ray vectors L11, L12, and L13, the incident ray vectors are indicated by L11A, L12A, and L13A, and the outgoing ray vectors are indicated by L11B, L12B, and L13B. Here, the incident ray vectors L11A, L12A, and L13A of the reference lens BL are defined as a target ray group. That is, the incident ray vectors (L11A, L12A, and L13A) of the case of causing a plurality of rays to enter the reference lens such that the plurality of ray vectors (L11, L12, and L13) rotated by the angle γ corresponding to the prescription prism are emitted from the exit surface LO and directed toward the eyeball rotation point E are defined as the target ray group in the reference lens BL.

Figure 12B:
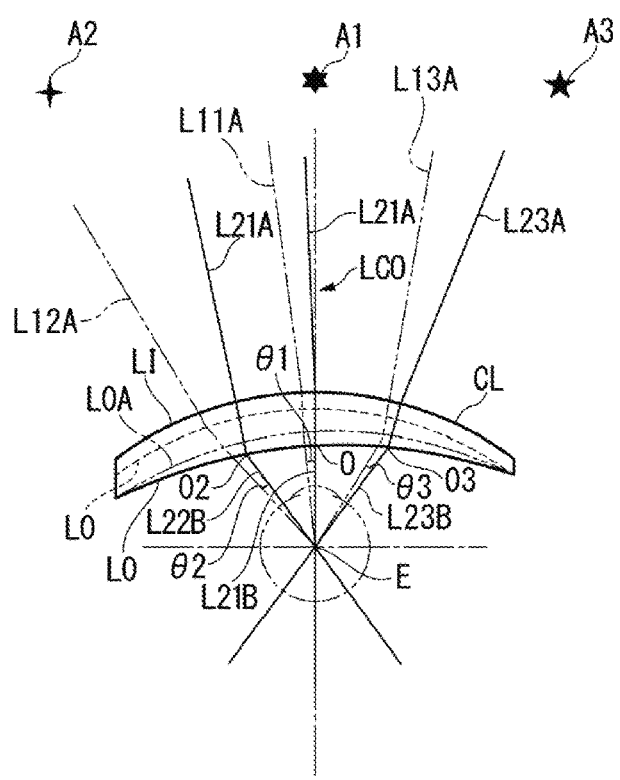
FIG. 12B is a schematic view for describing the principle of the lens designing method.

FIG. 12B illustrates the prism prescription lens CL. In FIG. 12B, the prism prescription lens CL is prescribed with a prism for fixation disparity or strabismus at the prism measurement reference point or at the optical center. In the following description, the prism measurement reference point O will be described as the optical center.

A simulation is performed in which rays emitted from the plurality of object points A1, A2, and A3 are caused to pass through the entrance surface LI of the prism prescription lens CL and exit from the exit surface LO of the eyeball-side optical surface. Among these plurality of rays, ray vectors L21, L22, and L23 incident on the entrance surface LI of the prism prescription lens CL and emitted from arbitrary points on the exit surface LO to be directed toward the eyeball rotation point E are defined as a prism ray group LCO in each gaze line direction of the prism prescription lens CL. Among the prism ray group LCO, the incident ray vectors L21A, L22A, and L23A constitute a prism ray group.

The ray vector L21 includes the incident ray vector L21A emitted from the object point A1 and incident on an optical center O of the entrance surface LI, a vector directed from an incident position of the incident ray vector L21A to an optical center O of the exit surface LO, and the outgoing ray vector L21B directed from the optical center O of the exit surface LO to the eyeball rotation point E.

The ray vector L22 includes the incident ray vector L22A emitted from the object point A2 and incident on the entrance surface LI, a vector directed from an incident position of the incident ray vector L22A to an arbitrary lens peripheral portion O2 of the exit surface LO, and the outgoing ray vector L22B directed from the lens peripheral portion O2 of the exit surface LO to the eyeball rotation point E.

The ray vector L23 includes the incident ray vector L23A emitted from the object point A3 and incident on the entrance surface LI, a vector directed from an incident position of the incident ray vector L23A to an arbitrary lens peripheral portion O3 of the exit surface LO, and the outgoing ray vector L23B directed from the lens peripheral portion O3 of the exit surface LO to the eyeball rotation point E.

In the present embodiment, the incident ray vectors L21A, L22A, and L23A incident on the entrance surface LI of the prism prescription lens CL are defined as a prism ray group.

Here, an angle (deviation angle) formed by a direction of the outgoing ray vector L11B incident from the object point A1 and emitted from the optical center O of the exit surface LO of the reference lens BL and a direction of the outgoing ray vector L21B incident from the object point A1 and emitted from the optical center O of the exit surface LO of the prism prescription lens CL is defined as θ1. An angle (deviation angle) formed by a direction of the outgoing ray vector L12B incident from the object point A2 and emitted from the lens peripheral portion O2 of the exit surface LO of the reference lens BL and a direction of the outgoing ray vector L22B incident from the object point A2 and emitted from the lens peripheral portion O2 of the exit surface LO of the prism prescription lens CL is defined as θ2. An angle (deviation angle) formed by a direction of the outgoing ray vector L13B incident from the object point A3 and emitted from the lens peripheral portion O3 of the exit surface LO of the reference lens BL and a direction of the outgoing ray vector L23B incident from the object point A2 and emitted from the lens peripheral portion O3 of the exit surface LO of the prism prescription lens CL is defined as θ3.

In the present embodiment, a shape of the exit surface LO of the prism prescription lens CL is set such that each of the angle θ1, the angle θ2, and the angle θ3 becomes a constant angle θ. The constant angle θ may be, for example, a value of the angle γ itself corresponding to the prescription prism amount or may be a value corresponding to a predetermined ratio of the angle γ. Each difference of the angle θ1, the angle θ2, and the angle θ3 with respect to the angle θ is obtained, and a slope of the exit surface LO of the prism prescription lens is changed so as to eliminate such a difference.

When the entire slope of the exit surface LO including the optical center O of the exit surface LO and the lens peripheral portions θ2 and θ3 of the lens is changed, the incident ray vector L21A rotates so as to be parallel to the incident ray vector L11A constituting the target ray group, and the direction of the outgoing ray vector L21B emitted from the optical center O of the exit surface LO of the prism prescription lens CL also changes. Similarly, the incident ray vector L22A rotates so as to be parallel to the incident ray vector L12A constituting the target ray group, and the direction of the outgoing ray vector L22B emitted from the lens peripheral portion O2 of the exit surface LO of the prism prescription lens CL also changes. The incident ray vector L23A rotates so as to be parallel to the incident ray vector L13A constituting the target ray group, and the direction of the outgoing ray vector L23B emitted from the lens peripheral portion O3 of the exit surface LO of the prism prescription lens CL also changes.

The same simulation is performed for the prism prescription lens whose slope of the exit surface LO has been changed, and eventually, the slope of the exit surface LO of the eyeball-side optical surface is determined so as to obtain the angle θ that minimizes the difference with the angle θ1, the angle θ2 and the angle θ3, ideally, such that each of the angle θ1, the angle θ2, and the angle θ3 becomes the angle θ.

That is, the spectacle lens is designed by a lens surface shape determination step of determining a local slope of the object-side optical surface (entrance surface LI) or the eye-side optical surface (exit surface LO) of each point corresponding to an arbitrary point of the plurality of rays such that a ray vector passing through the same position as the arbitrary point among the plurality of rays constituting the prism ray group is parallel with respect to the target ray group. Incidentally, the above-described slope refers to a slope of the object-side optical surface (entrance surface LI) or the eyeball-side optical surface (exit surface LO).

In addition, the above-described slope is a local slope of each point at arbitrary points corresponding to a plurality of rays, and the above-described slope includes a slope of an optical surface at each of points corresponding to the plurality of arbitrary points.

[Spectacle Lens Designing Method]

The designing method of the present embodiment will be specifically described with reference to FIG. 13.

Figure 13:
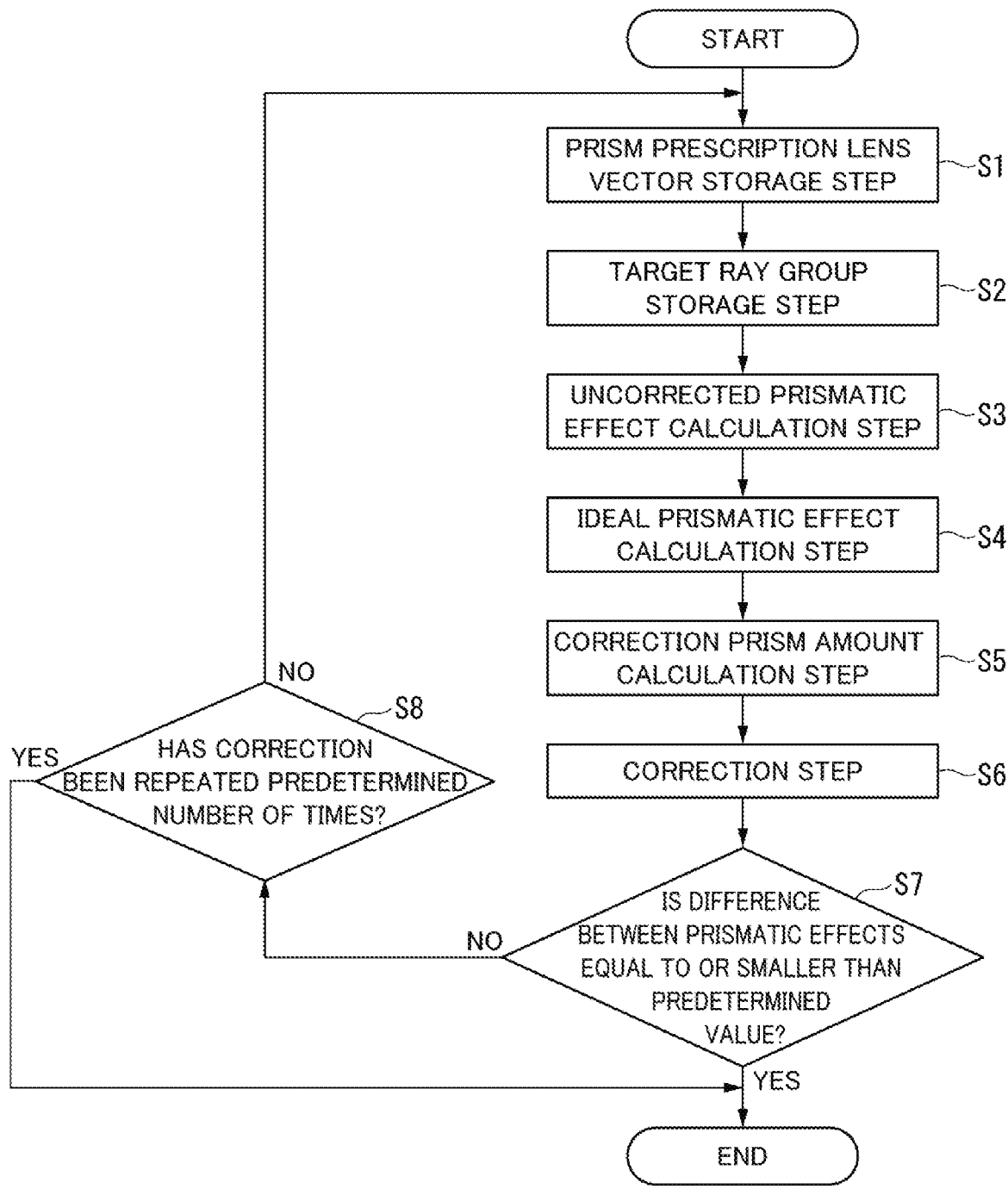
FIG. 13 is a flowchart illustrating a spectacle lens designing method.

As illustrated in a flowchart of FIG. 13, first, a prism prescription lens vector storage step S1 and a target ray group storage step S2 are performed. Incidentally, in the present embodiment, the order of performing the prism prescription lens vector storage step S1 and the target ray group storage step S2 is not limited, and the prism prescription lens vector storage step S1 may be performed after performing the target ray group storage step S2, or both the steps may be performed at the same time.

[Prism Prescription Lens Vector Storage Step]

The prism ray group LCO including a plurality of rays, directed to the eyeball rotation point E among rays emitted from the object points A1, A2, and A3, the rays incident on the prism prescription lens CL and emitted from the eyeball-side optical surface of the prism prescription lens CL, is generated by the data creation unit 34. The data creation unit 34 performs simulation to create the incident ray vectors L21A, L22A, and L23A obtained by making rays incident on the entrance surface LI from the object points A1, A2, and A3 and the outgoing ray vectors L21B, L22B, and L23B of rays emitted from the exit surface LO and directed to the eyeball rotation point E. The created incident ray vectors L21A, L22A, and L23A and outgoing ray vectors L21B, L22B, and L23B are stored in the prism prescription lens vector storage 311 (S1).

[Target Ray Group Storage Step]

The reference ray group LB0 including a plurality of rays, directed to the eyeball rotation point E among the rays emitted from the object points A1, A2, and A3, the rays incident on the reference lens BL and emitted from the reference lens BL, is created. The incident ray vectors L11A, L12A, and L13A in the case of causing a plurality of rays to incident on the reference lens such that the plurality of rays rotated from the outgoing ray vectors L01B, L02B, and L03B, respectively, by the angle γ corresponding to the prescription prism amount are emitted and directed to the eyeball rotation point are created by the data creation unit 34 based on the reference ray group LB0. The data creation unit 34 creates the incident ray vectors L01A, L02A, and L03A and the outgoing ray vectors L01B, L02B, and L03B constituting the reference ray group LB0 by simulation, and further creates the incident ray vectors L11A, L12A, and L13A and the outgoing ray vectors L11B, L12B, and L13B constituting the target ray group and stores these ray vectors in the target ray group storage 312 (S2).

[Uncorrected Prismatic Effect Calculation Step]

The incident ray vector L21A, L22A, and L23A and the outgoing ray vector L21B, L22B, and L23B are called out from the prism prescription lens vector storage 311, and a prismatic effect before correction, that is, of the current reference lens BL is calculated by the uncorrected prismatic effect calculation unit 36 (S3).

[Ideal Prismatic Effect Calculation Step]

After the prism prescription lens vector storage step S1, the outgoing ray vectors L21B, L22B, and L23B and the outgoing ray vectors L11B, L12B, and L13B stored in the target ray group storage step S2 are called out, and the ideal prismatic effect calculation unit 37 calculates a prismatic effect to obtain an ideal outgoing ray to be obtained in the case of causing a ray to enter the prism prescription lens CL (S4). The ideal outgoing ray is an outgoing ray with which the angles θ1, θ2, and θ3, which are formed by directions of the outgoing ray vectors L11B, L12B, and L13B incident from the object points A1, A2, and A3, respectively, and emitted from the exit surface LO of the reference lens BL and directions of the outgoing ray vectors L21B, L22B, and L23B incident from the object points A1, A2, and A3, respectively, and emitted from the exit surface LO of the prism prescription lens CL, become the angle θ. The angle θ is calculated by the ideal prismatic effect calculation unit 37.

[Correction Prism Amount Calculation Step]

The correction prism amount calculation unit 38 calculates a difference between the prismatic effect obtained in the uncorrected prismatic effect calculation step and the prismatic effect obtained in the ideal prismatic effect calculation step, and calculates a correction prism amount for correction of a slope of the exit surface LO based on the difference (S5). That is, the correction prism amount calculation unit 38 calculates a difference between the angle θ1 and the angle θ, a difference between the angle θ2 and the angle θ, and a difference between the angle θ3 and the angle θ.

[Correction Step]

The slope of the exit surface LO is corrected by the correction unit 39 based on the correction prism amount obtained in the correction prism amount calculation step (S6).

That is, the slope of the entire surface including the optical center O of the exit surface LO and the lens peripheral portions O2 and O3 is changed so as to reduce the difference between the angle θ1 and the angle θ, the difference between the angle θ2 and the angle θ, and the difference between the angle θ3 and the angle θ calculated by the correction prism amount calculation unit 38 (see the one-dot chain line LOA in FIG. 5).

[Determination Step]

After the slope of the exit surface LO has been corrected, Steps S1, S3, and S5 are performed based on the exit surface LO, and it is determined whether the difference between the prismatic effects obtained in Step S5, that is, the difference between the angle θ1 and the angle θ, the difference between the angle θ2 and the angle θ, and the difference between the angle θ3 and the angle θ are equal to or smaller than a target value (S7). Here, the target value is appropriately set in accordance with a type, a refractive power, and the like of the spectacle lens. The target value is stored in advance in the memory 31.

If the difference between the prismatic effects is equal to or smaller than the target value (YES), the design is terminated. If the difference between the prismatic effects exceeds the target value (NO), the number of corrections performed in Step S6 is counted, and it is determined whether the counted number is smaller than the predetermined number of corrections (S8).

The predetermined number is appropriately set, for example, three times. The set number is stored in advance in the memory 31. If the counted number is smaller than the predetermined number (YES), Steps S1 to S6 are repeated. When the counted number has reached the predetermined number (NO), the design is terminated.

The spectacle lens designing method having the above configuration is implemented by a computer design program.

EXAMPLES

Specific examples to which the above-described designing method is applied to various spectacle lenses will be described with reference to the drawings.

First, the case of the single vision lens will be described with reference to FIGS. 14A to 23B.

Example 1: Single Vision Aspherical Lens Whose Prism Base Direction is Nose Side (in-Direction), Prism Refractive Power is 2.5 Δ (Prism Diopters), and Spherical Refractive Power S is +3.0 Diopters FIGS. 14A, 14B, and 14C correspond to the example illustrated in FIGS. 2A and 2B.

Figure 14A:
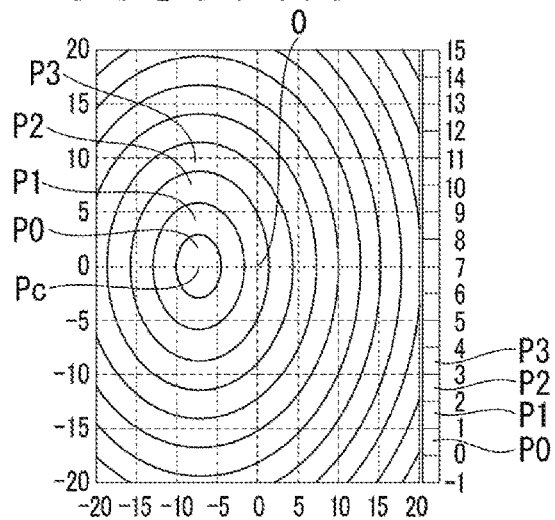
FIG. 14A is a schematic view illustrating a procedure of a single vision lens designing method.

FIG. 14A illustrates a distribution of a prescription prism prescribed with a prism for fixation disparity. Incidentally, FIGS. 16A, 16B, 16C, and the like to be described later correspond to FIGS. 14A, 14B, and 14C, and coordinates of the respective drawings are coordinate positions of the exit surface LO, and the left side of each drawing is the nose side and the right side thereof is the ear side.

A spectacle lens prescribed with the prism of FIG. 14A is a single vision lens whose spherical refractive power S is +3.0 diopters, and 2.5 Δ (prism diopters) is guaranteed as a prism amount ΔP on the nose side (In-direction) at an optical center O.

The prism distribution of FIG. 14A is stored in the prism prescription lens vector storage step S1.

In the prescription prism distribution illustrated in FIG. 14A, the optical center O is the origin (0, 0), a line directed from the origin to each of the nose side and the ear side is an X-direction, and a line directed from the origin to the up and down is a Y direction. The prism amount ΔP at the optical center O is 2.5 Δ (prism diopters). A position Pc which is 8 mm away from the origin to the nose side, that is, a coordinate (−8, 0) is located at the center of the region P0 where the prism amount ΔP is 0 to 1 Δ (prism diopter). Further, an outer side of the region P0 is a region P1 where the prism amount ΔP is 1 to 2 Δ (prism diopters), an outer side of the region P1 is a region P2 where the prism amount ΔP is 2 to 3 Δ (prism diopters), and an outer side of the region P2 is a region P3 where the prism amount ΔP is 2 to 3 Δ (prism diopters).

The prescription prism distribution is an ellipse in which the prism amount ΔP increases in units of 1 Δ (prism diopter) as being directed to the outer side with the position Pc as the center.

Figure 14B:
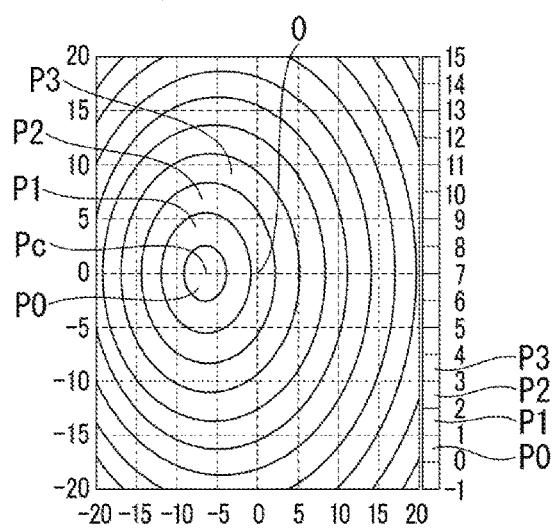
FIG. 14B is a schematic view illustrating the procedure of the single vision lens designing method.

FIG. 14B illustrates a reference prism distribution in the reference lens. The reference prism distribution is an ideal prism distribution, that is, a target distribution. The prism distribution of FIG. 14B is stored in the target ray group storage step S2.

As illustrated in FIG. 14B, the reference prism distribution is symmetrical between the nose side and the ear side at the position Pc which is 8 mm away from the optical center O to the nose side, and is symmetrical in the vertical direction. That is, in the reference prism distribution, a smallest elliptical region including the position Pc is the region P0 of 0 diopter, and an elliptical region having a different diameter is arranged concentrically with the optical center O.

Figure 14C:
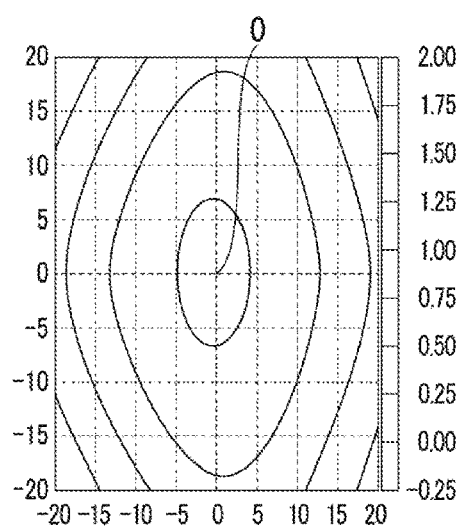
FIG. 14C is a schematic view illustrating the procedure of the single vision lens designing method.

FIG. 14C illustrates a differential prism distribution. The differential prism distribution of FIG. 14C is obtained in the correction prism amount calculation step S5. In other words, the differential prism distribution of FIG. 14C is created by subtracting the "reference prism distribution" illustrated in FIG. 14B from the "prism distribution with the prescription prism" illustrated in FIG. 14A. The slope of the exit surface LO is corrected in the correction step S6 based on the differential prism distribution of FIG. 14C.

In FIG. 14C, in the differential prism distribution, a region including the optical center O is in the range of 0.0 to 0.25 diopter, a prism amount of a region located outside the above region is 0.25 to 0.50 diopter, and a prism amount of a region located outside thereof is 0.50 to 0.75 diopter.

A fact that fixation disparity is resolved by the designing method of the above procedure will be described with reference to FIGS. 15A, 15B, and 15C.

Figure 15A:
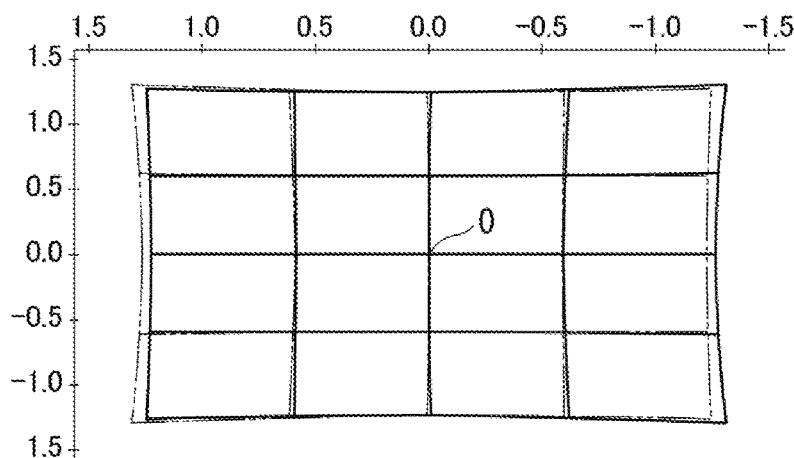
FIG. 15A is a view for describing that an effect can be obtained by the procedure of the designing method in FIGS. 14A, 14B, and 14C.
Figure 15B:
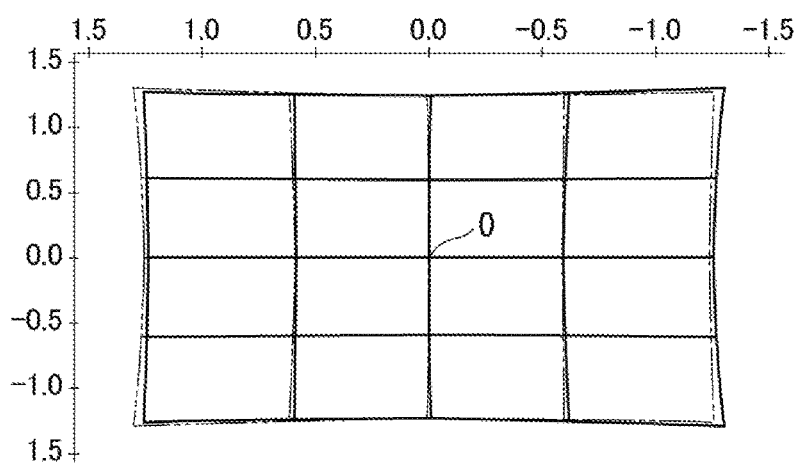
FIG. 15B is a view for describing that the effect can be obtained by the procedure of the designing method in FIGS. 14A, 14B, and 14C.
Figure 15C:
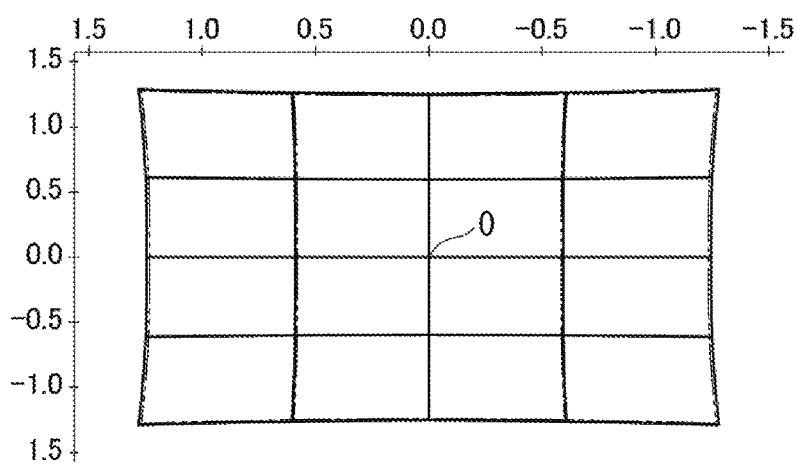
FIG. 15C is a view for describing that the effect can be obtained by the procedure of the designing method in FIGS. 14A, 14B, and 14C.

FIGS. 15A, 15B, and 15C are views obtained by simulation of how a flat plate is viewed in the case of viewing a flat plate located at 5m ahead of an eyeball. It is possible to see distortion caused by the prism and deviation in line of sight between the right and left from FIGS. 15A, 15B, and 15C. Points to be traced in the simulation are set such that an angle between a line connecting a center point of the flat plate and an eyeball center and a line connecting the eyeball center and a viewing position of the flat plate is between −20° and +20° with a pitch of 5°.

In FIGS. 15A, 15B and 15C, the solid line indicates a state viewed by the right eye, and a two-dot chain line indicates a state viewed by the left eye.

FIG. 15C illustrates an ideal state without fixation disparity. In the ideal state, a grid line viewed by the right eye is substantially coincident with a grid line viewed by the left eye. Incidentally, the solid line and the two-dot chain line are illustrated to be intentionally shifted in FIG. 15C for the sake of clarity.

FIG. 15A illustrates a case where the lens before correction, that is, the prism prescription lens is viewed with the left and right eyes. As illustrated in FIG. 15A, deviation between the grid lines viewed by the right eye and the left eye increases as being away from the optical center O indicated by the coordinate (0, 0).

FIG. 15B illustrates a case where the lens after the correction step is viewed with the left and right eyes. Regarding the grid lines viewed through the corrected lens illustrated in FIG. 15B, deviation viewed between the right eye and the left eye is smaller than the deviation in FIG. 15A, and it is understood that this is very close to the ideal state illustrated in FIG. 15C.

Example 2: Single Vision Aspherical Lens Whose Prism Base Direction is Nose Side (in-Direction), Prism Refractive Power is 2.5 Δ (Prism Diopters), and Spherical Refractive Power S is 0 Diopter FIGS. 16A, 16B, and 16C correspond to the example illustrated in FIGS. 3A and 3B.

Figure 16A:
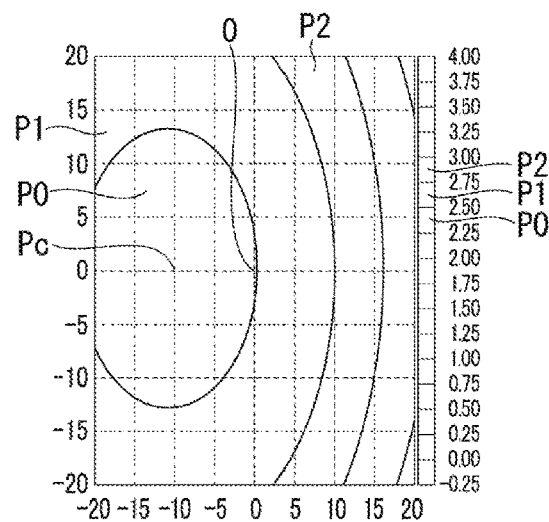
FIG. 16A is a schematic view illustrating a procedure of a single vision lens designing method.

FIG. 16A illustrates a distribution of a prescription prism prescribed with a prism for fixation disparity. In FIG. 16A, a position Pc which is 8 mm away from the optical center O to the nose side, that is, a coordinate (−8, 0) is located at the center of a region P0 where the prism amount ΔP is 2.25 to 2.50 Δ (prism diopters). Further, an outer side of the region P0 is a region P1 where the prism amount ΔP is 2.50 to 2.75 Δ (prism diopters), and an outer side of the region P1 is a region P2 where the prism amount ΔP is 2.75 to 3.00 Δ (prism diopters).

The prism distribution of FIG. 16A is stored in the prism prescription lens vector storage step S1.

Figure 16B:
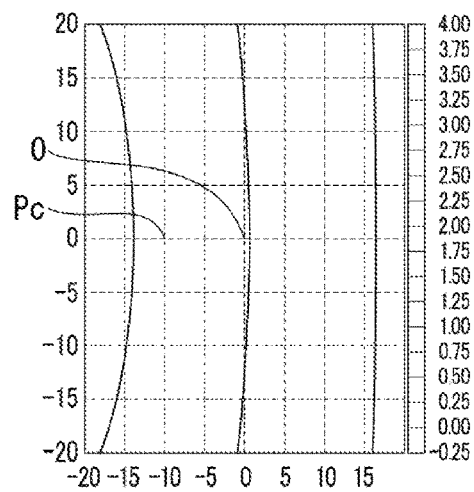
FIG. 16B is a schematic view illustrating the procedure of the single vision lens designing method.

FIG. 16B illustrates a reference prism distribution (target distribution) in the reference lens. In the reference prism distribution, a region including the position Pc is in the range of 2.25 to 2.50 diopters, and the refractive power increases as being located in a region on the ear side, and the refractive power decreases in a region located on the nose side. The prism distribution of FIG. 16B is stored in the target ray group storage step S2.

Figure 16C:
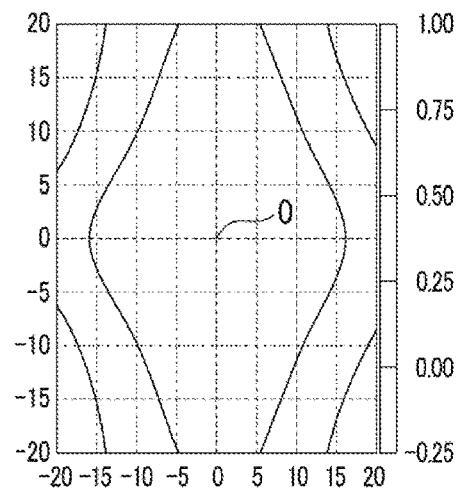
FIG. 16C is a schematic view illustrating the procedure of the single vision lens designing method.

FIG. 16C illustrates a differential prism distribution in the case of a single vision lens. In the differential prism distribution of FIG. 16C, a region including the optical center O is in the range of 0.00 to 0.25 diopter, and an outer side thereof is a region in the range of 0.25 to 0.50 diopter. These regions are substantially symmetrical between the ear side and the nose side with the optical center O as the boundary. The slope of the exit surface LO is corrected in the correction step S6 based on the differential prism distribution of FIG. 16C.

A fact that fixation disparity is resolved by the designing method of the above procedure will be described with reference to FIGS. 17A, 17B, and 17C.

Figure 17A:
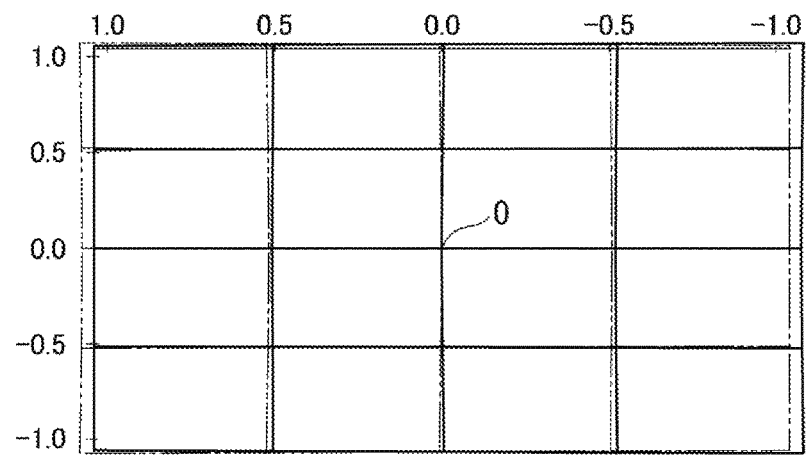
FIG. 17A is a view corresponding to FIG. 15A for describing that an effect can be obtained by the procedure of the designing method in FIGS. 16A, 16B, and 16C.
Figure 17B:
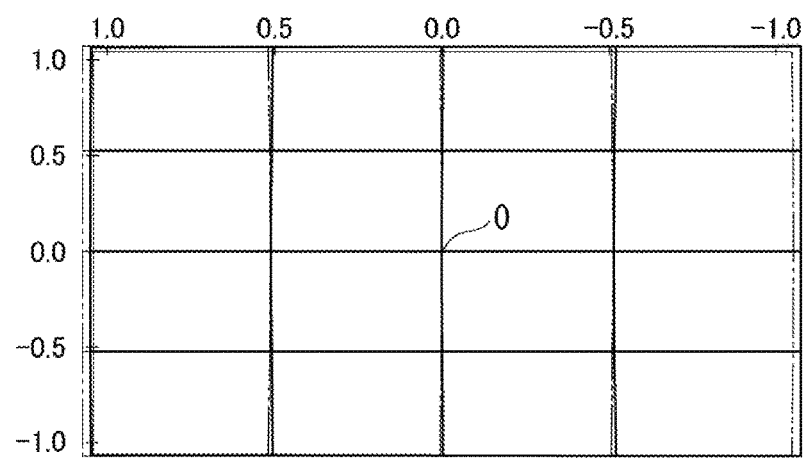
FIG. 17B is a view corresponding to FIG. 15B for describing that the effect can be obtained by the procedure of the designing method for FIGS. 16A, 16B, and 16C.
Figure 17C:
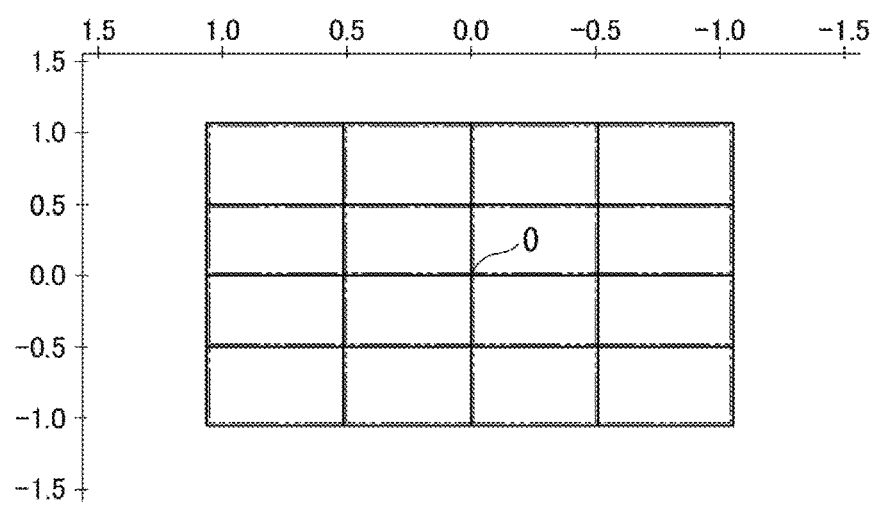
FIG. 17C is a view corresponding to FIG. 15C for describing that the effect can be obtained by the procedure of the designing method for FIGS. 16A, 16B, and 16C.

Since FIG. 17C illustrates an ideal state without fixation disparity, a grid line viewed by the right eye is substantially coincident with a grid line viewed by the left eye. Incidentally, a refractive power is zero in FIG. 17A, the grating has a rectangular shape.

FIG. 17A illustrates a case where the prism prescription lens before correction is viewed with the left and right eyes. As illustrated in FIG. 17A, as the distance from the optical center O indicated by the coordinates (0, 0) increases, deviation between the grid lines viewed by the right eye and the left eye increases. Regarding the grid lines viewed through the corrected lens illustrated in FIG. 17B, deviation viewed between the right eye and the left eye is smaller than the deviation in FIG. 17A, and it is understood that this is very close to the ideal state illustrated in FIG. 17C.

Example 3: Single Vision Aspherical Lens Whose Prism Base Direction is Nose Side (in-Direction), Prism Refractive Power is 2.5 Δ (Prism Diopters), and Spherical Refractive Power S is −3.0 Diopters FIGS. 18A, 18B, and 18C correspond to the example illustrated in FIGS. 4A and 4B.

Figure 18A:
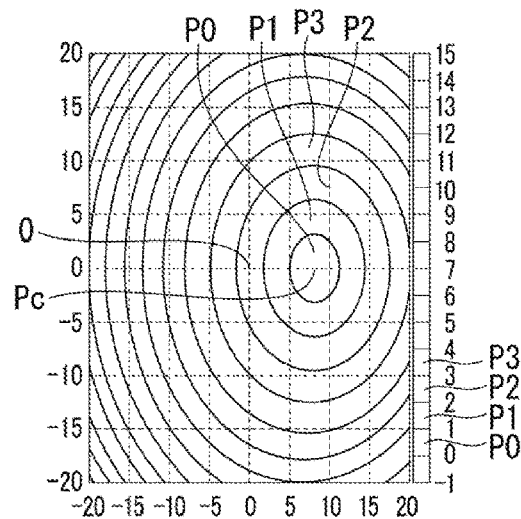
FIG. 18A is a schematic view illustrating a procedure of a single vision lens designing method.

In FIG. 18A, a position Pc which is 8 mm away from the optical center O to the ear side, that is, a coordinate (8, 0) is a center position of a region P0 where the prism amount ΔP is 0 to 1 Δ (prism diopter). Further, an outer side of the region P0 is a region P1 where the prism amount ΔP is 1.0 to 2.0 Δ (prism diopters), an outer side of the region P1 is a region P2 where the prism amount ΔP is 2.0 to 3.0 Δ (prism diopters), and an outer side of the region P2 is a region P3 where the prism amount ΔP is 3.0 to 4.0 Δ (prism diopters). The prism distribution of FIG. 18A is stored in the prism prescription lens vector storage step S1.

Figure 18B:
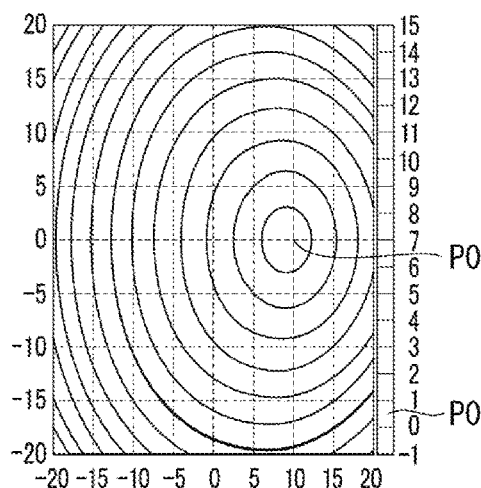
FIG. 18B is a schematic view illustrating the procedure of the single vision lens designing method.

FIG. 18B illustrates a reference prism distribution in the reference lens.

In the reference prism distribution in the single vision lens, the smallest region P0 including a coordinate (10, 0) is a region P0 in the range of 0 to 1 diopter, and elliptical regions each having a larger diameter at each pitch of 1 diopter are arranged concentrically with the region P0. The prism distribution in FIG. 18B is stored in the target ray group storage step S2.

Figure 18C:
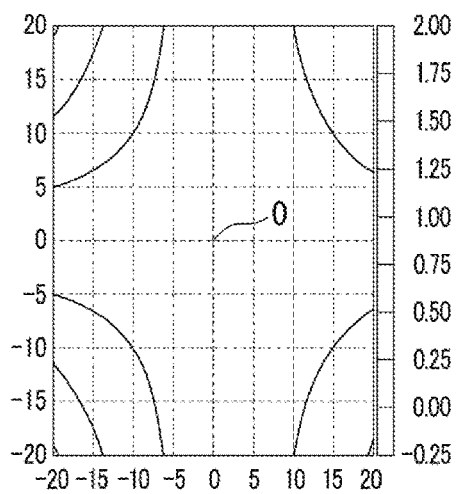
FIG. 18C is a schematic view illustrating the procedure of the single vision lens designing method.

FIG. 18C illustrates a differential prism distribution. In the differential prism distribution of FIG. 18C, a region including the optical center O is in the range of 0.00 to 0.25 diopter, and an outer side thereof is a region in the range of 0.25 to 0.50 diopter. The slope of the exit surface LO is corrected in the correction step S6 based on the differential prism distribution of FIG. 18C.

A fact that fixation disparity is resolved by the designing method of the above procedure will be described with reference to FIGS. 19A, 19B, and 19C.

Figure 19A:
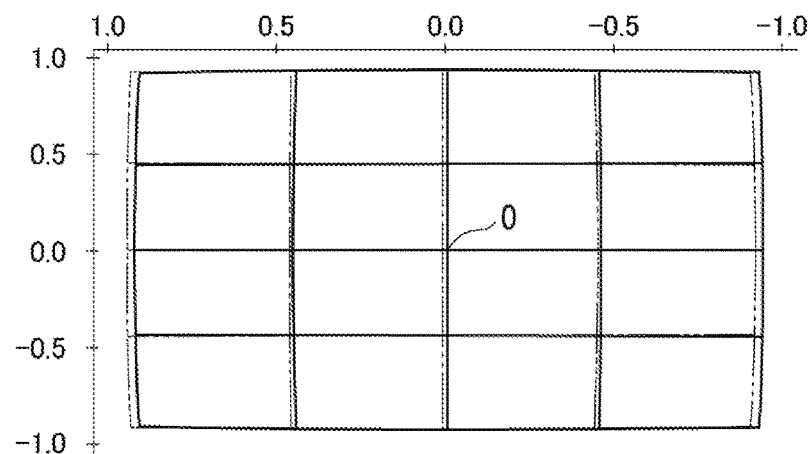
FIG. 19A is a view corresponding to FIG. 15A for describing that an effect can be obtained by the procedure of the designing method in FIGS. 18A, 18B, and 18C.
Figure 19B:
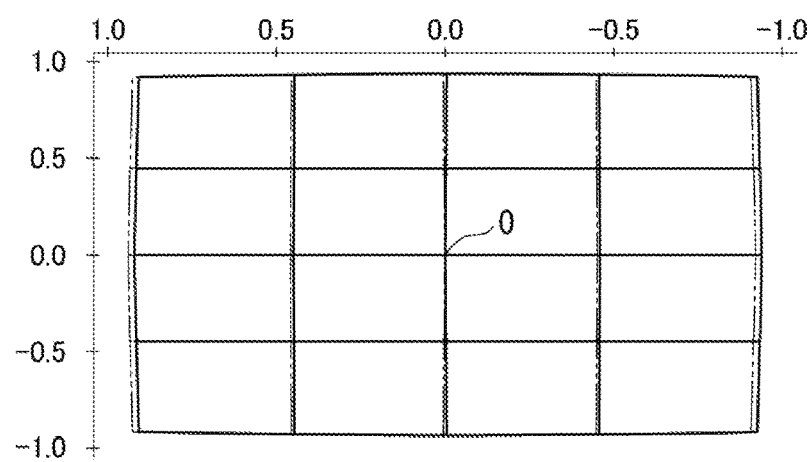
FIG. 19B is a view corresponding to FIG. 15B for describing that the effect can be obtained by the procedure of the designing method in FIGS. 18A, 18B, and 18C.
Figure 19C:
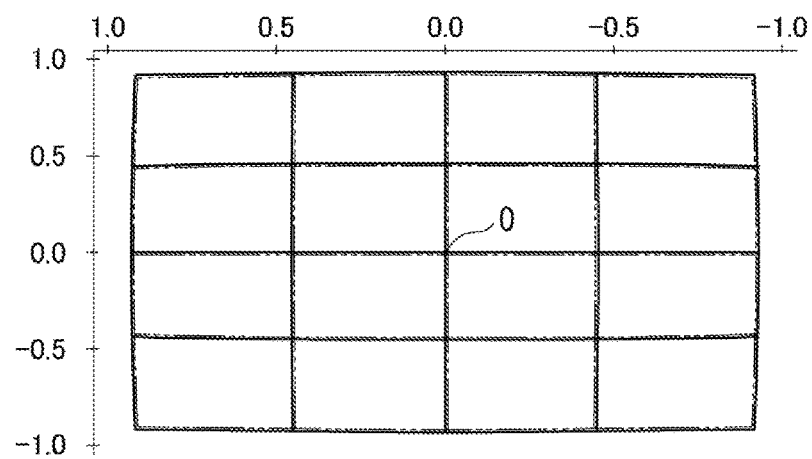
FIG. 19C is a view corresponding to FIG. 15C for describing that the effect can be obtained by the procedure of the designing method in FIGS. 18A, 18B, and 18C.

Since FIG. 19C illustrates an ideal state without fixation disparity, a grid line viewed by the right eye is substantially coincident with a grid line viewed by the left eye.

FIG. 19A illustrates a case where the prism prescription lens is viewed with the left and right eyes. As illustrated in FIG. 19A, deviation between the grid lines viewed by the right eye and the left eye increases as being away from the coordinate (0, 0) to the outer side. Regarding the grid lines viewed through the corrected lens illustrated in FIG. 19B, deviation viewed between the right eye and the left eye is smaller than the deviation in FIG. 19A, and it is understood that this is very close to the ideal state illustrated in FIG. 19C.

Example 4: Single Vision Aspherical Lens Whose Prism Base Direction is Ear Side (Out-Direction) and Prism Refractive Power is 2.5 Δ (Prism Diopters)

Although examples illustrated in FIGS. 14A to 19C are examples in which the prism amount ΔP of 2.5 diopters is guaranteed on the nose side (In-direction) with respect to the optical center O, the same result was generated when simulation was performed in the same manner in an example in which the prism amount ΔP of 2.5 Δ (prism diopters) is guaranteed on the ear side (Out-direction) with respect to the optical center O. This is because the nose side and the ear side are reversed with the optical center O interposed therebetween in the example where the prism amount ΔP of 2.5 Δ (prism diopters) is guaranteed on the ear side (Out-direction) with respect to the optical center O as compared with the prism distribution diagrams illustrated in FIGS. 14A, 14B, 14C, 16A, 16B, 16C, 18A, 18B, and 18C.

FIGS. 20A to 24C illustrate examples in which the prism base direction is the lower side (Down-direction).

In these examples, the prism base direction is the Y direction (see FIG. 1), and one side region has a larger mean value of mean curvatures than the other region with the X direction orthogonal to the Y direction as a boundary. The mean curvature is measured along a straight line passing through the optical center O in the Y direction.

Figure 20A:
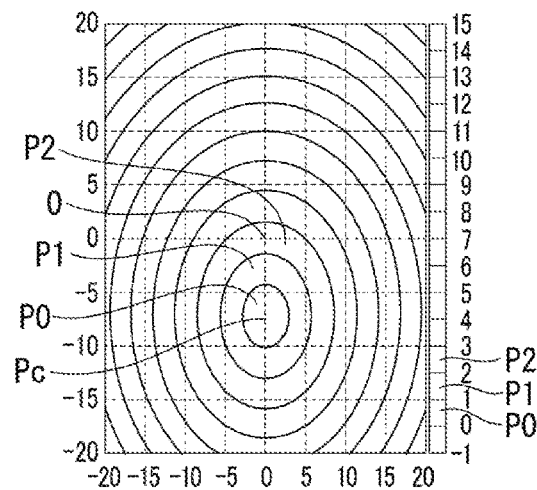
FIG. 20A is a schematic view illustrating a procedure of a single vision lens designing method.

Example 5: Single Vision Aspherical Lens Whose Prism Base Direction is Lower Side (Down-Direction), Prism Refractive Power is 2.5 Δ (Prism Diopters), and Spherical Refractive Power S is +3.0 Diopters In FIG. 20A, a position Pc which is 8 mm away from the optical center O to the lower side, that is, a coordinate (0, −8) is a center position of a region P0 where the prism amount ΔP is 0 to 1 Δ (prism diopter). Further, an outer side of the region P0 is a region P1 in the range of 1 to 2 Δ (prism diopters), and an outer side of the region P1 is a region P2 in the range of 2 to 3 Δ (prism diopters). The prism distribution of FIG. 20A is stored in the prism prescription lens vector storage step S1.

Figure 20B:
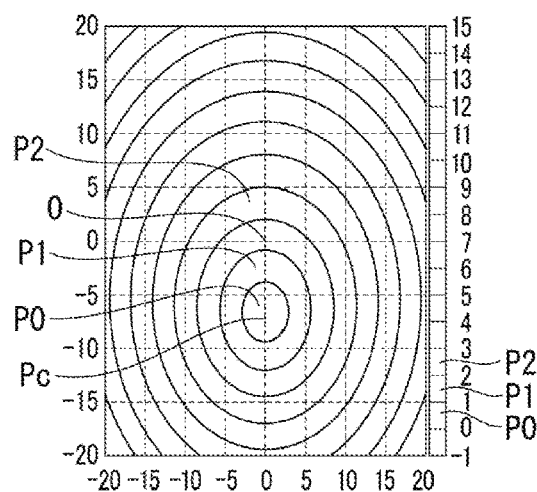
FIG. 20B is a schematic view illustrating the procedure of the single vision lens designing method.

FIG. 20B illustrates a reference prism distribution (target distribution) in the reference lens. In the reference prism distribution, a region including a position Pc is a region P0 in the range of 0 to 1 diopter. Ellipse regions with a larger pitch each by 1 diopter are arranged concentrically with the region P0. The prism distribution in FIG. 20B is stored in the target ray group storage step S2.

Figure 20C:
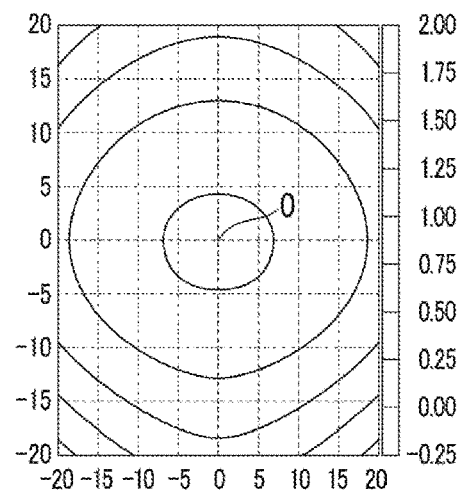
FIG. 20C is a schematic view illustrating the procedure of the single vision lens designing method.

FIG. 20C illustrates a differential prism distribution in the case of a single vision lens. In the differential prism distribution of FIG. 20C, a region including the optical center O is in the range of 0.00 to 0.25 diopter, and an outer side thereof is a region in the range of 0.25 to 0.50 diopter. These regions are substantially symmetrical between the ear side and the nose side with the optical center O as the boundary.

The slope of the exit surface LO is corrected in the correction step S6 based on the differential prism distribution of FIG. 20C.

A fact that fixation disparity is resolved by the designing method of the above procedure will be described with reference to FIGS. 21A and 21B.

Figure 21A:
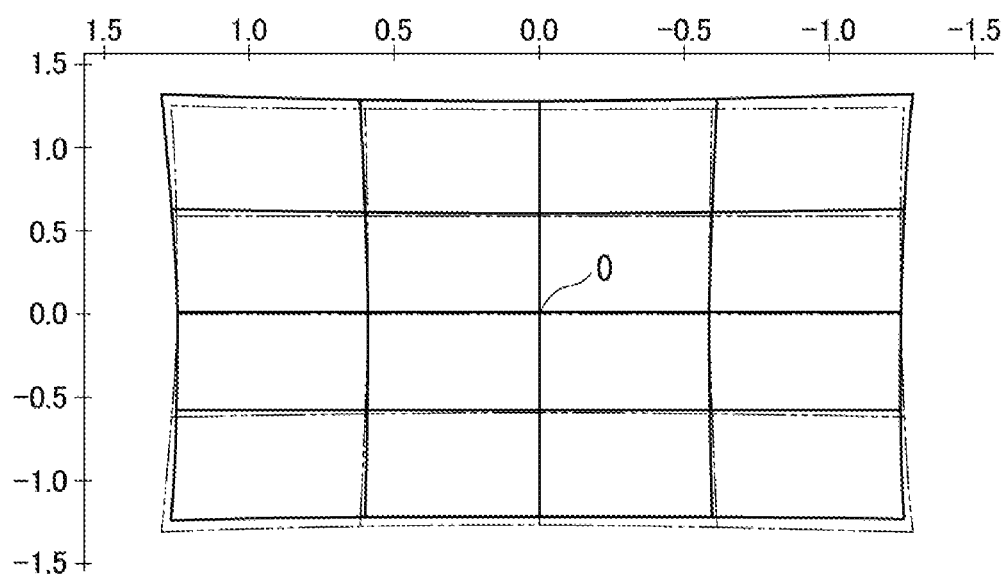
FIG. 21A is a view corresponding to FIG. 15A for describing that an effect can be obtained by the procedure of the designing method in FIGS. 20A, 20B, and 20C.
Figure 21B:
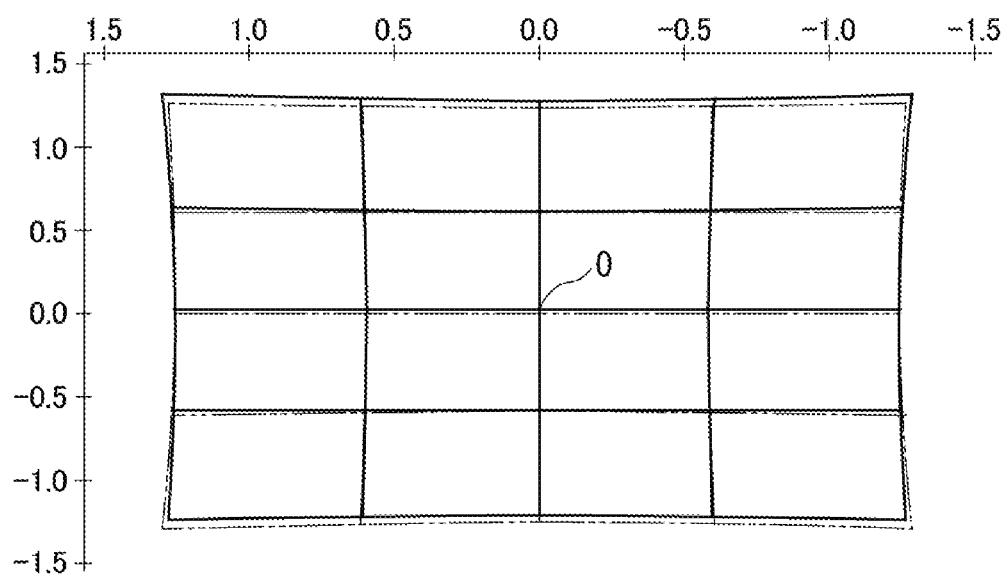
FIG. 21B is a view corresponding to FIG. 15B for describing that the effect can be obtained by the procedure of the designing method in FIGS. 20A, 20B, and 20C.

FIG. 21A illustrates a case where the lens before correction, that is, the prism prescription lens is viewed with the left and right eyes. As illustrated in FIG. 21A, deviation between the grid lines viewed by the right eye and the left eye increases as being away from the optical center O indicated by the coordinate (0, 0). FIG. 21B illustrates a case where the lens after the correction step is viewed with the left and right eyes. Regarding the grid lines viewed through the corrected lens illustrated in FIG. 21B, it is understood that deviation viewed between the right eye and the left eye is smaller than the deviation in FIG. 21A.

Figure 22A:
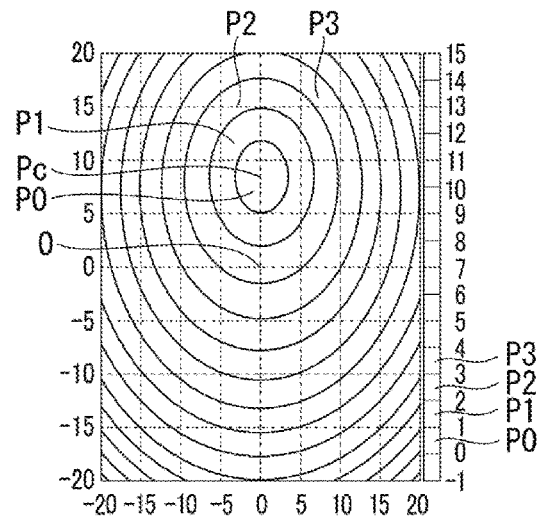
FIG. 22A is a schematic view illustrating a procedure of a single vision lens designing method.

Example 6: Single Vision Aspherical Lens Whose Prism Base Direction is Lower Side (Down-Direction), Prism Refractive Power is 2.5 Δ (Prism Diopters), and Spherical Refractive Power S is −3.0 Diopters In FIG. 22A, a position Pc which is 8 mm away from the optical center O to the upper side, that is, a coordinate (0, 8) is the center of a region P0 in the range of 0 to 1 diopter. Further, an outer side of the region P0 is a region P1 in the range of 1 to 2 diopters, and an outer side of the region P1 is a region P2 in the range of 2 to 3 diopters. The prism distribution of FIG. 22A is stored in the prism prescription lens vector storage step S1.

Figure 22B:
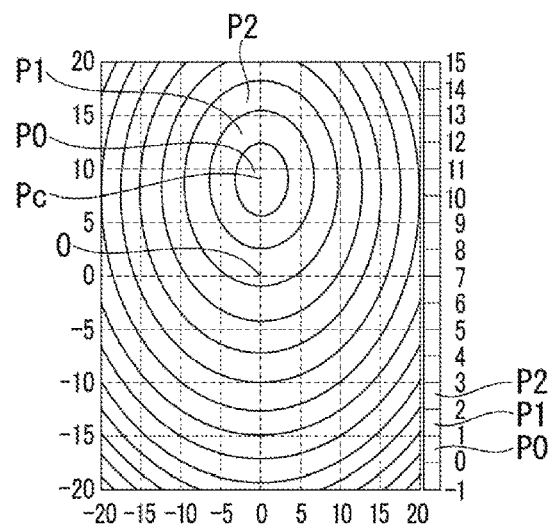
FIG. 22B is a schematic view illustrating the procedure of the single vision lens designing method.

FIG. 22B illustrates a reference prism distribution (target distribution). In the reference prism distribution, a region including the position Pc is in the range of 0 to 1 diopter, and the refractive power increases as being located in a region on the ear side, and the refractive power decreases in a region located on the nose side. The prism distribution in FIG. 22B is stored in the target ray group storage step S2.

Figure 22C:
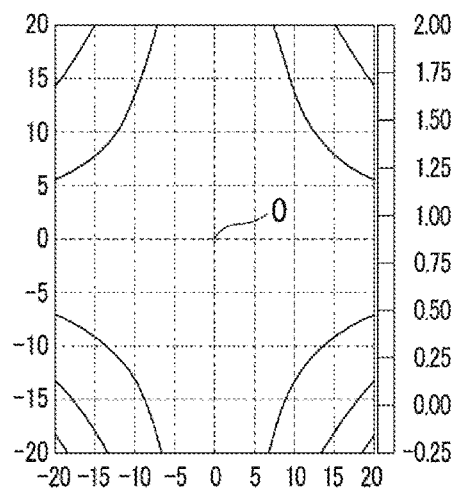
FIG. 22C is a schematic view illustrating the procedure of the single vision lens designing method.

FIG. 22C illustrates a differential prism distribution. In the differential prism distribution of FIG. 22C, a region including the optical center O is in the range of 0.00 to 0.25 diopter, and an outer side thereof is a region in the range of 0.25 to 0.50 diopter. The slope of the exit surface LO is corrected in the correction step S6 based on the differential prism distribution of FIG. 22C.

A fact that fixation disparity is resolved by the designing method of the above procedure will be described with reference to FIGS. 23A and 23B.

Figure 23A:
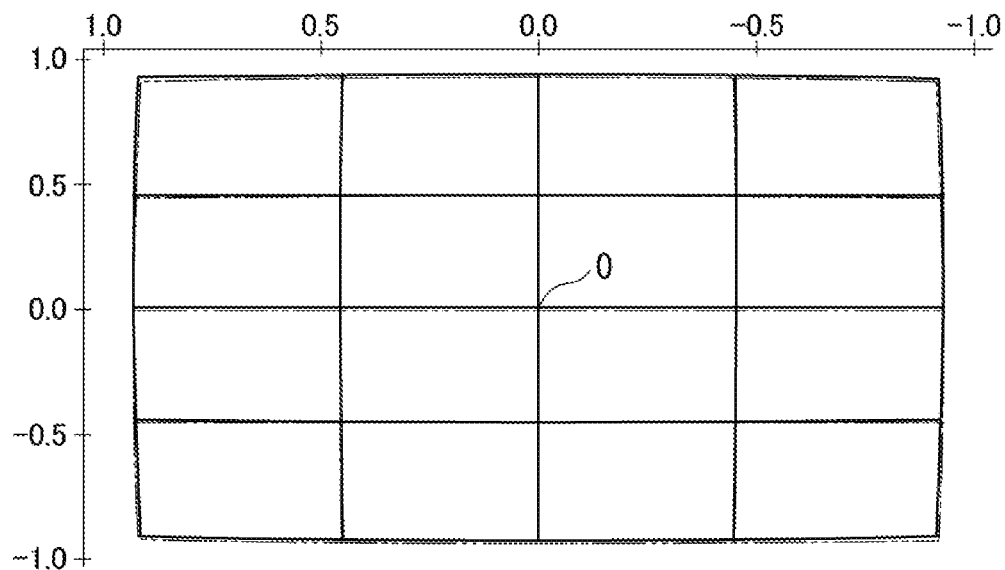
FIG. 23A is a view corresponding to FIG. 15A for describing that an effect can be obtained by the procedure of the designing method in FIGS. 22A, 22B, and 22C.
Figure 23B:
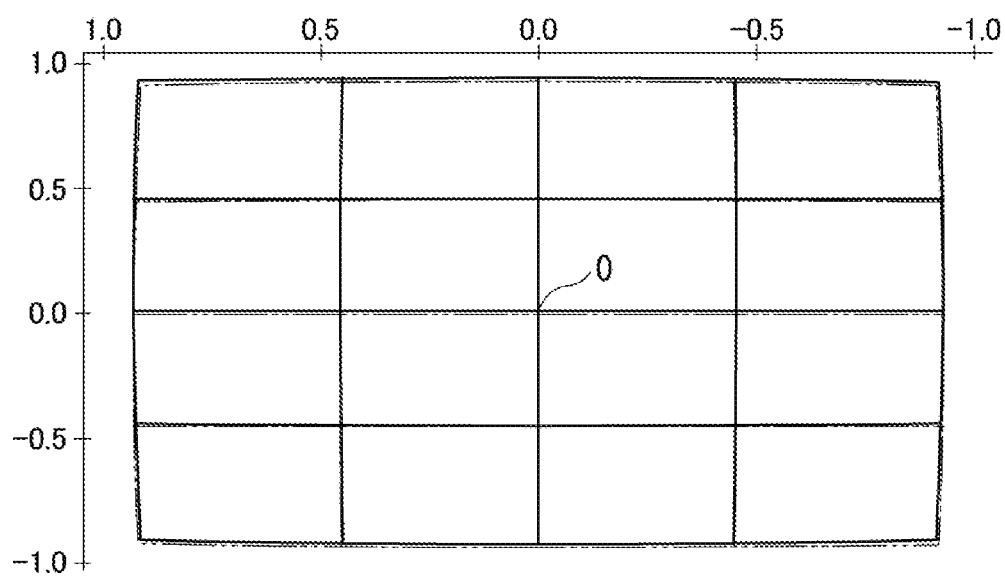
FIG. 23B is a view corresponding to FIG. 15B for describing that an effect can be obtained by the procedure of the designing method in FIGS. 22A, 22B, and 22C.

FIG. 23A illustrates a case where the lens before correction is viewed with the left and right eyes. As the distance from the optical center O increases, the shift of the grid lines viewed by the right eye and the left eye increases. FIG. 23B illustrates a case where the lens after the correction step is viewed with the left and right eyes. Regarding the grid lines viewed through the corrected lens illustrated in FIG. 23B, it is understood that deviation viewed between the right eye and the left eye is smaller than the deviation in FIG. 23A.

Example 7: Single Vision Aspherical Lens Whose Prism Base Direction is Upper Side (Up-Direction) and Prism Refractive Power is 2.5 Δ (Prism Diopters)

Although the examples illustrated in FIGS. 20A to 23B are examples in which the prism amount ΔP of 2.5 Δ (prism diopters) is guaranteed on the lower side (Down-direction) with respect to the optical center O, the same simulation result was generated even in an example in which the prism amount ΔP of 2.5 Δ (prism diopters) is guaranteed on the upper side (Up-direction) with respect to the optical center O. This is because the up and down are merely reversed with the optical center O as the boundary in the example where the prism amount ΔP of 2.5 Δ (prism diopters) is guaranteed on the upper side with respect to the optical center O as compared with the prism distribution diagrams illustrated in FIGS. 20A, 20B, 20C, 22A, 22B, and 22C.

Next, the case of the progressive power lens will be described with reference to FIGS. 24A to 37B. The progressive power lens is a lens with an addition power ADD of 2.50 diopters.

Example 8: Progressive Power Lens Whose Prism Base Direction is Nose Side (in-Direction), Prism Refractive Power is 2.5 Δ (Prism Diopters), Spherical Refractive Power S is +3.0 Diopters, Addition Power ADD is 2.5 Diopters, and Progressive Length is 14 mm FIGS. 24A, 24B, and 24C correspond to the example illustrated in FIG. 5.

Figure 24A:
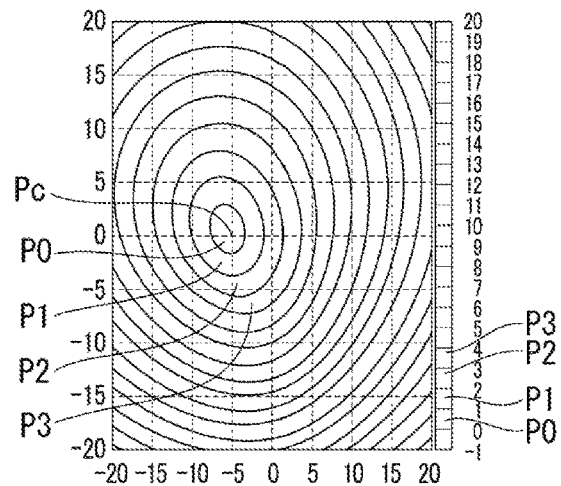
FIG. 24A is a schematic view illustrating a procedure of a progressive power lens designing method.

In a prescription prism distribution illustrated in FIG. 24A, when a prism amount ΔP at the origin of the coordinate (0, 0) is Pa, Pa is 2.5 Δ (prism diopters). A position Pc which is 5 mm away from the origin to the nose side, that is, a coordinate (−5, 0) is the center of the region P0 where the prism amount ΔP is 0 to 1 Δ (prism diopter). Further, an outer side of the region P0 is a region P1 where the prism amount ΔP is 1 to 2 Δ (prism diopters), an outer side of the region P1 is a region P2 where the prism amount ΔP is 2 to 3 Δ (prism diopters), and an outer side of the region P2 is a region P3 where the prism amount ΔP is 2 to 3 Δ (prism diopters). In the prescription prism distribution, the prism amount ΔP increases in units of 1 Δ (prism diopter) as being directed to the outer side with the position Pc as the center. The prism distribution of FIG. 24A is stored in the prism prescription lens vector storage step S1.

Figure 24B:
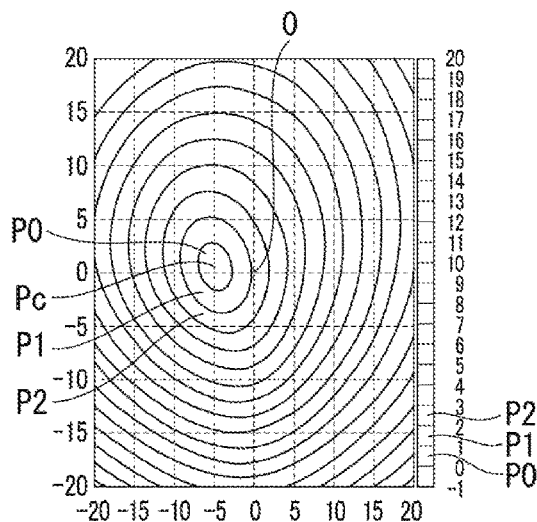
FIG. 24B is a schematic view illustrating the procedure of the progressive power lens designing method.

FIG. 24B illustrates a reference prism distribution in the reference lens.

In the reference prism distribution, the smallest elliptical region including a position Pc, which is 5 mm away from the origin on the nose side, is a region P0 in the range of 0 to 1 diopter, and elliptical regions having different diameters are arranged concentrically with the prism measurement reference point (same position as the origin) as illustrated in FIG. 24B. The prism distribution in FIG. 24B is stored in the target ray group storage step S2.

Figure 24C:
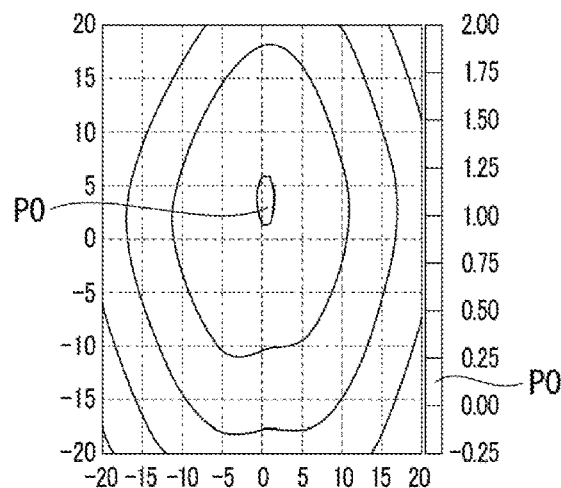
FIG. 24C is a schematic view illustrating the procedure of the progressive power lens designing method.

In FIG. 24C, in the differential prism distribution, a region including a position (coordinates (0, 3)), at 3 mm above the origin is in the range of 0.0 to 0.25 diopter, a prism amount of a region located outside the above region is 0.25 to 0.50 diopter, and a prism amount of a region located outside thereof is 0.50 to 0.75 diopter.

The differential prism distribution illustrated in FIG. 24C is obtained in the correction prism amount calculation step S5.

Figure 25A:
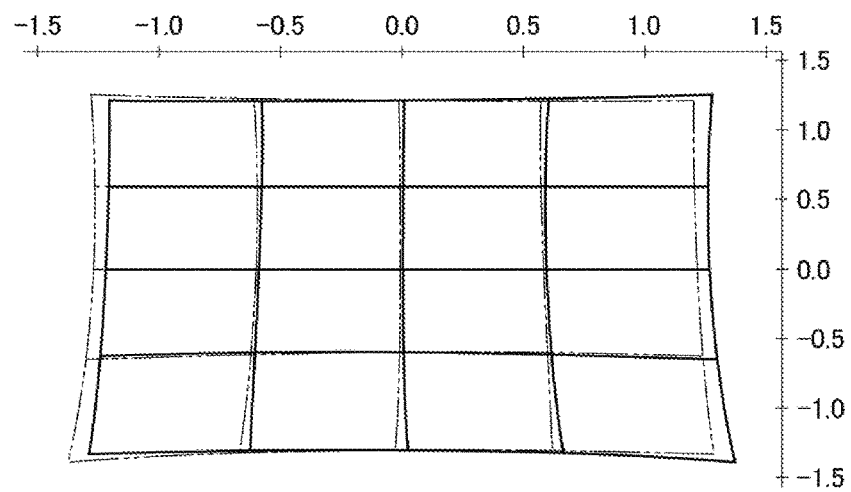
FIG. 25A is a view corresponding to FIG. 15A for describing that an effect can be obtained by the procedure of the designing method in FIGS. 24A, 24B, and 24C.
Figure 25B:
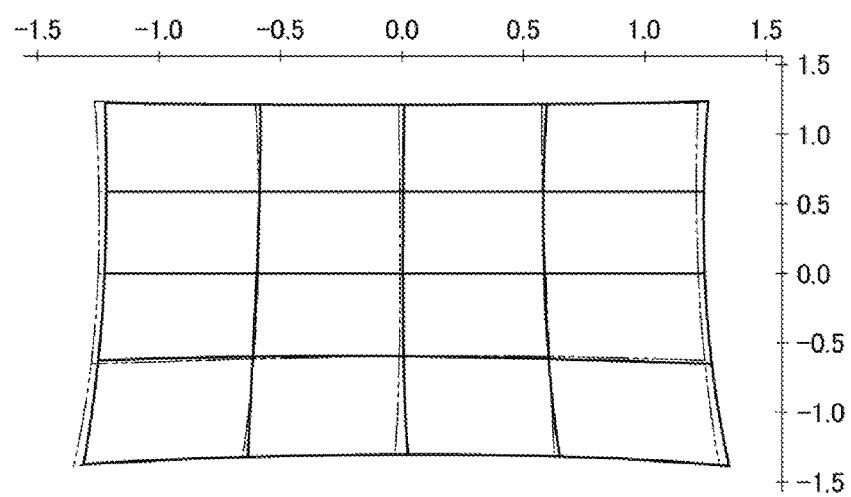
FIG. 25B is a view corresponding to FIG. 15B for describing that the effect can be obtained by the procedure of the designing method in FIGS. 24A, 24B, and 24C.
Figure 25C:
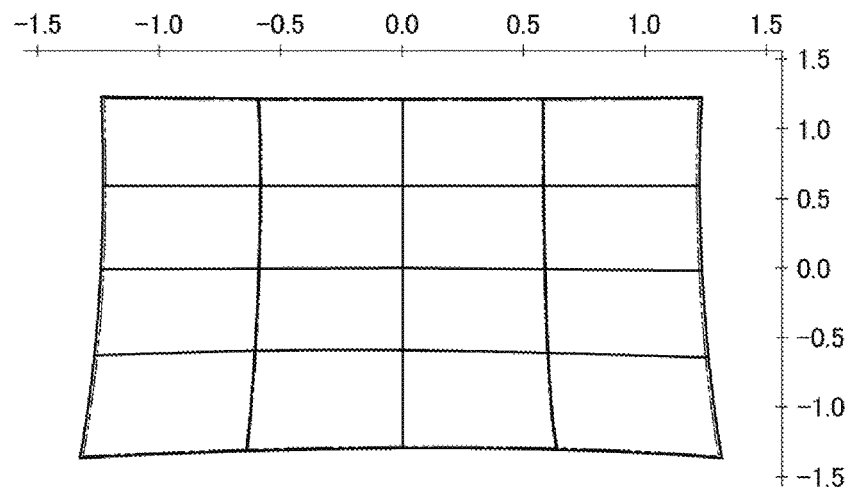
FIG. 25C is a view corresponding to FIG. 15C for describing that the effect can be obtained by the procedure of the designing method in FIGS. 24A, 24B, and 24C.

FIG. 25C illustrates an ideal state without fixation disparity, and a grid line viewed by the right eye is substantially coincident with a grid line viewed by the left eye.

FIG. 25A illustrates a case where the lens before correction is viewed with the left and right eyes. As illustrated in FIG. 25A, deviation between the grid lines viewed by the right eye and the left eye increases as being away from the origin of the coordinate (0, 0).

FIG. 25B illustrates a case where the lens after the correction step is viewed with the left and right eyes. Regarding the grid lines viewed through the corrected lens illustrated in FIG. 25B, deviation viewed between the right eye and the left eye is smaller than the deviation in FIG. 25A, and it is understood that this is very close to the ideal state illustrated in FIG. 25C.

Example 9: Progressive Power Lens Whose Prism Base Direction is Nose Side (in-Direction), Prism Refractive Power is 2.5 Δ (Prism Diopters), Spherical Refractive Power S is −3.0 Diopters, Addition Power ADD is 2.5 Diopters, and Progressive Length is 14 mm FIGS. 26A, 26B, and 26C correspond to the example illustrated in FIG. 7.

Figure 26A:
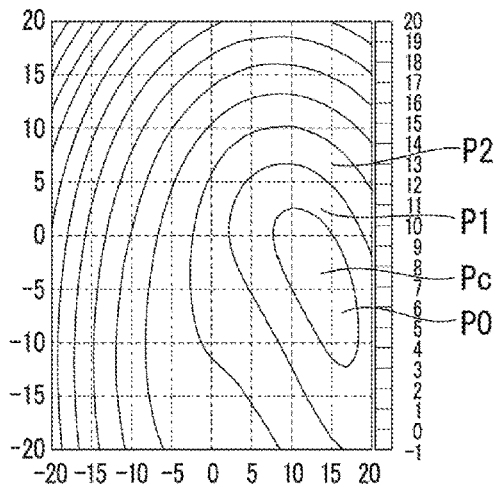
FIG. 26A is a schematic view illustrating a procedure of a progressive power lens designing method.

In FIG. 26A, a position Pc of a coordinate (12, −3) is the center of a region P0 in the range of 0 to 1 diopter. The prism distribution of FIG. 26A is stored in the prism prescription lens vector storage step S1.

Figure 26B:
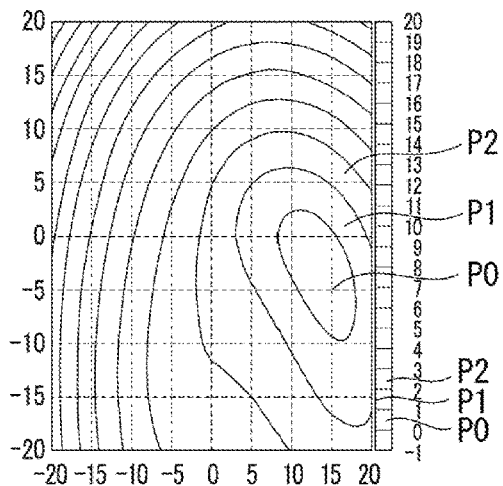
FIG. 26B is a schematic view illustrating the procedure of the progressive power lens designing method.

In the reference prism distribution illustrated in FIG. 26B, the smallest region P0 including a coordinate (12, −3) is a region P0 in the range of 0 to 1 diopter, and elliptical regions having different diameters increasing at each pitch of 1 diopter are arranged concentrically with the region P0. The prism distribution in FIG. 26B is stored in the target ray group storage step S2.

Figure 26C:
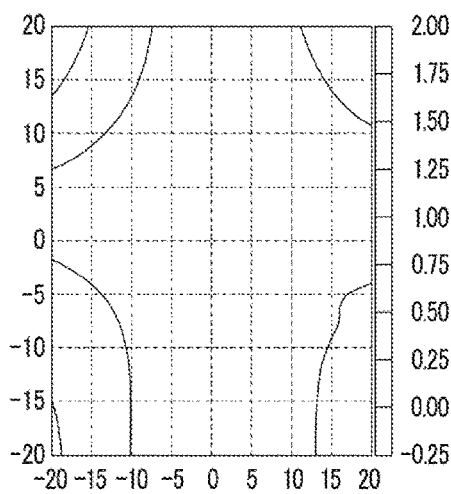
FIG. 26C is a schematic view illustrating the procedure of the progressive power lens designing method.

In a differential prism distribution illustrated in FIG. 26C, a region including the origin of the coordinate (0, 0) is in the range of 0.00 to 0.25 diopter, and an outer side thereof is a region in the range of 0.25 to 0.50 diopter. The differential prism distribution illustrated in FIG. 26C is obtained in the correction prism amount calculation step S5.

A fact that fixation disparity is resolved by the designing method of the above procedure will be described with reference to FIGS. 27A, 27B, and 27C.

Figure 27A:
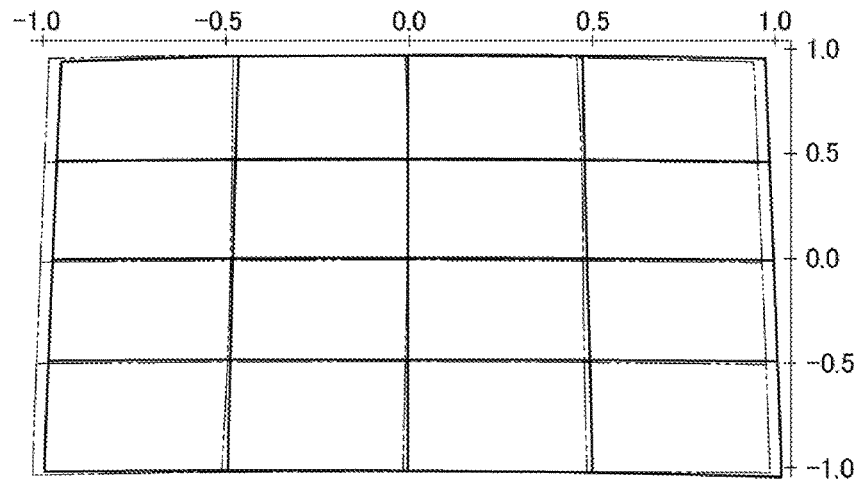
FIG. 27A is a view corresponding to FIG. 15A for describing that an effect can be obtained by the procedure of the designing method in FIGS. 26A, 26B, and 26C.
Figure 27B:
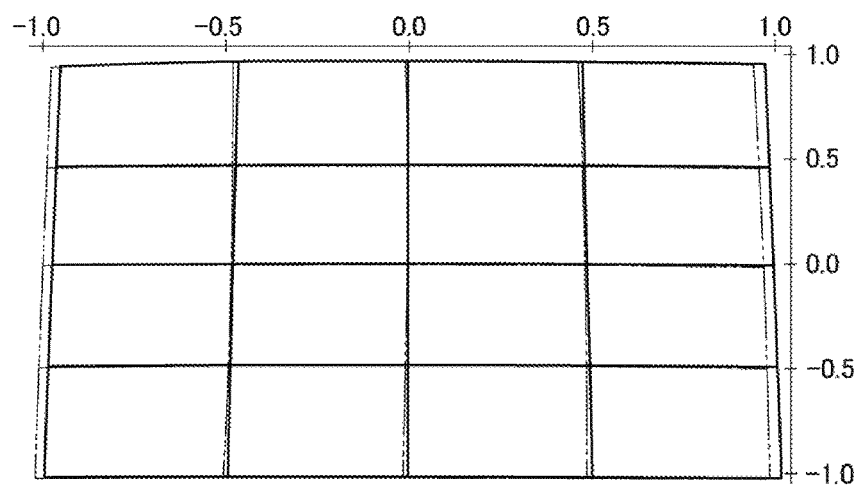
FIG. 27B is a view corresponding to FIG. 15B for describing that the effect can be obtained by the procedure of the designing method in FIGS. 26A, 26B, and 26C.
Figure 27C:
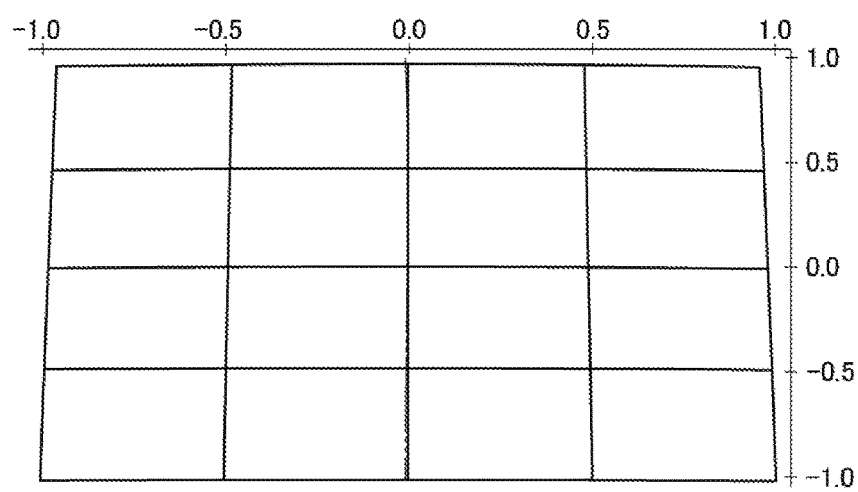
FIG. 27C is a view corresponding to FIG. 15C for describing that the effect can be obtained by the procedure of the designing method in FIGS. 26A, 26B, and 26C.

Since FIG. 27C illustrates an ideal state without fixation disparity, a grid line viewed by the right eye is substantially coincident with a grid line viewed by the left eye.

FIG. 27A illustrates a case where the prism prescription lens is viewed with the left and right eyes, and deviation between the grid lines viewed by the right eye and the left eye increases as being away from the coordinate (0, 0) to the outer side. It is understood that the grid lines viewed through the corrected lens illustrated in FIG. 27B are very close to the ideal state illustrated in FIG. 27C.

Example 10: Progressive Power Lens Whose Prism Base Direction is Ear Side (Out-Direction), Prism Refractive Power is 2.5 Δ (Prism Diopters), Spherical Refractive Power S is −3.0 Diopters, Addition Power ADD is 2.5 Diopters, and Progressive Length is 14 mm FIGS. 28A, 28B, and 28C correspond to the example illustrated in FIG. 10.

Figure 28A:
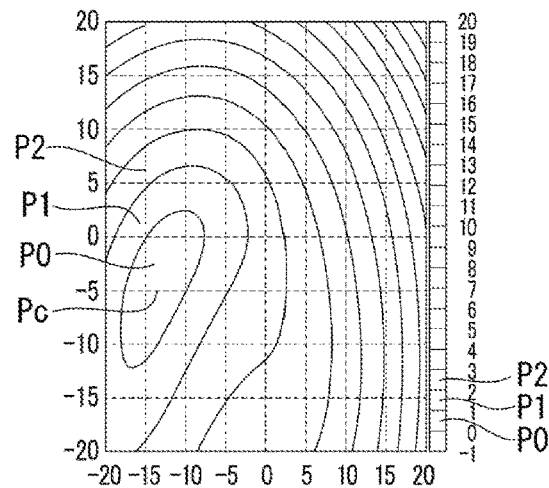
FIG. 28A is a schematic view illustrating a procedure of a progressive power lens designing method.

In FIG. 28A, a position Pc of a coordinate (−12, −5) is the center of a region P0 in the range of 0 to 1 diopter. The prism distribution of FIG. 28A is stored in the prism prescription lens vector storage step S1.

Figure 28B:
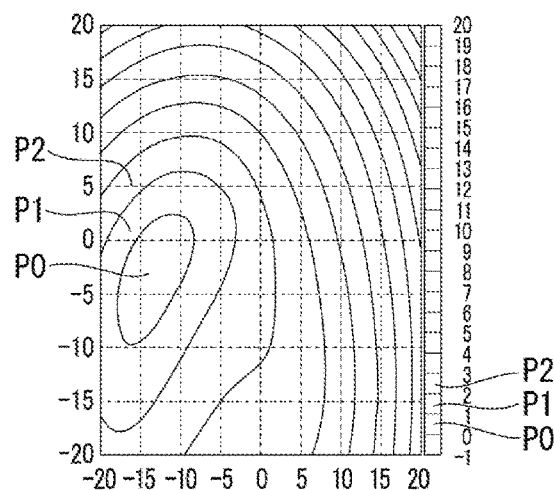
FIG. 28B is a schematic view illustrating the procedure of the progressive power lens designing method.

In the reference prism distribution illustrated in FIG. 28B, the smallest region P0 including a coordinate (12, −3) is a region P0 in the range of 0 to 1 diopter, and elliptical regions having different diameters increasing at each pitch of 1 diopter are arranged concentrically with the region P0. The prism distribution in FIG. 28B is stored in the target ray group storage step S2.

Figure 28C:
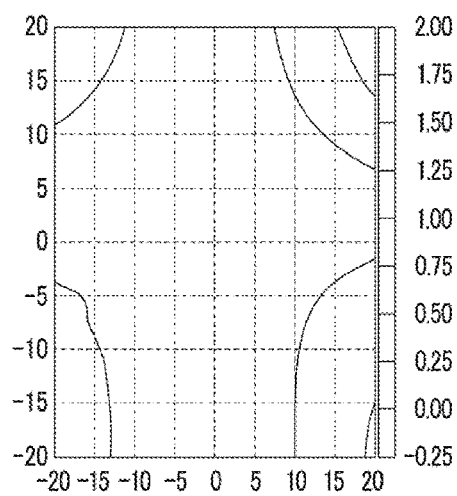
FIG. 28C is a schematic view illustrating the procedure of the progressive power lens designing method.

In a differential prism distribution illustrated in FIG. 28C, a region including the coordinate (0, 0) is in the range of 0.00 to 0.25 diopter, and an outer side thereof is a region in the range of 0.25 to 0.50 diopter. The differential prism distribution illustrated in FIG. 28C is obtained in the correction prism amount calculation step S5.

Figure 29A:
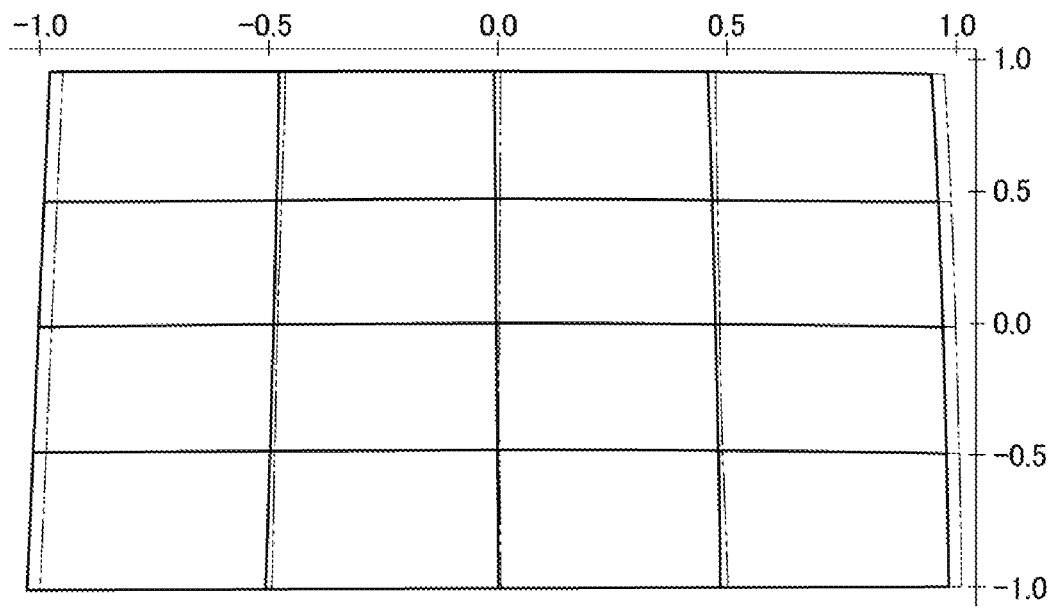
FIG. 29A is a view corresponding to FIG. 15A for describing that an effect can be obtained by the procedure of the designing method in FIGS. 28A, 28B, and 28C.
Figure 29B:
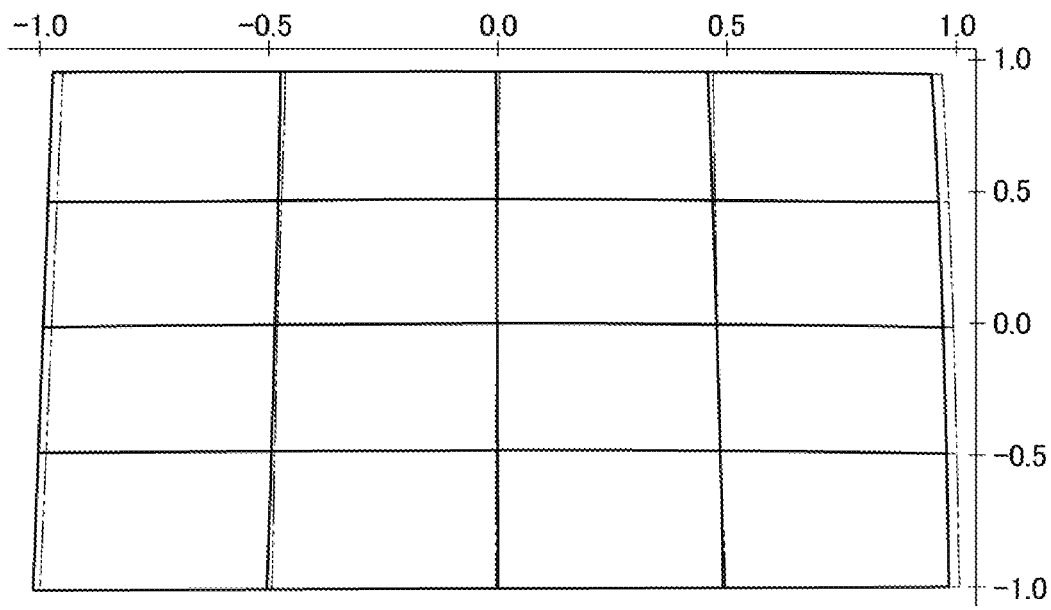
FIG. 29B is a view corresponding to FIG. 15B for describing that the effect can be obtained by the procedure of the designing method in FIGS. 28A, 28B, and 28C.

A fact that fixation disparity is resolved by the designing method of the above procedure will be described with reference to FIGS. 29A and 29B. FIG. 29A illustrates a case where the prism prescription lens is viewed with the left and right eyes. Although deviation between the grid lines viewed by the right eye and the left eye increases as being away from the coordinate (0, 0) to the outer side, it is understood that deviation between grid lines decreases in the grid lines viewed by the corrected lens illustrated in FIG. 29B.

FIGS. 30A to 33B illustrate examples in which the prism base direction is the lower side (Down-direction), and FIGS. 34A to 37B illustrate examples in which the prism base direction is the upper side (Up-direction). In these examples, the prism base direction is the Y direction (see FIG. 1), and one side region has a larger mean value of mean curvatures than the other region with the X direction orthogonal to the Y direction as a boundary. The mean curvature is measured along a straight line passing through the optical center O in the Y direction.

Figure 30A:
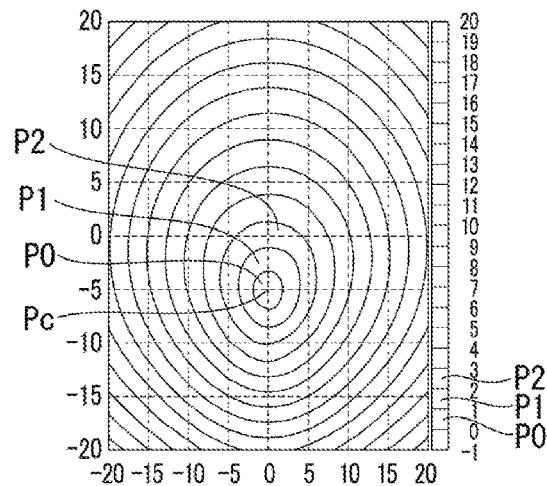
FIG. 30A is a schematic view illustrating a procedure of a progressive power lens designing method.

Example 11: Progressive Power Lens Whose Prism Base Direction is Lower Side (Down-Direction), Prism Refractive Power is 2.5 Δ (Prism Diopters), Spherical Refractive Power S is +3.0 Diopters, Addition Power ADD is 2.5 Diopters, and Progressive Length is 14 mm In FIG. 30A, a position Pc which is 5 mm away from the coordinate (0, 0) to the lower side, that is, a coordinate (0, −5) is the center of a region P0 where the prism amount ΔP is 0 to 1 Δ (prism diopter). Further, an outer side of the region P0 is a region P1 in the range of 1 to 2 Δ (prism diopters), and an outer side of the region P1 is a region P2 in the range of 2 to 3 Δ (prism diopters). The prism distribution of FIG. 30A is stored in the prism prescription lens vector storage step S1.

Figure 30B:
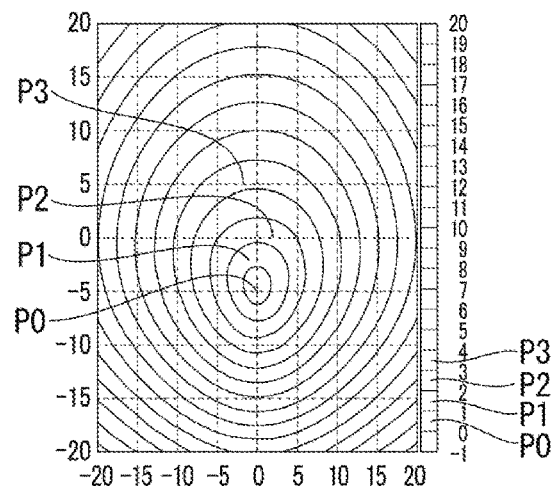
FIG. 30B is a schematic view illustrating the procedure of the progressive power lens designing method.

In the reference prism distribution illustrated in FIG. 30B, a region including the position Pc is in the range of 0 to 1 diopter, and the refractive power increases as being located in a region on the ear side, and the refractive power decreases in a region located on the nose side. The prism distribution in FIG. 30B is stored in the target ray group storage step S2.

Figure 30C:
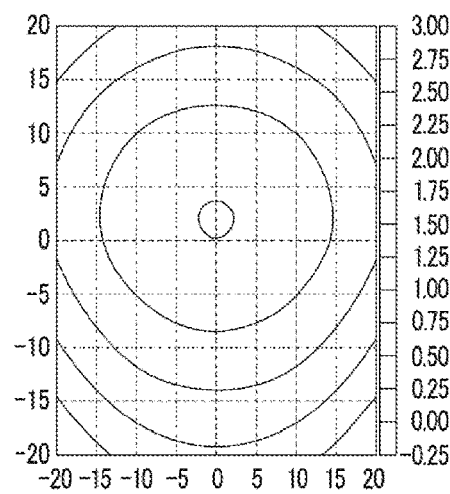
FIG. 30C is a schematic view illustrating the procedure of the progressive power lens designing method.

FIG. 30C illustrates a differential prism distribution in the case of the progressive power lens. In the differential prism distribution of FIG. 30C, a region including a coordinate (0, 2) is in the range of 0.00 to 0.25 diopter, and an outer side thereof is a region in the range of 0.25 to 0.50 diopter. The differential prism distribution illustrated in FIG. 30C is obtained in the correction prism amount calculation step S5.

Figure 31A:
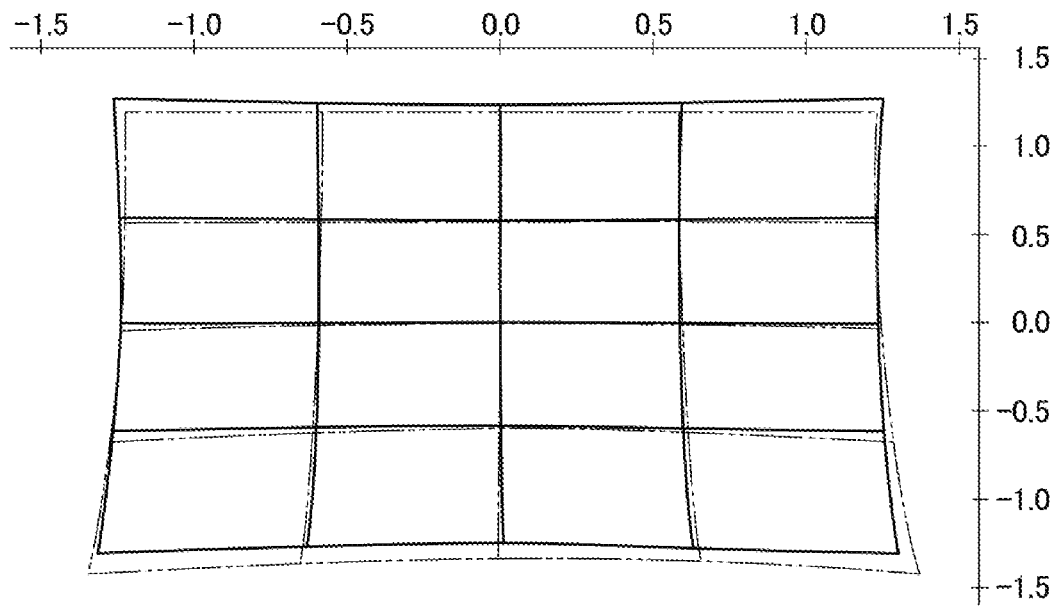
FIG. 31A is a view corresponding to FIG. 15A for describing that an effect can be obtained by the procedure of the designing method in FIGS. 30A, 30B, and 30C.
Figure 31B:
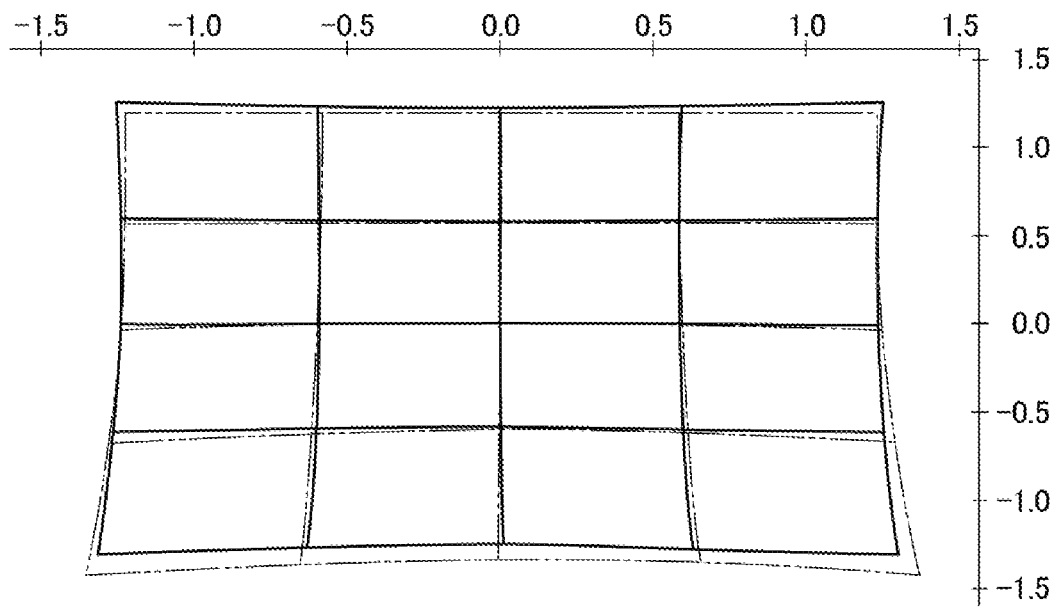
FIG. 31B is a view corresponding to FIG. 15B for describing that the effect can be obtained by the procedure of the designing method in FIGS. 30A, 30B, and 30C.

FIG. 31A illustrates a case where the lens before correction is viewed with the left and right eyes. Although deviation between grid lines viewed by the right eye and the left eye increases as being away from the coordinate (0, 0) as illustrated in FIG. 31A, it is understood that the deviation in the grid line viewed between the right eye and the left eye decreases in the lens after the correction step illustrated in FIG. 31B as compared to FIG. 31A.

Figure 32A:
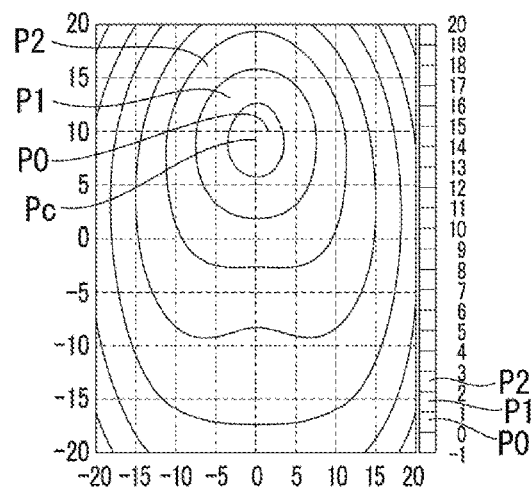
FIG. 32A is a schematic view illustrating a procedure of a progressive power lens designing method.

Example 12: Progressive Power Lens Whose Prism Base Direction is Lower Side (Down-Direction), Prism Refractive Power is 2.5 Δ (Prism Diopters), Spherical Refractive Power S is −3.0 Diopters, Addition Power ADD is 2.5 Diopters, and Progressive Length is 14 mm In FIG. 32A, a position Pc which is 8 mm away from the coordinate (0, 0) to the upper side, that is, a coordinate (0, 8) is the center of a region P0 where the prism amount ΔP is 0 to 1 Δ (prism diopter). Further, an outer side of the region P0 is a region P1 in the range of 1 to 2 Δ (prism diopters), and an outer side of the region P1 is a region P2 in the range of 2 to 3 Δ (prism diopters). The prism distribution of FIG. 32A is stored in the prism prescription lens vector storage step S1.

Figure 32B:
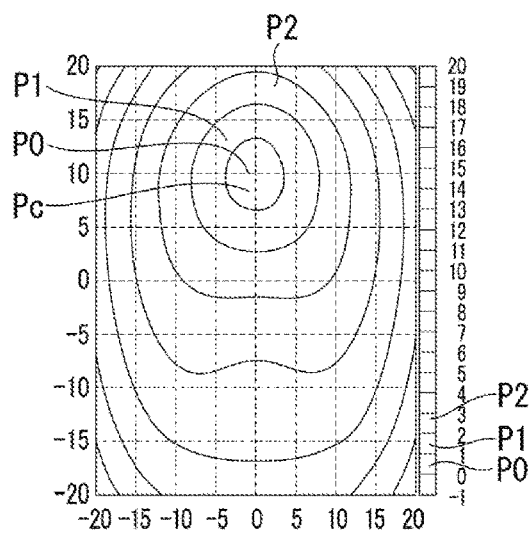
FIG. 32B is a schematic view illustrating the procedure of the progressive power lens designing method.

In the reference prism distribution illustrated in FIG. 32B, a region P0 including a position Pc is in the range of 0 to 1 diopter. An outer side of the region P0 is a region P1 of 1 to 2 diopters. The prism distribution in FIG. 32B is stored in the target ray group storage step S2.

Figure 32C:
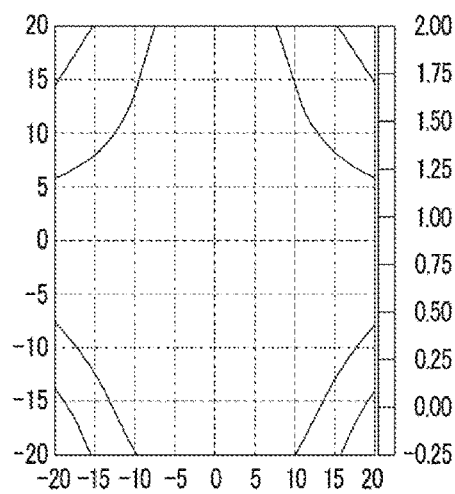
FIG. 32C is a schematic view illustrating the procedure of the progressive power lens designing method.

FIG. 32C illustrates a differential prism distribution. In the differential prism distribution of FIG. 32C, a region including a coordinate (0, 2) is in the range of 0.00 to 0.25 diopter, and an outer side thereof is a region in the range of 0.25 to 0.50 diopter. The differential prism distribution illustrated in FIG. 32C is obtained in the correction prism amount calculation step S5.

Figure 33A:
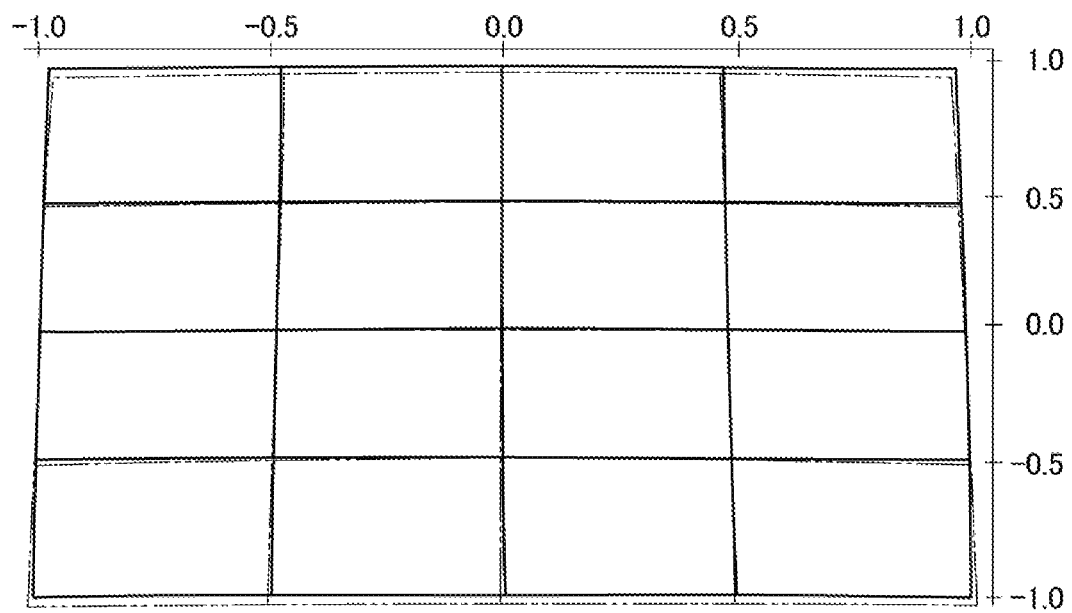
FIG. 33A is a view corresponding to FIG. 15A for describing that an effect can be obtained by the procedure of the designing method in FIGS. 32A, 32B, and 32C.
Figure 33B:
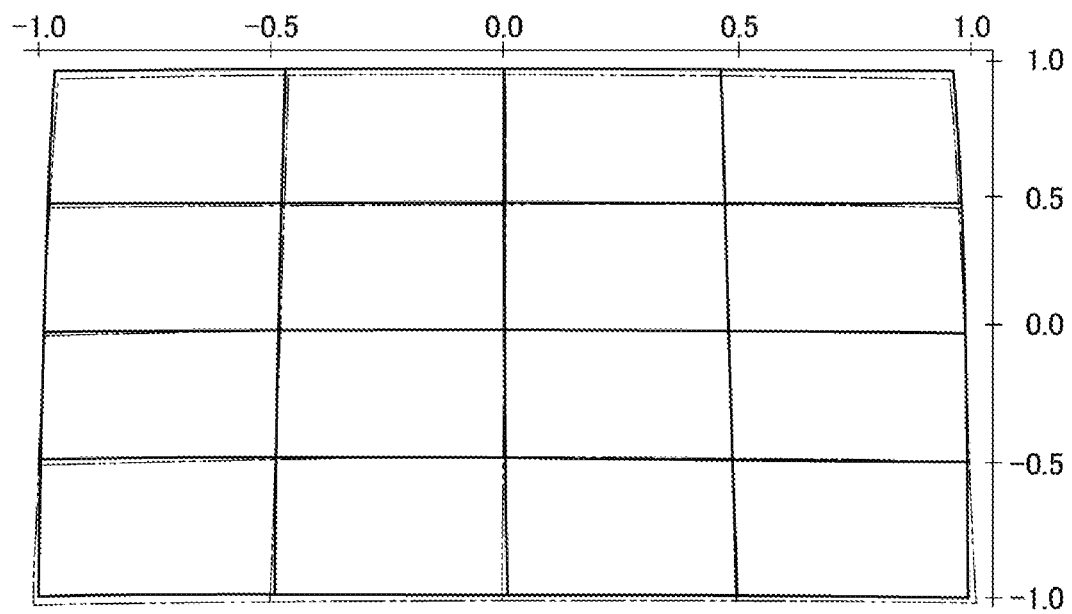
FIG. 33B is a view corresponding to FIG. 15B for describing that the effect can be obtained by the procedure of the designing method in FIGS. 32A, 32B, and 32C.

FIG. 33A illustrates a case where the lens before correction is viewed with the left and right eyes. Although deviation between grid lines viewed by the right eye and the left eye increases as being away from the coordinate (0, 0) as illustrated in FIG. 33A, it is understood that the deviation in the grid line viewed between the right eye and the left eye decreases in the lens after the correction step illustrated in FIG. 33B as compared to FIG. 33A.

Figure 34A:
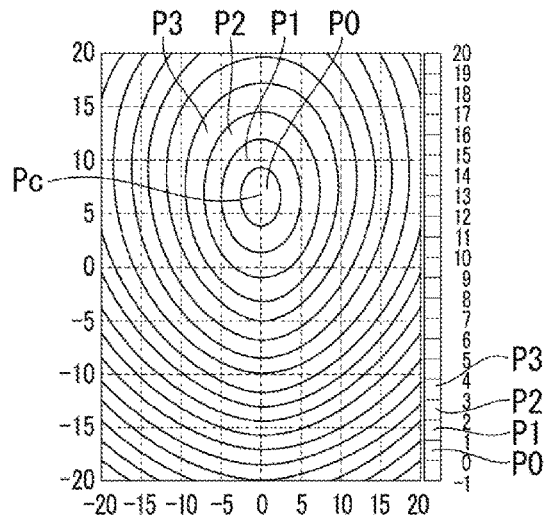
FIG. 34A is a schematic view illustrating a procedure of a progressive power lens designing method.

Example 13: Progressive Power Lens Whose Prism Base Direction is Upper Side (Up-Direction), Prism Refractive Power is 2.5 Δ (Prism Diopters), Spherical Refractive Power S is +3.0 Diopters, Addition Power ADD is 2.5 Diopters, and Progressive Length is 14 mm In FIG. 34A, a position Pc which is 8 mm away from the coordinate (0, 0) to the upper side, that is, a coordinate (0, 8) is the center of a region P0 where the prism amount ΔP is 0 to 1 Δ (prism diopter). Further, an outer side of the region P0 is a region P1 in the range of 1 to 2 Δ (prism diopters), and an outer side of the region P1 is a region P2 in the range of 2 to 3 Δ (prism diopters). The prism distribution of FIG. 34A is stored in the prism prescription lens vector storage step S1.

Figure 34B:
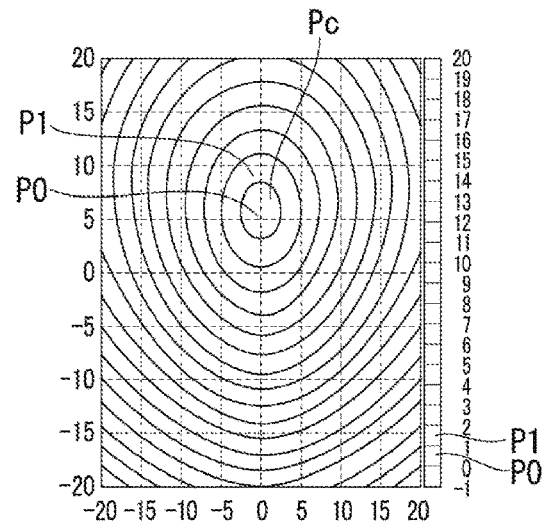
FIG. 34B is a schematic view illustrating the procedure of the progressive power lens designing method.

In the reference prism distribution illustrated in FIG. 34B, a region including a position Pc is in the range of 0 to 1 diopter. The prism distribution in FIG. 34B is stored in the target ray group storage step S2.

Figure 34C:
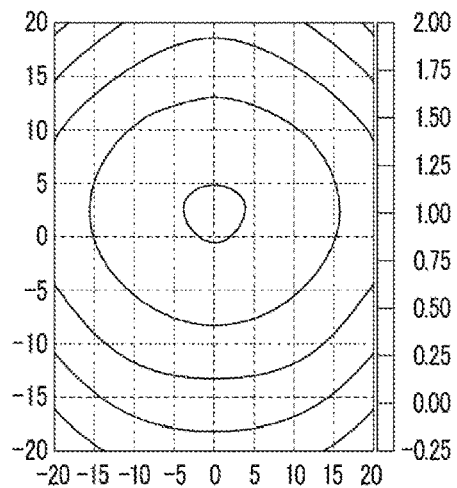
FIG. 34C is a schematic view illustrating the procedure of the progressive power lens designing method.

In a differential prism distribution illustrated in FIG. 34C, a region including the coordinate (0, 2) is in the range of 0.00 to 0.25 diopter, and an outer side thereof is a region in the range of 0.25 to 0.50 diopter. The differential prism distribution illustrated in FIG. 34C is obtained in the correction prism amount calculation step S5.

Figure 35A:
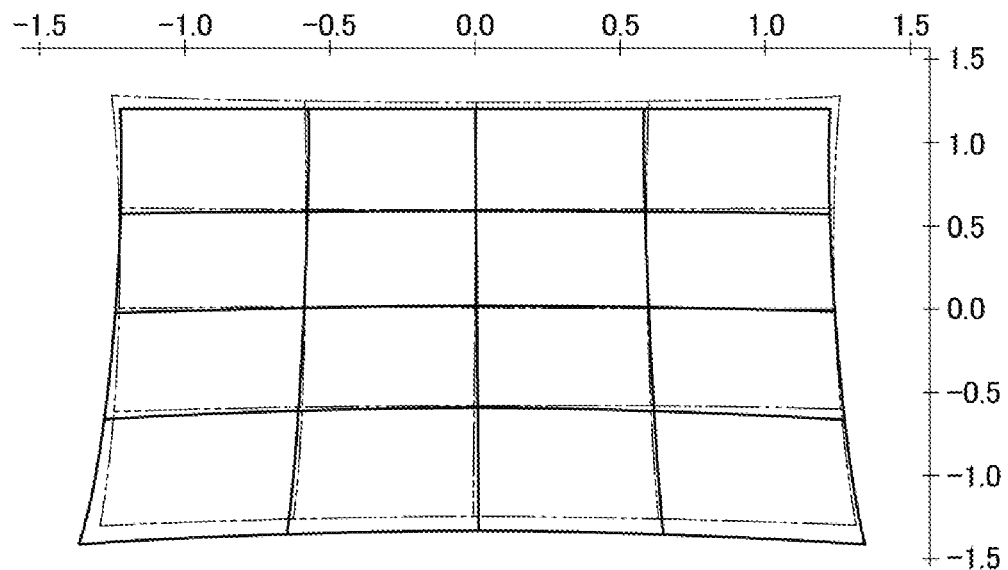
FIG. 35A is a view corresponding to FIG. 15A for describing that an effect can be obtained by the procedure of the designing method in FIGS. 34A, 34B, and 34C.
Figure 35B:
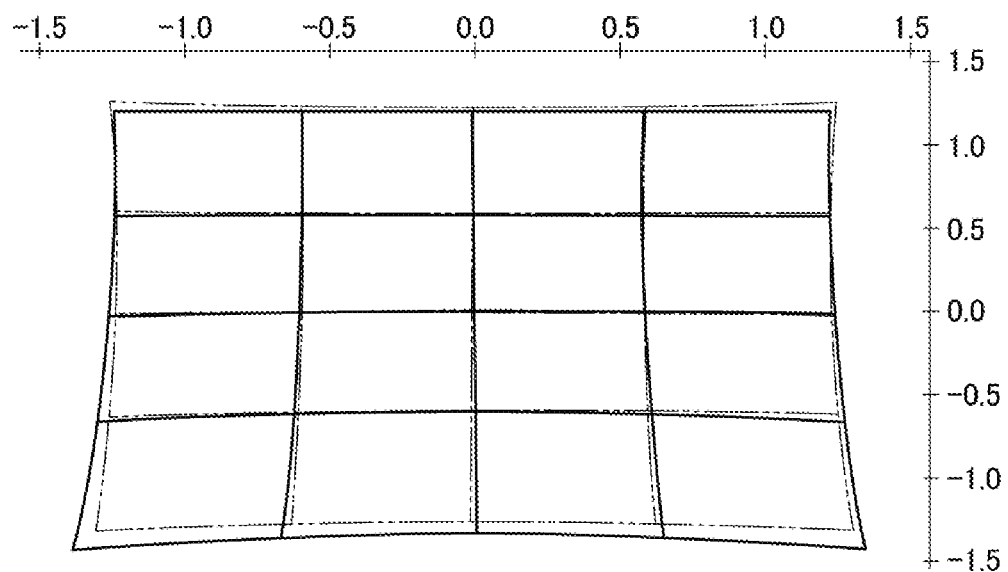
FIG. 35B is a view corresponding to FIG. 15B for describing that the effect can be obtained by the procedure of the designing method in FIGS. 34A, 34B, and 34C.

FIG. 35A illustrates a case where the lens before correction is viewed with the left and right eyes. Although deviation between grid lines viewed by the right eye and the left eye increases as being away from the coordinate (0, 0) as illustrated in FIG. 35A, it is understood that the deviation in the grid line viewed between the right eye and the left eye decreases in the lens after the correction step illustrated in FIG. 35B as compared to FIG. 35A.

Figure 36A:
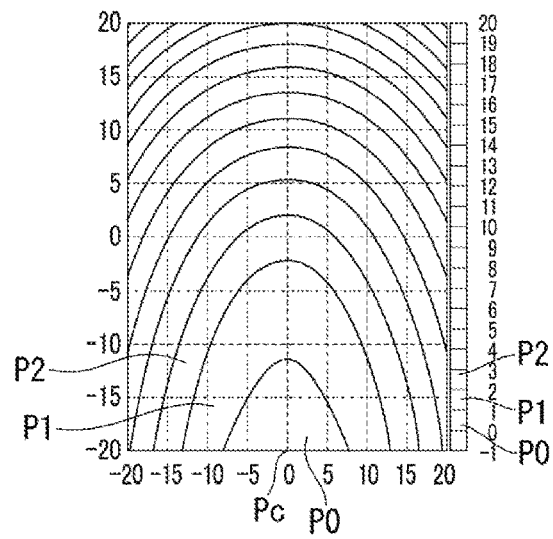
FIG. 36A is a schematic view illustrating a procedure of a progressive power lens designing method.

Example 14: Progressive Power Lens Whose Prism Base Direction is Upper Side (Up-Direction), Prism Refractive Power is 2.5 Δ (Prism Diopters), Spherical Refractive Power S is −3.0 Diopters, Addition Power ADD is 2.5 Diopters, and Progressive Length is 14 mm In FIG. 36A, a position Pc which is 20 mm away from the coordinate (0, 0) to the lower side, that is, a coordinate (0, −20) is in a region P0 where the prism amount ΔP is 0 to 1 Δ (prism diopter). Further, an outer side of the region P0 is a region P1 in the range of 1 to 2 Δ (prism diopters), and an outer side of the region P1 is a region P2 in the range of 2 to 3 Δ (prism diopters). The prism distribution of FIG. 36A is stored in the prism prescription lens vector storage step S1.

Figure 36B:
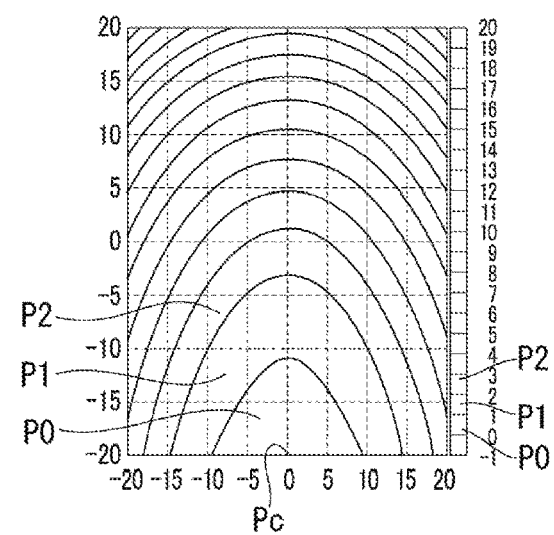
FIG. 36B is a schematic view illustrating the procedure of the progressive power lens designing method.

In the reference prism distribution illustrated in FIG. 36B, a region including a position Pc is in the range of 0 to 1 diopter. The prism distribution in FIG. 36B is stored in the target ray group storage step S2.

Figure 36C:
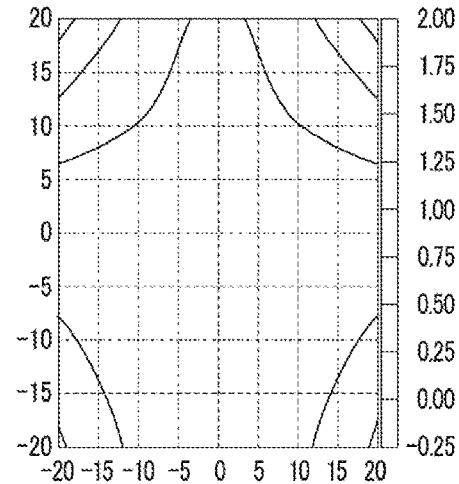
FIG. 36C is a schematic view illustrating the procedure of the progressive power lens designing method.

In a differential prism distribution illustrated in FIG. 36C, a region including the coordinate (0, 0) is in the range of 0.00 to 0.25 diopter, and an outer side thereof is a region in the range of 0.25 to 0.50 diopter. The differential prism distribution illustrated in FIG. 36C is obtained in the correction prism amount calculation step S5.

Figure 37A:
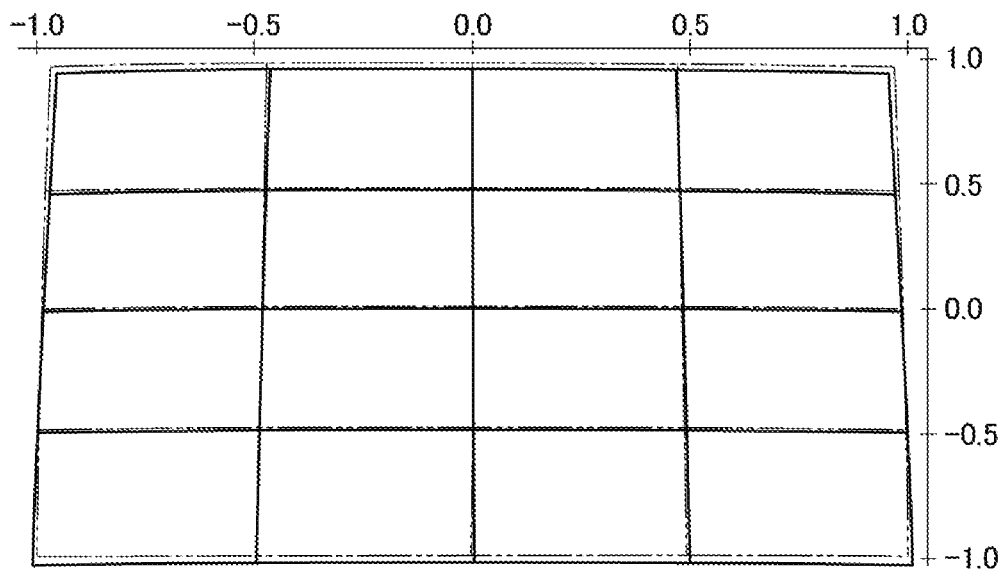
FIG. 37A is a view corresponding to FIG. 15A for describing that an effect can be obtained by the procedure of the designing method in FIGS. 36A, 36B, and 36C.
Figure 37B:
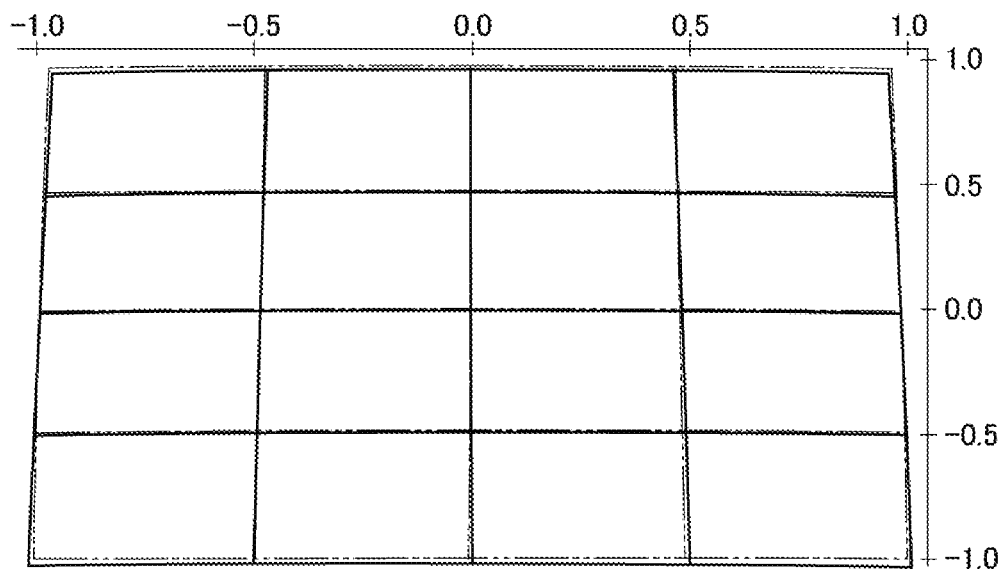
FIG. 37B is a view corresponding to FIG. 15B for describing that the effect can be obtained by the procedure of the designing method in FIGS. 36A, 36B, and 36C.

FIG. 37A illustrates a case where the lens before correction is viewed with the left and right eyes. Although deviation between grid lines viewed by the right eye and the left eye increases as being away from the coordinate (0, 0) as illustrated in FIG. 37A, it is understood that the deviation in the grid line viewed between the right eye and the left eye decreases in the lens after the correction step illustrated in FIG. 37B as compared to FIG. 37A.

[Spectacle Lens Producing Apparatus]

Next, one embodiment of a spectacle lens producing apparatus of the present invention will be described with reference to FIG. 38.

Figure 38:
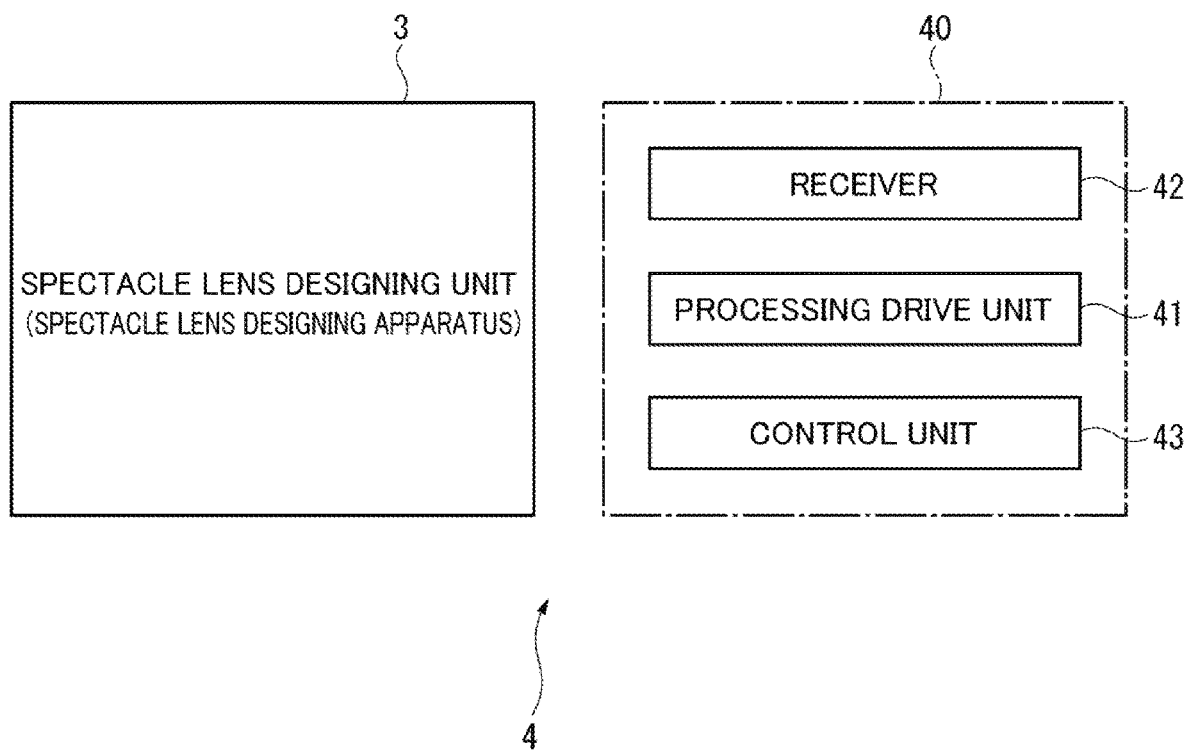
FIG. 38 is a block diagram illustrating a spectacle lens producing apparatus according to one embodiment of the present invention.

In FIG. 38, a spectacle lens producing apparatus 4 includes a spectacle lens designing unit that designs a spectacle lens and a processing unit 40 that processes the spectacle lens designed by the spectacle lens designing unit.

The spectacle lens designing unit is the same as the spectacle lens designing apparatus 3 illustrated in FIG. 11.

The processing unit 40 is constituted by a processing unit body (not illustrated) that performs processing on a lens material, a processing drive unit 41 that drives the processing unit body, a receiver 42 that receives data designed by the spectacle lens designing apparatus 3, and a control unit 43 that controls the processing drive unit 41 based on the data received by the receiver 42.

The processing unit body is provided with a tool (not illustrated) to implement grinding, polishing and the like, and the processing drive unit 41 is a motor or the like configured to drive the tool or the like.

The receiver 42 receives data transmitted from the transceiver 33 of the spectacle lens designing apparatus 3. Here, the receiver 42 and the transceiver 33 are electrically connected via radio or a code. In addition, the data designed by the spectacle lens designing apparatus 3 may be stored in a storage medium such as a USB memory and design data may be received by the receiver 42 from the storage medium in the present embodiment.

[Spectacle Lens Producing Method]

Next, a spectacle lens producing method of the present invention will be described with reference to FIG. 39.

Figure 39:
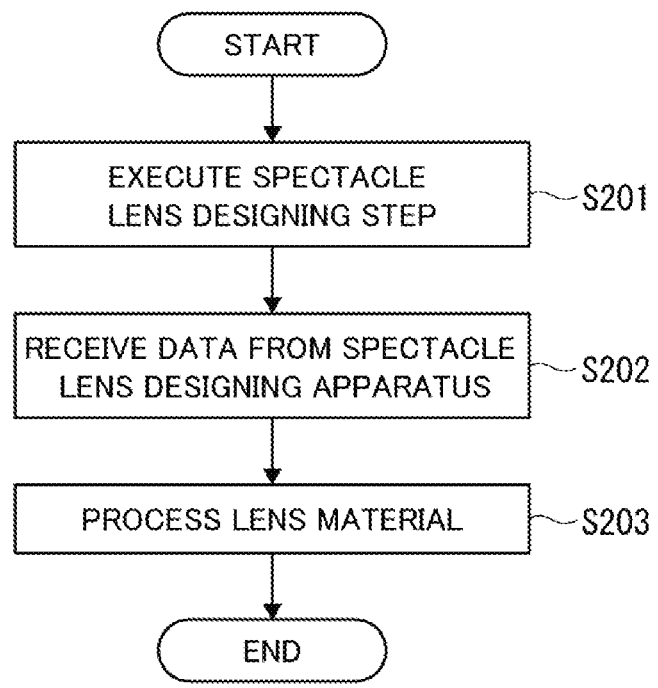
FIG. 39 is a flowchart illustrating a spectacle lens producing method.

In FIG. 39, a spectacle lens designing step is first performed by the spectacle lens designing apparatus 3 (S201). The spectacle lens designing step is performed according to the procedure of the spectacle lens designing method illustrated in FIG. 13.

Then, a processing step of processing the spectacle lens designed in the spectacle lens designing step is performed.

That is, when the receiver 42 receives the data transmitted from the transceiver 33 of the spectacle lens designing apparatus 3 (S202), the processing drive unit 41 drives the tool or the like while being controlled by the control unit 43 to process the lens material (S203).

Effects of Embodiments (1) As illustrated in FIGS. 1 to 10, since the minimum value of the curvature (mean curvature) of the exit surface LO which is the eyeball-side optical surface is on the same side as the prism base direction, a slope of a surface at a position on the exit surface of the lens corresponding to a direction of the line of sight obtained by rotating the eyeball becomes gradually gentler than a slope of a surface at the prism measurement reference point as being directed in the prism base direction, and becomes gradually steeper as being directed in the opposite direction. Therefore, the prism imbalance is resolved so that the deviation in line of sight between the left and right eyes is resolved.

Further, a slope of a surface at a position on the eyeball-side optical surface of the lens corresponding to the direction of the line of sight obtained by rotating the eyeball becomes gradually gentler than the slope of the surface at the prism measurement reference point as being directed in the prism base direction, and becomes gradually steeper as being directed in the opposite direction. Therefore, the prism imbalance is resolved so that the deviation in line of sight between the left and right eyes is resolved.

(2) As illustrated in FIGS. 1 to 10, since the mean value of the mean curvatures on the opposite side of the prism base direction of the exit surface LO is larger than the mean value on the same side as the prism base direction, the prism imbalance is also resolved from this point, and the deviation of the line of sight between the left and right eyes is resolved.

(3) As illustrated in FIGS. 1 to 4B, since the change rate of the curvature of the exit surface LO is not zero at the prism measurement reference point in the single vision aspherical lens, the change rate of the mean curvature at the prism measurement reference point is not zero, the curvature changes so as to be smaller than the mean curvature at the prism measurement reference point in the base direction and to be larger than the mean curvature at the prism measurement reference point in the opposite direction with the prism measurement reference point interposed therebetween. Thus, the deviation in line of sight between the left and right eyes is resolved.

Further, a slope of a surface at a position on the eyeball-side optical surface of the lens corresponding to the direction of the line of sight obtained by rotating the eyeball becomes gradually gentler than the slope of the surface at the prism measurement reference point as being directed in the prism base direction, and becomes gradually steeper as being directed in the opposite direction. Therefore, the prism imbalance is resolved so that the deviation in line of sight between the left and right eyes is resolved.

(4) As illustrated in FIGS. 1 to 4B, the spectacle lens is the single vision lens, the mean curvature decreases at a position in the prism base direction, and the mean curvature increases at a position on the opposite side of the prism base direction with the optical center O interposed therebetween, and thus, the prism imbalance caused by the lens having the slope of the lens surface at the prism measurement reference point is canceled out.

(5) As illustrated in FIGS. 12A and 12B, when the incident ray vectors L11A, L12A, and L13A in the case of causing a plurality of rays rotated by an angle γ corresponding to the prescription prism to be emitted to the reference lens BL and a plurality of rays to be incident on the reference lens BL so as to be directed to the eyeball rotation point E constitute the target ray group, rays emitted from a plurality of object points are incident on the entrance surface LI of the prism prescription lens CL, and a plurality of rays directed to the eyeball rotation point E among the rays emitted from the exit surface LO of the prism prescription lens is defined as a prism ray group LC0 in each gaze line direction of the prism prescription lens, the slope of the exit surface LO has been determined such that the plurality of ray vectors L21A, L22A, and L23A passing through the same position as an arbitrary point among the rays constituting the prism ray group LC0 is parallel with respect to the target ray group. The ray emitted from the exit surface LO of the prism prescription lens CL and entering the eyeball rotation point E is approximated to a ray which is emitted from the ideal reference lens BL to which no prism is added and enters the eyeball rotation point E so that an image is less likely to look shifted. By performing the above-described steps, it is possible to efficiently reduce the deviation in line of sight between the left and right eyes.

(6) Specifically, the incident ray vectors L21A, L22A, and L23A that make rays incident on the entrance surface LI and the outgoing ray vectors L21B, L22B, and L23B emitted from the exit surface LO are stored for the prism prescription lens CL, and the target ray group of the incident ray vectors L11A, L12A, and L13A incident on the entrance surface LI after correction of the angle γ corresponding to the prescription prism is stored for the reference lens BL, the prismatic effect of the prism prescription lens before correction is calculated using the stored incident ray vectors L21A, L22A, and L23A and outgoing ray vectors L21B, L22B, and L23B, the prismatic effect to obtain the ideal outgoing ray with which the angle formed between the direction of the outgoing ray vector emitted from the reference lens BL and the direction of the outgoing ray vector emitted from the prism prescription lens CL, that is, the deviation angle becomes the same at each of the optical center O and the lens peripheral portions O2 and O3 is calculated using the stored outgoing ray vector L21B, L22B, and L23B and outgoing ray vector L11B, L12B, and L13B, the correction prism amount for correction of the slope of the exit surface LO is calculated based on the difference between the uncorrected prismatic effect and the prismatic effect to obtain the ideal outgoing ray, obtained by the calculation, and the exit surface is corrected based on the correction prism amount obtained by the calculation. Thus, it is possible to efficiently reduce the deviation in line of sight between the left and right eyes by performing the above series of steps.

(7) Since it is determined whether the difference between the prismatic effects is equal to or smaller than the target value after correcting the exit surface LO based on the calculated correction prism amount, the above-described steps are repeated if the difference between the prismatic effects is not smaller than the target value so that it is possible to precisely prevent the deviation in line of sight between the left and right eyes.

(8) Since it is determined whether the predetermined number of corrections have been performed after correcting the inclined surface of the exit surface LO based on the calculated correction prism amount, the correction of the exit surface LO is ended when the correction has been repeated the predetermined number of times, and thus, it is possible to shorten the design time.

(9) The spectacle lens producing method includes: the spectacle lens designing step of designing the spectacle lens; and the processing step of processing the spectacle lens designed in the spectacle lens designing step. Since the spectacle lens designing step implements the above-described configuration, it is possible to manufacture the spectacle lens with little deviation of line of sight between the left and right eyes.

Incidentally, the present invention is not limited to the above-described embodiments, and variations, improvement, and the like within the scope capable of achieving the object of the present invention are included in the present invention.

For example, the slope of the exit surface LO of the prism prescription lens CL is corrected in the spectacle lens designing method of the embodiment, but the entrance surface LI of the prism prescription lens CL, that is, the slope of the object-side optical surface may be corrected in the present invention. Here, the eyeball-side optical surface is an exit surface which is a surface on the eyeball side, and is referred to as a rear surface or a concave surface in some cases. The object-side optical surface is an entrance surface which is a surface on the object side, and is referred to as a front surface or a convex surface in some cases.

The present embodiment will be summarized with reference to the drawings.

[1] A Description Will be Made with Reference to FIGS. 1 to 10.

An embodiment of the present invention is a spectacle lens of a prism prescription, the spectacle lens having an eyeball-side optical surface (exit surface LO). When one side is the same side as a prism base direction and the other side is an opposite side of the prism base direction with a direction orthogonal to the prism base direction passing through a prism measurement reference point (optical center O) as a boundary, a minimum value of a curvature of the eyeball-side optical surface (exit surface L0) is on the same side as the prism base direction.

[2] A Description Will be Made with Reference to FIGS. 1 to 10.

An embodiment of the present invention is a spectacle lens of a prism prescription, the spectacle lens having an eyeball-side optical surface (exit surface L0). When one side is the same side as a prism base direction and the other side is an opposite side of the prism base direction with a direction orthogonal to the prism base direction passing through a prism measurement reference point (optical center O) as a boundary, a mean value of mean curvatures of the eyeball-side optical surface (exit surface L0) on the opposite side of the prism base direction is larger than a mean value on the same side as the prism base direction.

[3] A Description Will be Made with Reference to FIG. 12A and FIG. 12B.

An embodiment of the present invention is a method for designing a spectacle lens of a prism prescription. When assuming that a lens to which a prism corresponding to a prescription prism is added is defined as a prism prescription lens CL, a lens which has the same prescription value other than the prism prescription and to which the prism is not added is a reference lens BL, incident ray vectors L11A, L12A, and L13A in the case of causing a plurality of rays rotated by an angle γ corresponding to the prescription prism to be emitted to the reference lens BL and a plurality of rays to be incident on the reference lens BL so as to be directed to the eyeball rotation point E are defined as a target ray group, and rays emitted from a plurality of object points A1, A2, and A3 are incident on an object-side optical surface (entrance surface LI) of the prism prescription lens CL, and a plurality of rays directed to the eyeball rotation point E among the rays emitted from an eyeball-side optical surface (exit surface LO) of the prism prescription lens CL is a prism ray group LC0 in each gaze line direction of the prism prescription lens CL, the method includes a lens surface shape determination step of determining a shape including a slope of the object-side optical surface (entrance surface LI) or the eyeball-side optical surface (exit surface LO) locally at each point corresponding to an arbitrary point of the plurality of rays such that the plurality of ray vectors L21A, L22A, and L23A passing through the same position as the arbitrary point among the rays constituting the prism ray group LC0 are parallel with respect to the target ray group.

[4] A Description Will be Made with Reference to FIGS. 12A, 12B, and 13.

As a preferred embodiment of the present invention, in the above-described spectacle lens designing method, the lens surface shape determination step includes: a prism prescription lens vector storage step S1 of storing an incident ray vector obtained by causing a ray to enter the object-side optical surface (entrance surface LI) and an outgoing ray vector emitted from the eyeball-side optical surface (exit surface LO) for the prism prescription lens CL; a target ray group storage step S2 of storing the target ray group; an uncorrected prismatic effect calculation step S3 of calculating a prismatic effect of the prism prescription lens CL before correction using the incident ray vector and the outgoing ray vector stored in the prism prescription lens vector storage step S1; an ideal prismatic effect calculation step S4 of calculating a prismatic effect to obtain an ideal outgoing ray with which each of angles θ1, θ2, and θ3, formed between a direction of the outgoing ray vector emitted from the reference lens BL and a direction of the outgoing ray vector emitted from the prism prescription lens CL, becomes the same δ at arbitrary points using the incident ray vector stored in the prism prescription lens vector storage step S1 and the target ray group stored in the target ray group storage step S2; a correction prism amount calculation step S5 of calculating a correction prism amount to correct the slope of the object-side optical surface (entrance surface LI) or the eyeball-side optical surface (exit surface LO) based on a difference between the prismatic effect obtained in the uncorrected prismatic effect calculation step S3 and the prismatic effect obtained in the ideal prismatic effect calculation step S4; and a correction step S6 of correcting the entrance surface LI or the exit surface LO based on the correction prism amount obtained in the correction prism amount calculation step S5.

[5] A Description Will be Made with Reference to FIG. 13.

As a more preferable embodiment of the present invention, in the spectacle lens designing method, the prism prescription lens vector storage step S1, the uncorrected prismatic effect calculation step S3, and the correction prism amount calculation step S5 are performed after the correction step S6, it is determined whether the difference between the prismatic effects is equal to or smaller than a target value or the predetermined number of corrections have been performed, and the correction step is ended if the difference between the prismatic effects is equal to or smaller than the target value or the predetermined number of corrections have been performed.

[6] A Description Will be Made with Reference to FIGS. 12A, 12B and 39.

An embodiment of the present invention is a spectacle lens producing method including: a spectacle lens designing step S201 and a processing step S203 of processing a spectacle lens designed in the spectacle lens designing step S201. In the spectacle lens designing step S201, when assuming that a lens to which a prism corresponding to a prescription prism is added is defined as a prism prescription lens CL, a lens which has the same prescription value other than the prism prescription and to which the prism is not added is a reference lens BL, incident ray vectors L11A, L12A, and L13A in the case of causing a plurality of rays rotated by an angle γ corresponding to the prescription prism to be emitted to the reference lens BL and a plurality of rays to be incident on the reference lens BL so as to be directed to the eyeball rotation point E are defined as a target ray group, and rays emitted from a plurality of object points A1, A2, and A3 are incident on an object-side optical surface (entrance surface LI) of the prism prescription lens CL, and a plurality of rays directed to the eyeball rotation point E among the rays emitted from an eyeball-side optical surface (exit surface LO) of the prism prescription lens CL is a prism ray group LC0 in each gaze line direction of the prism prescription lens CL, a slope of the object-side optical surface (entrance surface LI) or the eyeball-side optical surface (exit surface LO) is determined such that the plurality of ray vectors L21A, L22A, and L23A passing through the same position as the arbitrary point among the rays constituting the prism ray group LC0 are parallel with respect to the target ray group.

The invention claimed is:

1. A method for designing a spectacle lens including a prism prescription, the lens including a prism for correction of fixation disparity or heterophoria, wherein
a lens to which a prism corresponding to the prism prescription is added is a prism prescription lens, a lens which has a same prescription value other than the prism prescription and to which the prism is not added is a reference lens, among rays that are emitted from a plurality of object points, incident on an object-side optical surface of the reference lens and emitted from an eyeball-side optical surface of the reference lens, in respective rays obtained by rotating a plurality of rays directed toward an eyeball rotation point around the eyeball rotation point by an angle corresponding to the prism prescription applied to a prism measurement reference point, incident ray vectors incident on the object-side optical surface constitute a target ray group, and among rays that are emitted from the plurality of object points, incident on an object-side optical surface of the prism prescription lens and emitted from an eyeball-side optical surface of the prism prescription lens, in a plurality of rays directed toward the eyeball rotation point, incident ray vectors incident on the object-side optical surface constitute a prism ray group, the method comprising:

a prism prescription lens vector storage step of storing the incident ray vectors constituting the prism ray group and outgoing ray vectors corresponding to the incident ray vectors;

a target ray group storage step of generating, by simulation, the respective rays obtained by rotating the plurality of rays directed toward the eyeball rotation point around the eyeball rotation point by the angle corresponding to the prism prescription applied to the prism measurement reference point, among the rays that are emitted from the plurality of object points, are incident on the object-side optical surface of the reference lens, and are emitted from the eyeball-side optical surface of the reference lens, and storing the incident ray vectors constituting the target ray group and outgoing ray vectors corresponding to the incident ray vectors;

an uncorrected prismatic effect calculation step of calculating a prismatic effect of the prism prescription lens before correction using the incident ray vectors and the outgoing ray vectors stored in the prism prescription lens vector storage step;

an ideal prismatic effect calculation step of calculating a prismatic effect to obtain an ideal outgoing ray with which each angle formed between directions of the outgoing ray vectors emitted from the reference lens and directions of the outgoing ray vectors emitted from the prism prescription lens becomes a constant angle;

a correction prism amount calculation step of calculating a correction prism amount to correct the eyeball-side optical surface of the prism prescription lens based on a difference between the prismatic effect obtained in the uncorrected prismatic effect calculation step and the prismatic effect obtained in the ideal prismatic effect calculation step; and a correction step of correcting the eyeball-side optical surface of the prism prescription lens based on the correction prism amount obtained in the correction prism amount calculation step.

2. The method for designing a spectacle lens according to claim 1, wherein the prism prescription lens vector storage step, the uncorrected prismatic effect calculation step, and the correction prism amount calculation step are performed after the correction step, it is determined whether the difference between the prismatic effects is equal to or smaller than a target value or a predetermined number of corrections have been performed, and the correction step is ended if the difference between the prismatic effects is equal to or smaller than the target value or the predetermined number of corrections have been performed.

3. A spectacle lens producing method comprising:

a spectacle lens designing step of designing a spectacle lens including a prism for correction of fixation disparity or heterophoria; and a processing step of processing the spectacle lens designed in the spectacle lens designing step, wherein a lens to which the prism corresponding to a prism prescription is added is a prism prescription lens, a lens which has a same prescription value other than the prism prescription and to which the prism is not added is a reference lens, among rays that are emitted from a plurality of object points, incident on an object-side optical surface of the reference lens and emitted from an eyeball-side optical surface of the reference lens, in respective rays obtained by rotating a plurality of rays directed toward an eyeball rotation point around the eyeball rotation point by an angle corresponding to the prism prescription applied to a prism measurement reference point, incident ray vectors incident on the object-side optical surface constitute a target ray group, and among rays that are emitted from the plurality of object points, incident on an object-side optical surface of the prism prescription lens and emitted from an eyeball-side optical surface of the prism prescription lens, in a plurality of rays directed toward the eyeball rotation point, incident ray vectors incident on the object-side optical surface constitute a prism ray group, and the spectacle lens designing step comprises:

a prism prescription lens vector storage step of storing the incident ray vectors constituting the prism ray group and outgoing ray vectors corresponding to the incident ray vectors;

a target ray group storage step of generating, by simulation, the respective rays obtained by rotating the plurality of rays directed toward the eyeball rotation point around the eyeball rotation point by the angle corresponding to the prism prescription applied to the prism measurement reference point, among the rays that are emitted from the plurality of object points, incident on the object-side optical surface of the reference lens and emitted from the eyeball-side optical surface of the reference lens, and storing the incident ray vectors constituting the target ray group and outgoing ray vectors corresponding to the incident ray vectors;

an uncorrected prismatic effect calculation step of calculating a prismatic effect of the prism prescription lens before correction using the incident ray vectors and the outgoing ray vectors stored in the prism prescription lens vector storage step;

an ideal prismatic effect calculation step of calculating a prismatic effect to obtain an ideal outgoing ray with which each angle formed between directions of the outgoing ray vectors emitted from the reference lens and directions of the outgoing ray vectors emitted from the prism prescription lens becomes a constant angle;

a correction prism amount calculation step of calculating a correction prism amount to correct the eyeball-side optical surface of the prism prescription lens based on a difference between the prismatic effect obtained in the uncorrected prismatic effect calculation step and the prismatic effect obtained in the ideal prismatic effect calculation step; and a correction step of correcting the eyeball-side optical surface of the prism prescription lens based on the correction prism amount obtained in the correction prism amount calculation step.

\* \* \* \* \*